United States Patent
Voss et al.

(10) Patent No.: US 11,268,420 B2
(45) Date of Patent: Mar. 8, 2022

(54) EXHAUST GAS TREATMENT SYSTEM WITH UPSTREAM SCR CATALYST

(71) Applicant: BASF Corporation, Florham Park, NJ (US)

(72) Inventors: Kenneth E. Voss, Iselin, NJ (US); Kevin A. Hallstrom, Iselin, NJ (US); Sandip D. Shah, Iselin, NJ (US); David M. Youngren, Union, NJ (US); Andrew Thoms, Iselin, NJ (US); M. Shahjahan Kazi, Iselin, NJ (US); Robert Dorner, Hannover (DE)

(73) Assignee: BASF Corporation, Florham Park, NJ (US)

( * ) Notice: Subject to any disclaimer, the term of this patent is extended or adjusted under 35 U.S.C. 154(b) by 16 days.

(21) Appl. No.: 16/971,236

(22) PCT Filed: Feb. 18, 2019

(86) PCT No.: PCT/IB2019/051301
§ 371 (c)(1),
(2) Date: Aug. 19, 2020

(87) PCT Pub. No.: WO2019/159151
PCT Pub. Date: Aug. 22, 2019

(65) Prior Publication Data
US 2021/0079826 A1    Mar. 18, 2021

Related U.S. Application Data

(60) Provisional application No. 62/632,322, filed on Feb. 19, 2018.

(51) Int. Cl.
| | |
|---|---|
| *F01N 3/035* | (2006.01) |
| *F01N 3/10* | (2006.01) |
| *F01N 3/20* | (2006.01) |
| *B01J 23/56* | (2006.01) |
| *B01J 29/72* | (2006.01) |

(52) U.S. Cl.
CPC ............ *F01N 3/2066* (2013.01); *B01J 23/56* (2013.01); *B01J 29/723* (2013.01); *F01N 3/035* (2013.01); *F01N 3/105* (2013.01); *B01J 2229/18* (2013.01); *F01N 2250/12* (2013.01); *F01N 2610/02* (2013.01)

(58) Field of Classification Search
CPC .............. B01D 53/94; B01D 53/9418; B01D 53/9422; B01D 53/944; B01D 53/9459; B01D 53/9477; B01D 46/2418; B01D 2258/012; F01N 3/035; F01N 3/103; F01N 3/105; F01N 3/2066; F01N 2250/02
See application file for complete search history.

(56) References Cited

U.S. PATENT DOCUMENTS

| | | |
|---|---|---|
| 4,961,917 A | 10/1990 | Byrne |
| 5,516,497 A | 5/1996 | Speronello et al. |
| 7,078,004 B2 | 7/2006 | Voss et al. |
| 8,800,268 B2 | 8/2014 | Voss et al. |
| 8,858,904 B2 | 10/2014 | Punke et al. |
| 9,333,490 B2 | 5/2016 | Kazi et al. |
| 9,453,443 B2 | 9/2016 | Kumar et al. |
| 9,993,772 B2 | 6/2018 | Gilbert et al. |
| 10,399,036 B2* | 9/2019 | Gabrielsson ....... B01D 53/9472 |
| 10,718,245 B2* | 7/2020 | Dou ........................ F01N 3/103 |
| 11,008,917 B2* | 5/2021 | Adelman .............. F01N 13/009 |
| 2009/0035195 A1* | 2/2009 | Robel ................... F01N 13/011 422/177 |
| 2014/0331644 A1 | 11/2014 | Kumar et al. |
| 2015/0113966 A1 | 4/2015 | Kamasamudrum et al. |
| 2016/0032803 A1 | 2/2016 | Ettireddy et al. |
| 2017/0198619 A1* | 7/2017 | Huang ............... B01D 53/9409 |
| 2019/0070596 A1 | 3/2019 | Yang et al. |
| 2019/0383192 A1* | 12/2019 | Dou .................... F01N 13/0093 |

FOREIGN PATENT DOCUMENTS

| | | |
|---|---|---|
| EP | 2230001 | 9/2010 |
| WO | WO 2009/074308 | 6/2009 |
| WO | 2012051273 A1 | 4/2012 |
| WO | 2015128247 A1 | 9/2015 |
| WO | WO 2017/019958 | 2/2017 |
| WO | WO 2018/025208 | 2/2018 |

OTHER PUBLICATIONS

European Search Report dated Sep. 13, 2021 for European Application No. EP19754695.

* cited by examiner

*Primary Examiner* — Timothy C Vanoy
(74) *Attorney, Agent, or Firm* — Finnegan, Henderson, Farabow, Garrett & Dunner, LLP

(57) ABSTRACT

A system for treatment of an exhaust gas stream from an engine is provided, containing an upstream selective catalytic reduction (SCR) catalyst, which receives the exhaust gas stream without any intervening catalyst, a diesel oxidation catalyst (DOC) positioned downstream thereof; a catalyzed soot filter (CSF) downstream of the diesel oxidation catalyst; a second SCR catalyst positioned downstream of the catalyzed soot filter; and an ammonia oxidation (AMOx) catalyst. The application also describes use of such systems to reduce nitrogen oxides (NOx) and hydrocarbons (HC) in an exhaust gas stream.

24 Claims, 36 Drawing Sheets

EXHAUST GAS TREATMENT SYSTEM WITH UPSTREAM SCR CATALYST

CROSS-REFERENCE TO RELATED APPLICATIONS

The present application is a U.S. National Stage of International Patent Application PCT/IB2019/051301, filed Feb. 18, 2019, and claims priority to U.S. Provisional Patent Application No. 62/632,322, filed Feb. 19, 2018. The disclosures of each of the applications noted above are incorporated herein by reference in their entirety.

FIELD OF THE INVENTION

The present invention relates to exhaust gas treatment systems comprising at least one catalyst article, and methods of use thereof.

BACKGROUND OF THE INVENTION

Emissions of diesel engines include particulate matter (PM), nitrogen oxides ($NO_x$), unburned hydrocarbons (HC), and carbon monoxide (CO). $NO_x$ is a term used to describe various chemical species of nitrogen oxides, including nitrogen monoxide (NO) and nitrogen dioxide ($NO_2$), among others. One key problem for attaining high NOx reduction over selective catalytic reduction (SCR) catalysts is having adequate exhaust temperature for the SCR reaction. In particular, this is often a concern for heavy duty diesel (HDD) on-road aftertreatment systems, wherein the SCR catalyst is positioned downstream of other catalysts (typically including a diesel oxidation catalyst (DOC) and catalyzed soot filter (CSF)). With such system configurations, the SCR experiences somewhat low temperature conditions, which can inhibit the SCR reaction, especially over the initial cooler segments of the U.S. HDDT (FTP) certification test. In addition, engines using reduced exhaust gas recirculation (EGR) for better efficiency experience increased engine-out NOx levels, making it even a greater challenge to meet the current target values. Another challenge for certain HDD systems relates to meeting $N_2O$ limits, as $N_2O$ is a typical byproduct of the SCR reaction.

Since these exhaust characteristics create challenges for current diesel emission catalyst technology, there remains a need in the art for new catalyst systems that meet increasingly stringent environmental regulations. In particular, it would be beneficial to provide components for such systems that focus particularly on reducing NOx and $N_2O$ emissions from diesel engines.

SUMMARY OF THE INVENTION

The present disclosure provides an exhaust gas treatment system with a series of catalysts designed to effectively treat exhaust gas. In particular, such exhaust gas treatment systems include an upstream SCR catalyst, and such systems can provide enhanced NOx removal and decreased $N_2O$ emissions relative to a comparable exhaust gas treatment system without such an upstream catalyst. Total NOx conversion across the disclosed systems can be, for example, greater than 95%, with brake specific NOx (BSNOx) values of less than 0.1 g/bhph. Total $N_2O$ emissions across the disclosed systems can be, for example, with $BSN_2O$ values of less than 0.019 g/bhph.

In one aspect of the present disclosure is provided a system for treatment of an exhaust gas stream from an engine, the system comprising: a first selective catalytic reduction (SCR) catalyst that is in fluid communication with the exhaust gas stream, wherein the first SCR catalyst receives the exhaust gas stream without any intervening catalyst; a diesel oxidation catalyst (DOC) in fluid communication with the first SCR catalyst, wherein the diesel oxidation catalyst is positioned downstream of the first SCR catalyst; a catalyzed soot filter (CSF) in fluid communication with the diesel oxidation catalyst, wherein the catalyzed soot filter is positioned downstream of the diesel oxidation catalyst; a second SCR catalyst in fluid communication with the catalyzed soot filter, wherein the second SCR catalyst is positioned downstream of the catalyzed soot filter; and a first AMOx catalyst that is either integrated with the second SCR catalyst or in fluid communication with and downstream of the second SCR catalyst. In some embodiments, the first SCR catalyst is in a close-coupled position. In some embodiments, the first SCR catalyst is in an underfloor position.

The disclosed systems can, in various embodiments, comprise a second AMOx catalyst integrated with the first SCR catalyst, in the form of an SCR/AMOx catalyst. In alternative embodiments, a second AMOx catalyst is not integrated with the SCR catalyst, but is positioned immediately downstream of the SCR catalyst. In such embodiments, the second AMOx catalyst can, in some embodiments, comprise platinum. The SCR/AMOx catalyst, where present, may in certain embodiments be in the form of two or more washcoats on a flow-through substrate, wherein the flow-through substrate has an upstream inlet end and a downstream outlet end, and wherein the second AMOx catalyst comprises platinum and is at the outlet end and extends less than a full length of the SCR/AMOx catalyst. For example, the SCR/AMOx catalyst can comprise: a bottom washcoat comprising the second AMOx catalyst in direct contact with the flow through substrate, wherein the second AMOx catalyst extends less than the full length of the SCR/AMOx catalyst; and a top washcoat comprising the SCR catalyst extending the full length of the SCR/AMOx catalyst.

In some embodiments, the first SCR catalyst comprises a vanadium component. In some embodiments, the first SCR catalyst comprises copper-promoted molecular sieves. For example, the first SCR catalyst can comprise Cu-CHA.

The disclosed system, in some embodiments, can further comprise a dual injector system, comprising a first injector adapted for the addition of a first reductant to the exhaust gas stream upstream of the first SCR catalyst and a second injector adapted for the addition of a second reductant to the exhaust gas stream upstream of the second SCR catalyst. The first and second reductants can vary and, in some embodiments, comprise ammonia or an ammonia precursor.

In some embodiments, the CSF comprises one or more washcoats on a wall flow filter, and wherein the one or more washcoats comprise platinum and palladium. For example, in certain embodiments, the platinum and palladium in the one or more washcoats of the CSF are supported on alumina and are present in a ratio of about 4:1 Pt:Pd.

In some embodiments, the DOC comprises one or more washcoats on a flow-through substrate having an upstream inlet end and a downstream outlet end, and wherein the one or more washcoats comprise platinum and palladium on alumina. For example, in certain embodiments, the DOC comprises: a first washcoat coated from the upstream inlet end comprising platinum and palladium on alumina, extending less than a full length of the flow-through substrate, with a platinum:palladium ratio of about 1:1; and a second washcoat coated from the downstream outlet end comprising platinum and palladium on alumina, extending less than the full length of the flow-through substrate, with a platinum:palladium ratio of greater than 2:1.

The DOC, in various embodiments, can be associated with the CSF, in the form of a zoned DOC/CSF having an upstream inlet end and a downstream outlet end, wherein the DOC is at the upstream inlet end and extends less than a full length of the CSF. For example, in some embodiments, the zoned DOC/CSF is in the form of two or more washcoats on a wall flow filter, comprising: a first washcoat extending a full length of the wall flow filter comprising platinum and palladium on alumina, with a platinum:palladium ratio of greater than 5:1, and a second washcoat extending from the upstream inlet end less than the full length of the wall flow filter, comprising platinum and palladium on alumina, with a platinum:palladium ratio of greater than 5:1 and a loading of about 50 g/ft$^3$ or greater.

In some embodiments, the first AMOx catalyst is in fluid communication with and downstream of the second SCR catalyst, and the first AMOx catalyst is integrated with a third SCR catalyst. In some embodiments, the second SCR catalyst has an upstream inlet end and a downstream outlet end, and comprises an iron-promoted molecular sieve extending from the inlet end to less than a full length of the SCR catalyst and comprises a copper-promoted molecular sieve extending from the outlet end to less than the full length of the SCR catalyst. The iron promoted molecular sieve can be, e.g., Fe-CHA and/or the copper-promoted molecular sieve can be, e.g., Cu-CHA.

In the systems disclosed herein, the engine can be, in some embodiments, a lean burn engine. For example, in certain embodiments, the engine is a diesel engine.

In another aspect of the present disclosure is provided a method of treating an exhaust gas stream, comprising contacting the exhaust gas stream with an exhaust gas treatment system as disclosed herein, such that nitrogen oxides (NOx) in the exhaust gas stream are reduced. In some embodiments, NOx is reduced via the SCR catalyst components and HC is oxidized over the DOC and/or CSF components. In a further aspect, the disclosure provides a method of making an exhaust gas treatment system as disclosed herein, e.g., including assembling the catalysts and additional components according to any one or more of the disclosed system configurations.

The invention includes, without limitation, the following embodiments.

Embodiment 1

A system for treatment of an exhaust gas stream from an engine, the system comprising: a first selective catalytic reduction (SCR) catalyst that is in fluid communication with the exhaust gas stream, wherein the first SCR catalyst receives the exhaust gas stream without any intervening catalyst; a diesel oxidation catalyst (DOC) in fluid communication with the first SCR catalyst, wherein the diesel oxidation catalyst is positioned downstream of the first SCR catalyst; a catalyzed soot filter (CSF) in fluid communication with the diesel oxidation catalyst, wherein the catalyzed soot filter is positioned downstream of the diesel oxidation catalyst; a second SCR catalyst in fluid communication with the catalyzed soot filter, wherein the second SCR catalyst is positioned downstream of the catalyzed soot filter; and a first AMOx catalyst that is either integrated with the second SCR catalyst or in fluid communication with and downstream of the second SCR catalyst.

Embodiment 2

The system of the preceding embodiment, wherein the first SCR catalyst is in a close-coupled position.

Embodiment 3

The system of Embodiment 1, where the first SCR catalyst is in an underfloor position.

Embodiment 4

The system of any preceding embodiment, further comprising a second AMOx catalyst integrated with the first SCR catalyst, in the form of an SCR/AMOx catalyst.

Embodiment 5

The system of the preceding embodiment, wherein the second AMOx catalyst comprises platinum.

Embodiment 6

The system of Embodiment 4, wherein the SCR/AMOx catalyst is in the form of two or more washcoats on a flow-through substrate, wherein the flow-through substrate has an upstream inlet end and a downstream outlet end, and wherein the second AMOx catalyst comprises platinum and is at the outlet end and extends less than a full length of the SCR/AMOx catalyst.

Embodiment 7

The system of the preceding embodiment, wherein the SCR/AMOx catalyst comprises: a bottom washcoat comprising the second AMOx catalyst in direct contact with the flow through substrate, wherein the second AMOx catalyst extends less than the full length of the SCR/AMOx catalyst; and a top washcoat comprising the SCR catalyst extending the full length of the SCR/AMOx catalyst.

Embodiment 8

The system of any preceding embodiment, wherein the first SCR catalyst comprises a vanadium component.

Embodiment 9

The system of any preceding embodiment, wherein the first SCR catalyst comprises copper-promoted molecular sieves.

Embodiment 10

The system of any preceding embodiment, wherein the first SCR catalyst comprises Cu-CHA.

Embodiment 11

The system of any preceding embodiment, further comprising a dual injector system, comprising a first injector adapted for the addition of a first reductant to the exhaust gas stream upstream of the first SCR catalyst and a second injector adapted for the addition of a second reductant to the exhaust gas stream upstream of the second SCR catalyst.

Embodiment 12

The system of any preceding embodiment, wherein the first and second reductants comprise ammonia or an ammonia precursor.

Embodiment 13

The system of any preceding embodiment, wherein the CSF comprises one or more washcoats on a wall flow filter, and wherein the one or more washcoats comprise platinum and palladium.

Embodiment 14

The system of the preceding embodiment, wherein the platinum and palladium in the one or more washcoats of the CSF are supported on alumina and are present in a ratio of about 4:1 Pt:Pd.

Embodiment 15

The system of any preceding embodiment, wherein the DOC comprises one or more washcoats on a flow-through substrate having an upstream inlet end and a downstream outlet end, and wherein the one or more washcoats comprise platinum and palladium on alumina.

Embodiment 16

The system of the preceding embodiment, wherein the DOC comprises: a first washcoat coated from the upstream inlet end comprising platinum and palladium on alumina, extending less than a full length of the flow-through substrate, with a platinum:palladium ratio of about 1:1; and a second washcoat coated from the downstream outlet end comprising platinum and palladium on alumina, extending less than the full length of the flow-through substrate, with a platinum:palladium ratio of greater than 2:1.

Embodiment 17

The system of any preceding embodiment, wherein the DOC is associated with the CSF, in the form of a zoned DOC/CSF having an upstream inlet end and a downstream outlet end, wherein the DOC is at the upstream inlet end and extends less than a full length of the CSF.

Embodiment 18

The system of any preceding embodiment, wherein the zoned DOC/CSF is in the form of two or more washcoats on a wall flow filter, comprising: a first washcoat extending a full length of the wall flow filter comprising platinum and palladium on alumina, with a platinum:palladium ratio of greater than 5:1, and a second washcoat extending from the upstream inlet end less than the full length of the wall flow filter, comprising platinum and palladium on alumina, with a platinum:palladium ratio of greater than 5:1 and a loading of about 50 g/ft$^3$ or greater.

Embodiment 19

The system of any preceding embodiment, wherein the first AMOx catalyst is in fluid communication with and downstream of the second SCR catalyst, and wherein the first AMOx catalyst is integrated with a third SCR catalyst.

Embodiment 20

The system of any preceding embodiment, wherein the second SCR catalyst has an upstream inlet end and a downstream outlet end, and comprises an iron-promoted molecular sieve extending from the inlet end to less than a full length of the SCR catalyst and comprises a copper-promoted molecular sieve extending from the outlet end to less than the full length of the SCR catalyst.

Embodiment 21

The system of the preceding embodiment, wherein the iron-promoted molecular sieve is Fe-CHA and the copper-promoted molecular sieve is Cu-CHA.

Embodiment 22

The system of any preceding embodiment, wherein the engine is a lean burn engine.

Embodiment 23

The system of any preceding embodiment, wherein the engine is a diesel engine.

Embodiment 24

A method of treating an exhaust gas stream, comprising contacting the exhaust gas stream with the system of any preceding embodiment such that nitrogen oxides (NOx) in the exhaust gas stream are reduced.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

Figure 1:
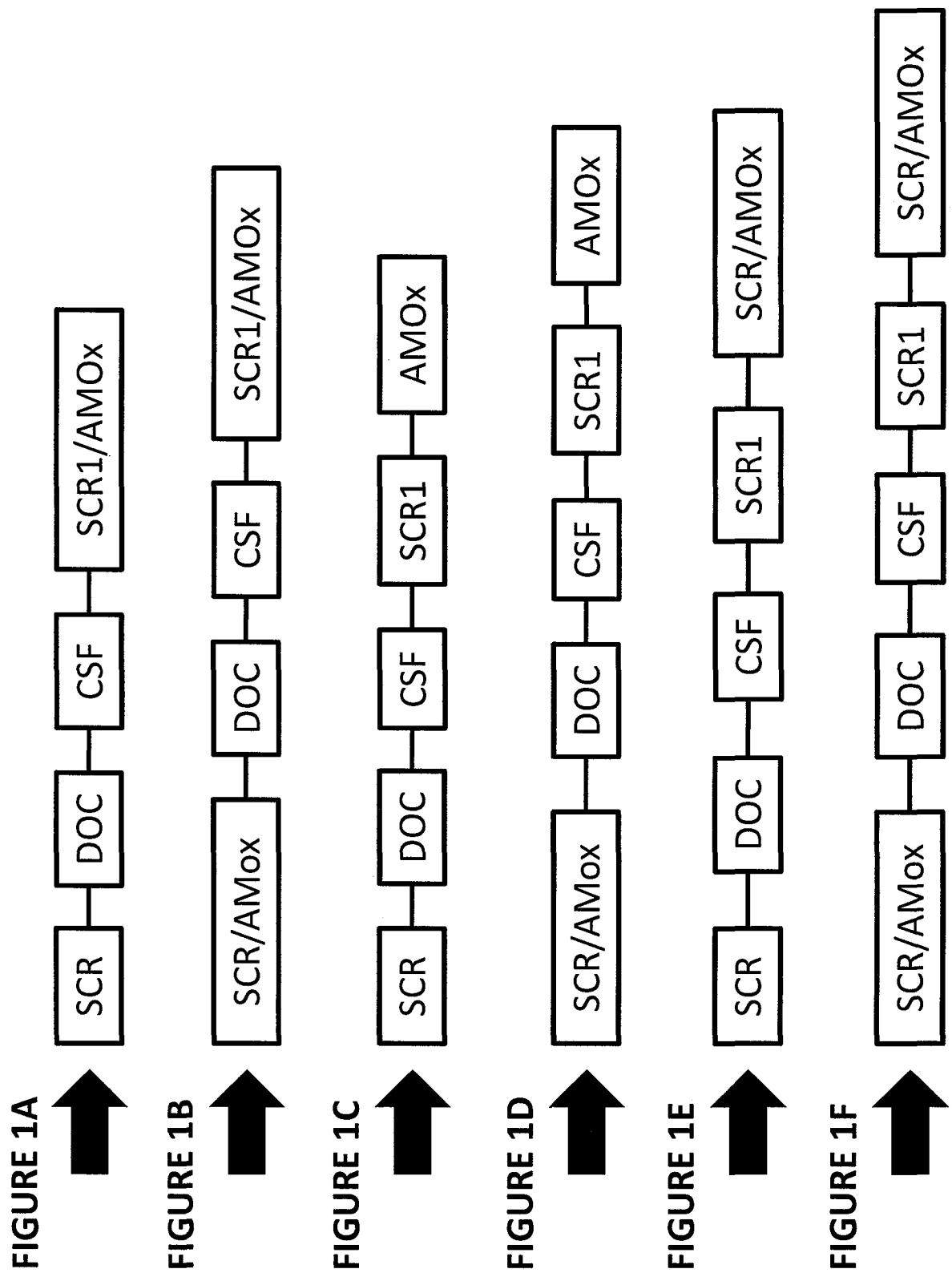
FIGS. 1A, 1B, 1C, 1D, 1E, and IF are exemplary exhaust gas treatment system configurations contemplated by the present disclosure.

Before describing several exemplary embodiments of the invention, it is to be understood that the invention is not limited to the details of construction or process steps set forth in the following description. The invention is capable of other embodiments and of being practiced or being carried out in various ways. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The articles "a" and "an" are used herein to refer to one or to more than one (i.e., to at least one) of the grammatical object of the article. Any ranges cited herein are inclusive. The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

With respect to the terms used in this disclosure, the following definitions are provided.

The term "catalyst" or "catalyst material" or "catalytic material" refer to a material that promotes a reaction.

As used herein, the term "catalytic article" refers to an element that is used to promote a desired reaction. For example, a catalytic article may comprise a washcoat containing a catalytic species, e.g., a catalyst composition, on a substrate, e.g., a honeycomb substrate.

The term "washcoat" has its usual meaning in the art of a thin, adherent coating of a catalytic or other material applied to a carrier substrate material, such as a honeycomb-type carrier member, which is sufficiently porous to permit the passage of the gas stream being treated. As is understood in the art, a washcoat is obtained from a dispersion of particles in slurry, which is applied to a substrate, dried, and calcined to provide the porous washcoat.

As used herein, the term "stream" broadly refers to any combination of flowing gas that may contain solid or liquid particulate matter. The term "gaseous stream" or "exhaust gas stream" means a stream of gaseous constituents, such as the exhaust of an engine, which may contain entrained non-gaseous components such as liquid droplets, solid particulates, and the like. The exhaust gas stream of an engine typically further comprises combustion products, products of incomplete combustion, oxides of nitrogen, combustible and/or carbonaceous particulate matter (soot), and un-reacted oxygen and nitrogen.

As used herein, the terms "layer" and "layered" refer to a structure that is supported on a surface, e.g. a substrate.

"Substantially" refers to an amount of at least about 90%, e.g., at least about 95%, at least about 98%, at least about 99%, or at least about 99.5%.

A platinum group metal (PGM) component refers to any compound that includes a PGM, more specifically, Pt, Pd, and/or Rh. For example, in certain embodiments, the PGM may be substantially (e.g., at least about 90% by weight) or wholly in metallic form (zero valance), or the PGM may be in an oxide form. Reference to PGM component allows for the presence of the PGM in any valance state.

"BET surface area" has its usual meaning, referring to the Brunauer-Emmett-Teller method for determining surface area by $N_2$-adsorption measurements. Unless otherwise stated, "surface area" refers to BET surface area.

"Support" in a catalytic material or catalyst washcoat refers to a material that receives a catalyst (including, for example, precious metals, stabilizers, promoters, binders, and the like) through precipitation, association, dispersion, impregnation, or other suitable methods.

"Refractory metal oxide supports" are exemplary types of supports that can be used according to the present disclosure, and include bulk alumina, ceria, zirconia, titania, silica, magnesia, neodymia, and other materials known for such use. Such materials are considered as providing durability to the resulting catalyst article.

As used herein, the term "molecular sieves," such as zeolites and other zeolitic framework materials (e.g. isomorphously substituted materials), refers to materials which may, in particulate form, support certain catalytic materials, e.g., platinum group metals. Molecular sieves are materials based on an extensive three-dimensional network of oxygen ions containing generally tetrahedral type sites and having a substantially uniform pore distribution. Exemplary molecular sieves useful herein are microporous materials, with an average pore size being no larger than 20 Å. The pore sizes of molecular sieves are defined by the ring size.

As used herein, the term "zeolite" refers to a specific example of a molecular sieve, which includes silicon and aluminum atoms. Zeolites are crystalline materials having rather uniform pore sizes which, depending upon the type of zeolite and the type and amount of cations included in the zeolite lattice, range from about 3 to 10 Angstroms in diameter. Zeolites generally comprise silica to alumina (SAR) molar ratios of 2 or greater.

The phrase "8-ring" zeolites refers to zeolites having 8-ring pore openings and double-six ring secondary building units and having a cage-like structure resulting from the connection of double six-ring (d6r) building units by 4 rings (s4r). Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, one group of zeolites has a single 4-ring (s4r) composite building unit in its framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

The term "high surface area refractory metal oxide supports" refers specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of 60 square meters per gram ($m^2/g$), often up to about 200 $m^2/g$ or higher. Such activated alumina is usually a mixture of the gamma and delta phases of alumina, but may also contain substantial amounts of eta, kappa and theta alumina phases.

"Rare earth metal oxides" refers to one or more oxides of scandium, yttrium, and the lanthanum series, as defined in the Periodic Table of Elements. Rare earth metal oxides can be exemplary oxygen storage components and/or promoter materials. Examples of suitable oxygen storage components include ceria, praseodymia, or combinations thereof. Delivery of ceria can be achieved by the use of, for example, ceria, a mixed oxide of cerium and zirconium, and/or a mixed oxide of cerium, zirconium, and other rare earth element(s). Suitable promoters include one or more non-reducible oxides of one or more rare earth metals selected from the group consisting of lanthanum, tungsten, cerium, neodymium, gadolinium, yttrium, praseodymium, samarium, hafnium, and mixtures thereof.

"Alkaline earth metal oxides" refers to Group II metal oxides, which are exemplary stabilizer materials. Suitable stabilizers include, but are not limited to, non-reducible metal oxides wherein the metal is selected from the group consisting of barium, calcium, magnesium, strontium and mixtures thereof. In certain embodiments, the stabilizer comprises one or more oxides of barium and/or strontium.

A "washcoat" is a thin, adherent coating of a catalytic or other material applied to a refractory substrate, such as a honeycomb flow-through monolith substrate or a filter substrate, which is sufficiently porous to permit the passage therethrough of a gas stream being treated. A "washcoat layer," therefore, is defined as a coating that comprises support particles. A "catalyzed washcoat layer" is a coating comprised of support particles impregnated with catalytic components.

A "monolithic substrate" is a unitary structure that is homogeneous and continuous and has not been formed by affixing separate substrate pieces together.

"Selective Catalytic Reduction" (SCR) uses catalytic reduction of nitrogen oxides with a reductant in the presence of an appropriate amount of oxygen. Reductants may be, for example, hydrocarbon, hydrogen, urea and/or ammonia. For example, SCR reactions in the presence of ammonia occur with the formation predominantly of nitrogen and steam according to the following two reactions:

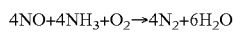
$4NO+4NH_3+O_2 \rightarrow 4N_2+6H_2O$

$NO+NO_2+2NH_3 \rightarrow 2N_2+3H_2O.$

"AMOx" refers to an ammonia oxidation catalyst, which is a catalyst containing one or more metals suitable to convert excess ammonia in the exhaust system into nitrogen ($N_2$), and which is generally supported on a support material.

Exhaust Gas Treatment Systems

As noted above, in one embodiment, the disclosure provides a combination of two or more catalysts and, in particular, a combination of an upstream SCR or SCR/AMOx catalyst with one or more of a diesel oxidation catalyst (DOC), catalyzed soot filter (CSF), additional SCR catalyst, and/or additional AMOx catalyst. "Downstream," as generally employed herein, refers to the relative positioning of two or more components in a system with respect to one another, and describes such positioning by means of the typical gas flow direction through the system (i.e., a gas flow contacts a "downstream" component after it contacts an "upstream" component).

In certain exemplary embodiments, the exhaust gas treatment systems are represented by the configurations shown in FIGS. 1A-1D. In these figures, an exhaust gas stream containing gaseous pollutants (e.g., particulate matter, unburned hydrocarbons, carbon monoxide, nitrogen oxides) is represented by the black arrow, and as shown, directly enters an upstream SCR or SCR/AMOx catalyst. In some embodiments, the upstream SCR or upstream SCR/AMOx is in an underfloor position.

In certain preferred embodiments, the upstream SCR or upstream SCR/AMOx catalyst is in a "close-coupled" position. In the context of these systems, "close-coupled" positions are understood as generally intended in the art, i.e., being closer to the engine than in traditional "underfloor" positions (which are beneath the floor of a vehicle). Generally, although not limited thereto, such "close-coupled" positions are within the engine compartment, i.e., beneath the hood of a vehicle, and adjacent to the exhaust manifold and, in such a position, close-coupled catalysts are commonly exposed to high temperature exhaust gas immediately exiting the engine after the engine has warmed up (and thus often serve to reduce hydrocarbon emissions during cold start, i.e., the period immediately following starting the engine from ambient conditions). In various embodiments herein, the term "close-coupled" used to describe the upstream SCR or upstream SCR/AMOx means mounted close enough to the engine so as to leave enough space for, e.g., urea injection, fuel injection for active regeneration, etc. and, in some embodiments, to leave enough space for a truly close-coupled DOC (which may require, e.g., a smaller SCR or SCR/AMOx to ensure sufficient space availability on the vehicle). The upstream SCR or upstream SCR AMOx catalyst in the disclosed emission treatment systems is generally mounted just upstream of a DOC or zoned CSF.

Although the components are shown as individual components, it is to be understood that, in some embodiments, adjacent catalysts can be combined on a single substrate (e.g., the DOC can, in come embodiments, be associated with the CSF). In addition to the upstream SCR or upstream SCR/AMOx catalyst, the exhaust gas treatment systems of the invention may comprise one or more downstream SCR catalysts or downstream SCR/AMOx catalysts to further reduce NOx emissions, as illustrated in FIG. 1. Though not explicitly shown in FIG. 1, it is to be understood that typically reductant injectors are positioned just upstream (i.e., near the inlet) of the SCR or SCR/AMOx catalysts. In embodiments where an SCR and an SCR/AMOx catalysts are integrated (e.g., combined on a single substrate), a single reductant injector may suffice for the integrated catalyst components.

FIG. 1A depicts a first/upstream SCR catalyst, followed by a downstream diesel oxidation catalyst (DOC), a downstream catalyzed soot filter (CSF), and a downstream SCR/AMOx catalyst. FIG. 1B depicts a first/upstream SCR/AMOx catalyst, followed by a downstream diesel oxidation catalyst (DOC), a downstream catalyzed soot filter (CSF), and a second, downstream SCR/AMOx catalyst. FIG. 1C depicts a first/upstream SCR catalyst, followed by a downstream diesel oxidation catalyst (DOC), a downstream catalyzed soot filter (CSF), a second, downstream SCR catalyst, and a downstream AMOx catalyst. FIG. 1D depicts a first/upstream SCR/AMOx catalyst, followed by a downstream diesel oxidation catalyst (DOC), a downstream catalyzed soot filter (CSF), a downstream SCR catalyst, and a downstream AMOx catalyst. FIG. 1E depicts a first/upstream SCR catalyst, followed by a downstream diesel oxidation catalyst (DOC), a downstream catalyzed soot filter (CSF), a downstream SCR catalyst, and a downstream SCR/AMOx catalyst. FIG. 1F depicts a first/upstream SCR/AMOx catalyst, followed by a downstream diesel oxidation catalyst (DOC), a downstream catalyzed soot filter (CSF), a downstream SCR catalyst, and a downstream SCR/AMOx catalyst. The upstream SCR catalysts and upstream SCR/AMOx catalysts in the systems depicted in these figures can be in a close-coupled or under-floor position.

Such catalysts within the disclosed exhaust gas treatment systems can be on separate substrates, or can be provided on a single substrate (e.g., in a zoned configuration). The catalyst compositions suitable for serving the desired purpose(s) can vary, as disclosed generally herein below.

Upstream SCR (or SCR/AMOx) Catalyst

As referenced herein above, the disclosed systems generally comprise an SCR catalyst or an SCR/AMOx catalyst (referred to herein as the "upstream" SCR or SCR/AMOx catalyst). The upstream SCR or SCR/AMOx catalyst typically is positioned so as to receive an exhaust gas stream from the engine with no intervening catalyst therebetween. In some embodiments, the upstream SCR catalyst or SCR/AMOx catalyst is in an underfloor position (referred to herein as a "uf-SCR" or "uf-SCR/AMOx"). In some embodiments, the upstream SCR catalyst or SCR/AMOx catalyst is in a close-coupled position (referred to herein as a "cc-SCR" catalyst or "cc-SCR/AMOx" catalyst). As used herein, the term "selective catalytic reduction" (SCR) refers to the catalytic process of reducing oxides of nitrogen to dinitrogen ($N_2$) using a nitrogenous reductant. As used herein, the terms "nitrogen oxides" and "$NO_x$" designate the oxides of nitrogen.

The composition of the upstream SCR or SCR/AMOx catalyst can vary, as described herein below. Further, exemplary SCR and SCR/AMOx catalyst compositions are described in U.S. Pat. No. 4,961,917 to Byrne and U.S. Pat. No. 5,516,497 to Speronello et al., which are incorporated herein by reference in their entirety. The SCR catalyst can comprise, for example, one or more metal oxide (e.g., a mixed oxide), a molecular sieve (e.g., a metal-promoted molecular sieve), or combinations thereof.

In some embodiments, the upstream SCR catalyst comprises one or more molecular sieve materials. In some embodiments, the SCR catalytic material comprises 8-member ring small pore molecular sieves containing a metal promoter. As used herein, "small pore" refers to pore openings which are smaller than about 5 Angstroms (e.g., about 2-5 Å, about 2-4 Å, about 3-5 Å, or about 3-4 Å, for example on the order of ~3.8 Angstroms. One specific 8-member ring small pore molecular sieve is an 8-member ring small pore zeolite.

In some embodiments, the SCR catalytic material comprises a zeolite comprising a d6r unit. Thus, in one or more embodiments, the SCR catalytic material comprises a zeolite having a structure type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In certain specific embodiments, the SCR catalytic material comprises a zeolite with a structure type selected from the group consisting of CHA, AEI, AFX, ERI, KFI, LEV, and combinations thereof. In still further specific embodiments, the SCR catalytic material comprises a zeolite with a structure type selected from CHA and AEI. In one or more very specific embodiments, the SCR catalytic material comprises a zeolite with the CHA structure type.

In certain embodiments, the SCR catalytic material comprises zeolitic chabazite, which is a naturally occurring tectosilicate mineral of a zeolite group with an approximate formula represented by $(Ca,Na_2,K_2,Mg)Al_2Si_4O_{12} \cdot 6H_2O$ (e.g., hydrated calcium aluminum silicate). Three synthetic forms of zeolitic chabazite that may find use in the SCR catalysts disclosed herein are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181 to Milton, which are all hereby incorporated by reference. Synthesis of another synthetic form of zeolitic chabazite, SSZ-13, is described in U.S. Pat. No. 4,544,538 to Zones, which is hereby incorporated by reference. A method of making yet another synthetic molecular sieve having chabazite structure, SAPO-44, is described in U.S. Pat. No. 6,162,415 to Liu et al., which is hereby incorporated by reference.

The ratio of silica to alumina in molecular sieves useful as SCR catalytic materials can vary over a wide range. In one or more embodiments, molecular sieves useful as SCR catalytic materials have a silica to alumina molar ratio (SAR) in the range of 2 to 300, including 5 to 250; 5 to 200; 5 to 100; and 5 to 50. In one or more specific embodiments, the molecular sieve has a silica to alumina molar ratio (SAR) in the range of 10 to 200, 10 to 100, 10 to 75, 10 to 60, 10 to 50, 15 to 100, 15 to 75, 15 to 60, 15 to 50, 20 to 100, 20 to 75, 20 to 60, and 20 to 50. In more specific embodiments, with regard to the molecular sieve having any of the immediately preceding SAR ranges, the spherical particle of the molecular sieve has a particle size d50 in the range of about 1.0 to about 5 microns, and more specifically, about 1.0 to about 3.5 microns, and the individual crystals of a molecular sieve component have a crystal size in the range of about 100 to about 250 nm.

Metal-promoted zeolite catalysts including, among others, iron-promoted and copper-promoted zeolite catalysts, for the selective catalytic reduction of nitrogen oxides with ammonia are also suitable. The promoter metal may be selected from Cu, Fe, Co, Ni, La, Ce, Mn, V, Ag, and combinations thereof. In specific embodiments, the promoter metal is Cu, Fe, or combinations thereof. Metal-promoted, particularly copper promoted aluminosilicate zeolites having the CHA structure type and a silica to alumina molar ratio greater than 1, have recently solicited a high degree of interest as catalysts for the SCR of oxides of nitrogen in lean burning engines using nitrogenous reductants. The promoter metal content in such catalysts, calculated as the oxide, is, in one or more embodiments, at least about 0.1 wt. %, reported on a volatile-free basis. In specific embodiments, the promoter metal comprises Cu, and the Cu content, calculated as CuO is in the range of up to about 10 wt. %, including 9, 8, 7, 6, 5, 4, 3, 2, 1, 0.5, and 0.1 wt. %, in each case based on the total weight of the calcined zeolite component reported on a volatile free basis. In specific embodiments, the Cu content, calculated as CuO, is in the range of about 1 to about 4 wt. %.

Another exemplary molecular sieve that can be useful as an SCR catalytic material is an aluminophosphate. Types of aluminophosphates include: silicoaluminophosphate (SAPO), metallic aluminophosphate (MeAPO), and metallic silicoaluminophosphate (MeSAPO). Synthesis of a synthetic form of an exemplary aluminophosphate molecular sieve, silicoaluminophosphate 34 (SAPO-34), is described in U.S. Pat. No. 4,440,871 to Lok et al. and U.S. Pat. No. 7,264,789 to Van Den et al., which are hereby incorporated by reference. A method of making yet another synthetic molecular sieve, SAPO-44, is described in U.S. Pat. No. 6,162,415 to Liu et al., which is hereby incorporated by reference.

In some embodiments, the upstream SCR catalyst of the disclosed exhaust treatment system comprises a metal oxide, e.g., a mixed oxide. As used herein, the term "mixed oxide" refers to an oxide that contains cations of more than one chemical element or cations of a single element in several states of oxidation. Mixed oxides that are suitable as SCR catalysts, in some embodiments, include Fe/titania (e g FeTiO$_3$), Fe/alumina (e g FeAl$_2$O$_3$), Mg/titania (e g MgTiO$_3$), Mg/alumina (e g MgAl$_2$O$_3$), Mn/alumina, Mn/titania (e.g. MnO$_x$/TiO$_2$) (e.g. MnO$_x$/Al$_2$O$_3$), Cu/titania (e g CuTiO$_3$), Ce/Zr (e.g. CeZrO$_2$), Ti/Zr (e.g. TiZrO$_2$), and mixtures thereof. For further examples of mixed oxides as SCR catalysts, see U.S. Patent Application Publication No. 2001/0049339 to Schafer-Sindelindger et al. and U.S. Pat. No. 4,518,710 to Brennan et al., U.S. Pat. No. 5,137,855 to Hegedus et al., U.S. Pat. No. 5,476,828 to Kapteijn et al., U.S. Pat. No. 8,685,882 to Hong et al., and U.S. Pat. No. 9,101,908 to Jurng et al., which all incorporated by reference herein in their entireties.

In some embodiments, the upstream SCR catalyst comprises one or more vanadium-containing components. Such compositions are generally referred to herein as "vanadia-based compositions." In such embodiments, the vanadium can be in various forms, e.g., including but not limited to, free vanadium, vanadium ion, or vanadium oxides (vanadia), such as vanadium pentoxide (V$_2$O$_5$). As used herein, "vanadia" or "vanadium oxide" is intended to cover any oxide of vanadium, including vanadium pentoxide. In certain embodiments, a vanadia-based composition comprises a mixed oxide comprising vanadia. The amount of vanadia in the mixed oxide can vary and, in some embodiments, ranges from about 1 to about 10 percent by weight based on the total weight of the mixed oxide. For example, the amount of vanadia can be at least 1 percent, at least 2 percent, at least 3 percent, at least 4 percent, at least 5 percent, or at least 6 percent, with an upper limit of about 10 percent by weight or no more than 10 percent, no more than 9 percent, no more than 8 percent, no more than 7 percent, no more than 6 percent, no more than 5 percent, or no more than 4 percent, with a lower limit of about 1 percent by weight.

Certain useful SCR compositions comprising vanadium supported on a refractory metal oxide such as alumina, silica, zirconia, titania, ceria, and combinations thereof are described in U.S. Pat. No. 4,010,238 to Shiraishi et al. and U.S. Pat. No. 4,085,193 to Nakajima et al., as well as in U.S. Patent Application Publication No. 2017/0341026 to Chen et al., which are incorporated by reference herein in their entireties. In specific embodiments, the upstream SCR catalyst comprises a mixed oxide comprising vanadia/titania (V$_2$O$_5$/TiO$_2$), e.g., in the form of titania onto which vanadia has been dispersed. The vanadia/titania can optionally be activated or stabilized with tungsten (e.g., WO$_3$) to provide V$_2$O$_5$/TiO$_2$/WO$_3$, e.g., in the form of titania onto which V$_2$O$_5$ and WO$_3$ have been dispersed. It is noted that, in some embodiments, the vanadia is not truly in the form of a mixed metal oxide; rather, the metal oxide components (e.g., titania and vanadia) may be present as discrete particles. The amount of tungsten in such embodiments can vary and can range, e.g., from about 0.5 to about 10 percent by weight based on the total weight of the mixed oxide. For example, the amount of tungsten can be at least 0.5 percent, at least 1 percent, at least 2 percent, at least 3 percent, at least 4 percent, at least 5 percent, or at least 6 percent, with an upper limit of about 10 percent by weight or no more than 10 percent, no more than 9 percent, no more than 8 percent, no more than 7 percent, no more than 6 percent, no more than 5 percent, or no more than 4 percent, with a lower limit of about 0.5 percent by weight.

Exemplary vanadia-based SCR compositions can comprise components including, but not limited to, V$_2$O$_5$/TiO$_2$, V$_2$O$_5$/WO$_3$/TiO$_2$, V$_2$O$_5$/WO$_3$/TiO$_2$/SiO$_2$, or combinations thereof. Additional vanadium-containing SCR catalyst compositions are described, for example, in U.S. Pat. No. 4,782,039 to Lindsey and U.S. Pat. No. 8,975,206 to Schermanz et al., as well as International Application Publication No. WO2010/121280 to Schermanz et al. which are incorporated herein by reference in their entireties.

Certain vanadia-based SCR compositions can comprise other active components (e.g., other metal oxides). For example, in some embodiments, vanadia-based SCR compositions suitable for use in the disclosed systems comprise vanadia and antimony. Such a vanadia-based SCR composition, in certain embodiments, comprises a composite oxide comprising vanadium and antimony, which can be supported on a refractory metal oxide (e.g., TiO$_2$, SiO$_2$, WO$_3$, Al$_2$O$_3$, ZrO$_2$, or a combination thereof). Exemplary vanadia-based SCR compositions comprising vanadia and antimony are disclosed in U.S. Pat. No. 4,221,768 to Inoue et al.; International Application Publication No. WO2017/101449 to Zhao et al.; and International Application Nos. PCT/CN2016/113637, filed Dec. 30, 2016; PCT/CN2015/076895, filed Apr. 17, 2015, and PCT/CN2015/097704, filed Dec. 17, 2015, all of which are incorporated herein by reference in their entireties.

In some embodiments, the upstream SCR catalyst advantageously comprises a vanadia-based composition, as it has been found that such compositions may demonstrate lower intrinsic N$_2$O make than, e.g., Cu-based SCR compositions. In certain embodiments, the upstream SCR catalyst comprises a mixture of a vanadium-based SCR composition and a molecular sieve.

The upstream SCR catalyst can, in some embodiments, be in the form of an integrated SCR/AMOx catalyst. Ammonia oxidation (AMOx) generally refers to a process in which NH$_3$ is reacted with oxygen to produce NO, NO$_2$, N$_2$O, or preferably N$_2$. Exemplary SCR/AMOx catalysts are described, for example, in U.S. Pat. No. 8,524,185 to Caudle et al., U.S. Pat. No. 8,283,182 to Boorse et al., and U.S. Pat. No. 5,516,497 to Speronello et al., which are incorporated herein by reference. Suitable SCR/AMOx catalysts may be zoned or layered, such that the SCR catalyst and the AMOx catalyst are at least partially separated. For example, in certain embodiments, an SCR/AMOx catalyst is provided wherein the SCR catalyst is on a substrate having an inlet end and an outlet end, wherein the SCR catalyst is located at the inlet (upstream) end and the AMOx catalyst is located at the outlet (downstream) end. In other embodiments, the SCR/AMOx catalyst may comprise a bottom coat comprising an AMOx catalyst and a top coat with SCR functionality. In some embodiments, the AMOx catalyst composition extends less than the full length of the SCR/AMOx catalyst, and the SCR catalyst composition extends the full length of the SCR/AMOx catalyst (e.g., as the top washcoat). These relative positions advantageously allow the AMOx catalyst to remove slipped ammonia from the SCR catalyst.

The composition of the AMOx catalyst is not particularly limited, and various compositions known to be suitable for this purpose can be employed in the context of the disclosed exhaust gas treatment systems. According to one or more embodiments, the AMOx catalyst is a supported precious metal component which is effective to remove ammonia from the exhaust gas stream. In one or more embodiments, the precious metal component includes ruthenium, rhodium, iridium, palladium, platinum, silver or gold. In specific embodiments, the precious metal component includes physical mixtures and chemical and atomically-doped combinations of ruthenium, rhodium, iridium, palladium, platinum, silver and gold. In specific embodiments, the AMOx catalyst comprises a platinum group metal such as platinum, palladium, rhodium, or combinations thereof. In a more specific embodiment, the AMOx catalyst comprises platinum.

The precious metal of the AMOx catalyst is typically supported, e.g., on a high surface area refractory metal oxide support. Examples of suitable high surface area refractory metal oxides include, but are not limited to, alumina, silica, titania, ceria, and zirconia, as well as physical mixtures, chemical combinations and/or atomically-doped combinations thereof. In specific embodiments, the refractory metal oxide may contain a mixed oxide such as silica-alumina, amorphous or crystalline aluminosilicates, alumina-zirconia, alumina-lanthana, alumina-chromia, alumina-baria, alumina-ceria, and the like. An exemplary refractory metal oxide comprises high surface area γ-alumina having a specific surface area of about 50 to about 300 $m^2/g$.

The AMOx catalyst may optionally include a zeolitic or non-zeolitic molecular sieve, which may have any one of the framework structures listed above with respect to the upstream SCR catalyst. Framework structures suitable for inclusion within an AMOx catalyst include, but are not limited to those of the CHA, FAU, BEA, MFI, and MOR types. In one embodiment, a molecular sieve component may be physically mixed with an oxide-supported platinum component. In an alternative embodiment, platinum may be distributed on the external surface or in the channels, cavities, or cages of the molecular sieve.

Although the foregoing refers to an AMOx catalyst in the context of an integrated SCR/AMOx catalyst, it is noted that, in other embodiments, the AMOx catalyst can be separate from the upstream SCR catalyst, e.g., such that the system comprises an upstream SCR catalyst with an AMOx catalyst immediately downstream therefrom (rather than integrated therewith).

Downstream DOC

In the disclosed exhaust gas treatment systems, a DOC is typically located directly adjacent to (and directly downstream of) the upstream SCR or SCR/AMOx catalyst, such that the exhaust gas leaving the upstream SCR is routed directly to the DOC. A DOC is generally provided for oxidative removal of carbon monoxide (CO), gaseous hydrocarbons (HC), and any volatile organic fraction (VOC) present in the exhaust gas stream. The composition of the DOC is not particularly limited, and various compositions known to be suitable for this purpose can be employed in the context of the disclosed exhaust gas treatment systems. DOC compositions are well known in the art and may comprise, e.g., one or more platinum group metals (PGMs) and optionally, one or more base metals. Typically, DOCs comprise platinum and/or palladium. One of skill in the art can readily understand useful catalytic amounts of PGMs to incorporate within these catalyst compositions.

In some such embodiments, the DOC can advantageously be zoned, e.g., so as to localize Pt in a front (upstream) zone and Pd in a back (downstream) zone, although other embodiments provide such zones in the reverse configuration. In one particular embodiment, the DOC comprises an upstream zone with lower Pt/Pd ratio, designed for light-off function and/or for initiating active regeneration and a downstream NO to $NO_2$ oxidation zone with a higher Pt/Pd ratio. In one embodiment, the DOC comprises an upstream zone comprising platinum and palladium on alumina (e g, having about a 1:1 ratio), with a high metal loading (e.g., at least about 50 $g/ft^3$) and a downstream zone comprising platinum and palladium on alumina with a higher platinum content (e.g., having about a 5:1 Pt:Pd ratio) with a comparatively lower metal loading (e.g., about 20-24 gift). Exemplary DOC compositions suitable for use in the disclosed systems are described, for example, in U.S. Pat. No. 7,078,004 to Voss et al. and U.S. Pat. No. 9,333,490 to Kazi et al., and International Patent Application Publication Nos. WO2018/025208, WO2018/0029016, and WO2017/216728, all to Sung et al., WO2017/019958 to Dumbuya et al., and WO2009/074308 to Gerlach, which are incorporated herein by reference.

Downstream CSF

A CSF is an article generally comprising a catalyst deposited onto a soot filter. Typically, the catalyst of the CSF is effective for burning off trapped soot and/or oxidizing exhaust gas stream emissions. In general, the soot burning catalyst can be any known catalyst for combustion of soot. For example, the CSF can be coated with one or more high surface area refractory oxides (e.g., an aluminum oxide or ceria-zirconia) for the combustion of unburned hydrocarbons and, to some degree, particulate matter. The soot burning catalyst can be, e.g., an oxidation catalyst comprising one or more precious metal (PM) catalysts (platinum, palladium, and/or rhodium) to promote NO to $NO_2$ oxidation. In certain embodiments, the catalyst of the CSF comprises platinum and palladium on a refractory metal oxide support (e.g., alumina) In one exemplary embodiment, the CSF comprises a washcoat comprising platinum and palladium supported on alumina in a 4:1 ratio with a loading of about 4 $g/ft^3$ on the filter substrate. The soot filter may be made of any suitable refractory material for substrates, as outlined herein below. The filter is advantageously a wall flow filter, defined as a flow-through substrate in which the exhaust gas in different parts of the substrate may communicate through the walls of the passages.

In certain embodiments, the DOC referenced above and the downstream CSF are combined on a single substrate to provide a catalyst composite DOC/CSF (also commonly referred to as a "zoned CSF." In such embodiments, the CSF can be, for example, a zoned catalyst composite, comprising both a DOC catalyst effective for oxidative removal of carbon monoxide (CO), gaseous hydrocarbons (HC), and any volatile organic fraction (VOC) present in the exhaust gas stream and a catalyst effective for burning soot/particulate matter, the catalysts deposited on a wall flow filter. One exemplary DOC/CSF system comprises one or more components suitable for light-off and burning of injected fuel for active regeneration. For example, the DOC/CSF can be designed with an inlet zone having a fuel-light off function typically associated with certain DOC compositions (as referenced above) by providing a DOC coating, as described above, on the inlet of the CSF, which has, e.g., a full-length alumina-supported Pt/Pd layer thereon for NO to $NO_2$ oxidation, to promote passive soot combustion in the filter and provide outlet $NO_2$ to promote NOx reduction reaction on the downstream SCR1 catalyst. Additional DOC/CSF systems that are suitable for use with this invention include those described in U.S. Pat. No. 8,800,268 to Voss, et al., and U.S. Pat. No. 8,858,904 to Punke et al., which are incorporated herein by reference in their entireties.

Downstream SCR (SCR1)

The downstream SCR catalyst in certain exhaust gas treatment systems disclosed herein can comprise any catalyst material suitable for NOx conversion, e.g., as described above with respect to the upstream SCR catalyst. In certain preferred embodiments, the downstream SCR comprises a metal-promoted molecular sieve, e.g., including, but not limited to, Cu-CHA and/or Fe-CHA. In certain embodiments, the downstream SCR catalyst comprises pure Cu-CHA, pure Fe-CHA, or mixtures of Cu-CHA and Fe-CHA in the same washcoat. If desired, the downstream SCR catalyst may comprise Fe-CHA layered on top of Cu-CHA. In one particular embodiment, the downstream SCR is zoned with two or more catalyst compositions. For example, the downstream SCR can be provided as a catalyst composite, comprising a catalytic coating, wherein the catalytic coating comprises an inlet zone containing Fe-CHA and an outlet zone containing Cu-CHA. If desired, Fe-Beta zeolite may be used in the place of the Fe-CHA in the above-mentioned downstream SCR catalysts, but this invention recognizes that Fe-Beta zeolite may be more susceptible to hydrocarbon absorption than CHA, due to its smaller structural ring size.

Downstream AMOx

The downstream AMOx catalyst in certain exhaust gas treatment systems disclosed herein can have the same composition or a different composition than the AMOx component of the optional upstream integrated SCR/AMOx catalyst. Again, any composition suitable for promoting the reaction of $NH_3$ with oxygen to produce NO, $NO_2$, $N_2O$, or preferably $N_2$ can be used at this position. In certain preferred embodiments, the downstream AMOx comprises platinum on alumina.

In some embodiments, this downstream AMOx is in the form of an integrated SCR/AMOx catalyst. The downstream AMOx can, in certain embodiments, be combined with SCR1 referenced above, such that the exhaust gas stream exiting the DOC flows to an integrated SCR/AMOx catalyst comprising the SCR1 catalyst and an AMOx catalyst. See, e.g., the exhaust gas treatment system configurations in FIGS. 1A and 1B.

In certain exemplary embodiments, a downstream SCR/AMOx catalyst suitable for use in the exhaust gas treatment systems of the invention comprises a bottom coat comprising platinum on alumina and a top coat comprising Cu-CHA, Fe-CHA, or mixtures thereof. This invention also contemplates zoned SCR/AMOx catalysts comprising a rear AMOx zone and a full length SCR topcoat. Yet another exemplary configuration comprises an inlet SCR-only zone and a rear AMOX zone, all within the same topcoat. The dry gain of the SCR topcoat may vary, and in certain embodiments ranges from 0.8 g/in$^3$ to 3 g/in$^3$. In some embodiments, the downstream AMOx is, instead, combined with an additional SCR catalyst, such that the exhaust gas stream exiting the DOC flows to the SCR1 catalyst, and then from the SCR1 catalyst to an integrated SCR/AMOx catalyst. See, e.g., the exhaust gas treatment system configurations in FIGS. 1E and 1F.

Substrate(s)

The foregoing catalyst are typically supported on one or more substrates, providing one or more catalyst composites (i.e., catalytic materials in one or more layers on a substrate). A dispersion of any one or more of the catalytic materials as described herein may be used to form a slurry for a washcoat. To the slurry may be added any desired additional ingredients such as other platinum group metals, other supports, other stabilizers and promoters, and the like. Any two or more of the catalysts disclosed above can be combined on a single substrate, or can be provided as a single coated substrate.

The substrate(s) for the catalyst compositions described herein above may be constructed of any material typically used for preparing automotive catalysts and will typically comprise a metal or ceramic honeycomb structure. The substrate typically provides a plurality of wall surfaces upon which a catalyst washcoat composition is applied and adhered, thereby acting as a carrier for the catalyst composition.

Exemplary metallic substrates include those comprising heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metallic substrates may be oxidized at high temperatures, e.g., 700° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil (0.006 inches), or 600 cpsi and a wall thickness of 4 mil (0.004 inches). However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas entering the front or inlet end of the substrate to flow through the porous walls of the wall-flow substrate in order to exit the outlet end of the substrate. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls.

Figure 2:
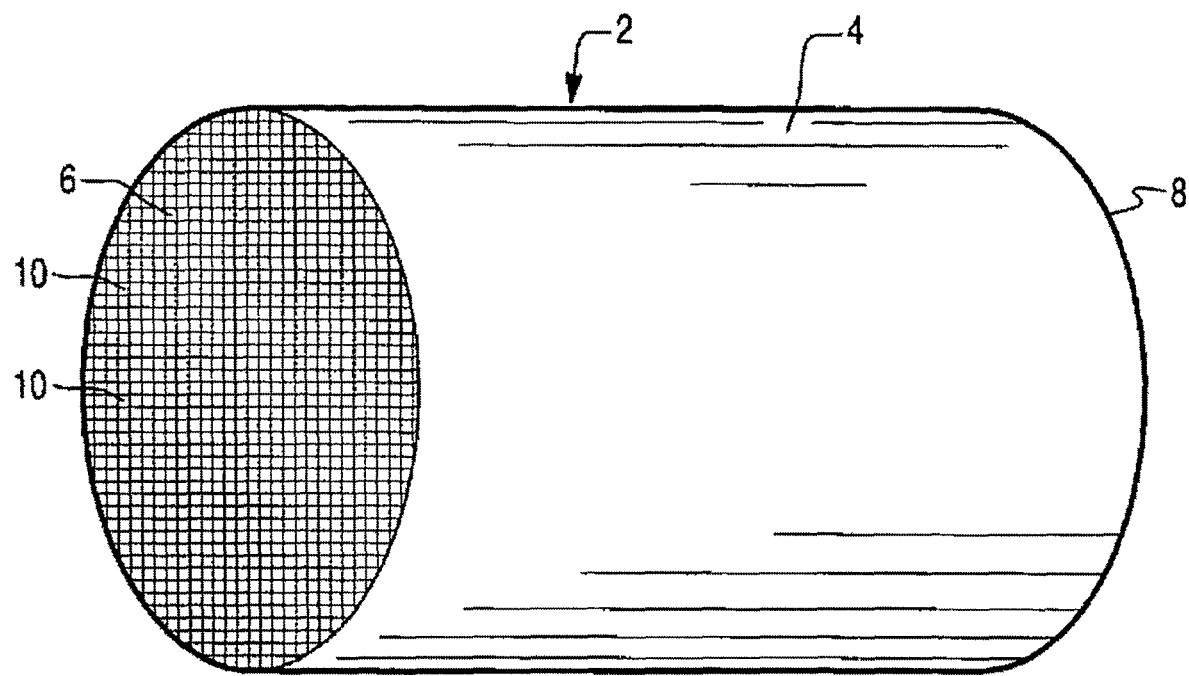
FIG. 2 is a perspective view of a honeycomb-type substrate, which may comprise a catalytic washcoat composition in accordance with the present invention.
Figure 3:
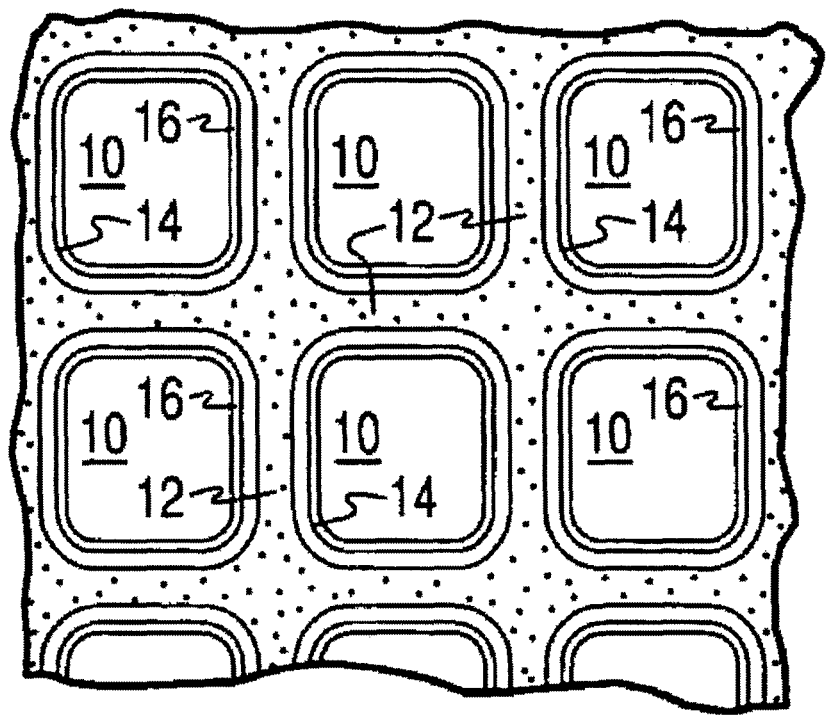
FIG. 3 is a partial cross-sectional view enlarged relative to FIG. 1 and taken along a plane parallel to the end faces of the substrate carrier of FIG. 1, which shows an enlarged view of a plurality of the gas flow passages shown in FIG. 1.

FIGS. 2 and 3 illustrate an exemplary substrate 2 in the form of a flow-through substrate coated with a catalyst composition as described herein. Referring to FIG. 2, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 3, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 3, walls 12 are so dimensioned and configured that gas flow passages 10 have a substantially regular polygonal shape. As shown, the catalyst composition can be applied in multiple, distinct layers if desired. In the illustrated embodiment, the catalyst consists of both a discrete bottom layer 14 adhered to the walls 12 of the carrier member and a second discrete top layer 16 coated over the bottom layer 14. The present invention can be practiced with one or more (e.g., 2, 3, or 4) catalyst layers and is not limited to the illustrated two-layer embodiment. Any number or arrangement of coated layers is possible. The oxidation catalyst of the invention can also be zone-coated on the substrate, meaning the oxidation catalyst is present only in an inlet zone or an outlet zone of the substrate, typically in combination with a second catalyst material of a different composition in the other zone. Any number or arrangement of coated zones is possible.

Figure 4:
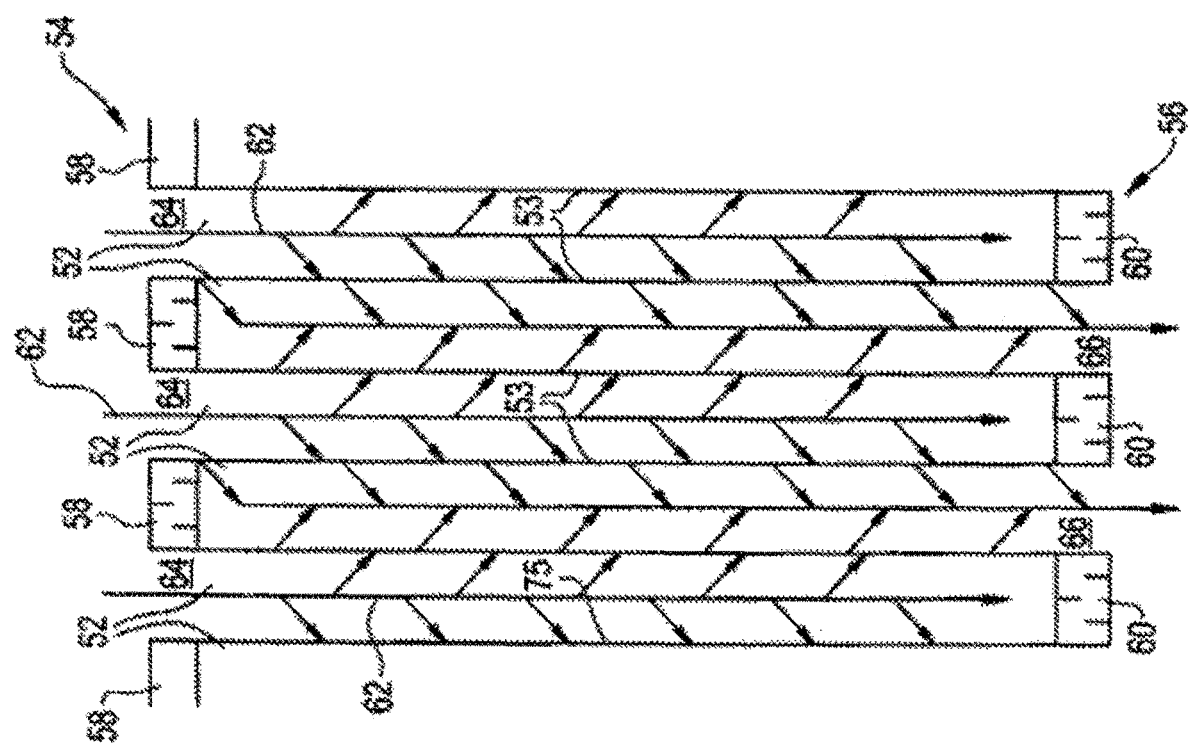
FIG. 4 is a cutaway view of a section enlarged relative to FIG. 1, wherein the honeycomb-type substrate in FIG. 1 represents a wall flow filter substrate monolith.

FIG. 4 illustrates an exemplary substrate 2 in the form a wall flow filter substrate coated with a washcoat composition as described herein. As seen in FIG. 4, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this disclosure is catalyzed in that the wall of said substrate has thereon or contained therein one or more catalytic materials. Catalytic materials may be present on the inlet side of the substrate wall alone, the outlet side alone, or both the inlet and outlet sides. This disclosure includes the use of one or more layers of catalytic material within the wall as well as on the inlet and/or outlet walls of the substrate.

In some embodiments, the substrate can be coated at least twice with two separate washcoat slurries in an axially zoned configuration. For example, the same substrate can be coated once with one washcoat slurry and a second time with another slurry, wherein each washcoat is different. In some embodiments, the two separate washcoats may include separate catalyst compositions (i.e., a first catalyst composition and a second catalyst composition) or catalyst components of the same catalyst composition. In one embodiment, one catalyst component may be coated first from the substrate inlet end (giving a "first washcoat zone"), and another catalyst component may be coated second from the substrate outlet end (giving a "second washcoat zone"). In yet another embodiment, one catalyst component may be coated first from the substrate outlet end (giving a "second washcoat zone"), and another catalyst component may be coated second from the substrate inlet end (giving a "first washcoat zone"). The first washcoat zone of specific embodiments extends from the front or inlet end of the substrate through the range of about 5% to about 95%, from about 5% to about 75%, from about 5% to about 50%, or from about 10% to about 35% of the length of the substrate. The second washcoat zone extends from the rear of outlet end of the substrate from about 5% about 95%, from about 5% to about 75%, from about 5% to about 50%, or from about 10% to about 35% of the total axial length of the substrate. The second washcoat zone, in some embodiments, at least partially overlaps the first washcoat zone. The first washcoat zone, in some embodiments, at least partially overlaps the second washcoat zone. In other embodiments, there is no significant overlap between the two washcoat zones.

In some embodiments, the substrate can be coated with two types of washcoat slurries in two separate zones, wherein a first washcoat zone including a washcoat of a first catalyst composition or first catalyst component and a second washcoat zone including a washcoat of a second catalyst composition or second catalyst component are located side by side along the length of the substrate, with no overlap of the zones.

In describing the quantity of catalytic metal components or other components of the composition, it is convenient to use units of weight of component per unit volume of catalyst substrate. Therefore, the units, grams per cubic inch ("g/in$^3$") and grams per cubic foot ("g/ft$^3$"), are used herein to mean the weight of a component per volume of the substrate, including the volume of void spaces of the substrate. Other units of weight per volume such as g/L are also sometimes used. The total loading of the catalyst composition (including both impregnated metals and support material) on the catalyst substrate, such as a monolithic flow-through substrate, is typically from about 0.5 to about 6 g/in$^3$, and more typically from about 1 to about 5 g/in$^3$. Total loadings of individual catalytic components in the catalysts disclosed herein above are generally known to one of skill in the art. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Method of Making Catalyst Composition

Preparation of metal-impregnated support materials typically comprises impregnating a support material in particulate form with a metal solution, such as (in the context of PGM-containing catalysts) one or more of a platinum solution and a palladium solution. Multiple metal components (e.g., platinum and palladium) can be impregnated at the same time or separately, and can be impregnated on the same support particles or separate support particles. The support particles are typically dry enough to absorb substantially all of the solution to form a moist solid. Aqueous solutions of water soluble compounds or complexes of the metal component(s) are typically utilized, such as (in the context of a Pd- or Pt-containing catalyst) palladium or platinum nitrate, tetraammine palladium or platinum nitrate, or tetraammine palladium or platinum acetate. Solutions containing discrete colloidal metal particles may also be used. Following treatment of the support particles with the metal solution, the particles are dried, such as by heat treating the particles at elevated temperature (e.g., 100-150° C.) for a period of time (e.g., 1-3 hours), and then calcined to convert the metal components to a more catalytically active form. An exemplary calcination process involves heat treatment in air at a temperature of about 400-600° C. for about 0.5-3 hours. The above process can be repeated as needed to reach the desired level of metal impregnation. The resulting material can be stored as a dry powder or in slurry form. Drying and calcination can be accomplished directly on the impregnated powder as described above, or alternatively, after washcoating a slurry prepared from the impregnated powder onto a suitable substrate. In another embodiment, the metal can be added to the support material after the support material has been applied as a coating to the substrate.

Substrate Coating Process

The above-noted catalyst composition is typically mixed with water to form a slurry for purposes of coating a catalyst substrate, such as a honeycomb-type substrate. In addition to the catalyst particles, the slurry may optionally contain alumina as a binder, hydrocarbon (HC) storage components (e.g., zeolite), water-soluble or water-dispersible stabilizers (e.g., barium acetate), promoters (e g, lanthanum nitrate), associative thickeners, and/or surfactants (including anionic, cationic, non-ionic or amphoteric surfactants). Milling of the slurry to reduce the support particle size to a range suitable for coating onto a substrate is typically required. In certain embodiments, it is also advantageous to avoid the addition of acids to the slurry in order to avoid the formation of dissociated metal ions or related metal species that could lead to undesired alloying within the catalyst material. Accordingly, in certain embodiments, the slurry used to coat the catalyst substrate can be substantially or completely acid-free. A typical pH range for the slurry is about 3 to about 7.

Optionally, although not common in diesel systems, the slurry may contain one or more hydrocarbon (HC) storage components for the adsorption of hydrocarbons (HC). Any known hydrocarbon storage material can be used, e.g., a microporous material such as a zeolite or zeolite-like material. Preferably, the hydrocarbon storage material is a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, offretite, or a beta zeolite. Preferred zeolite adsorbent materials have a high silica to alumina ratio. The zeolites may have a silica/alumina molar ratio of from at least about 10:1, preferably at least about 50:1, with useful ranges of from about 10:1 to 1000:1, 50:1 to 500:1, as well as about 25:1 to 300:1. Preferred zeolites include ZSM, Y and beta zeolites. A particularly preferred adsorbent may comprise a beta zeolite of the type disclosed in U.S. Pat. No. 6,171,556, incorporated herein by reference in its entirety. When present, zeolite or other HC storage components are typically used in an amount of about 0.05 g/in$^3$ to about 1 g/in$^3$. When present, alumina binder is typically used in an amount of about 0.05 g/in$^3$ to about 1 g/in$^3$. The alumina binder can be, for example, boehmite, gamma-alumina, or delta/theta alumina.

The slurry can be milled to enhance mixing of the particles and formation of a homogeneous material. Particle size reduction is often required in order to prepare a slurry with suitable rheology for coating. The milling can be accomplished in a ball mill, continuous mill, or other similar equipment, and the solids content of the slurry may be, e.g., about 20-60 wt. %, more particularly about 30-40 wt. %. In one embodiment, the milled slurry is characterized by a D90 particle size of about 20 to about 30 microns. The D90 is defined as the particle size at which about 90% of the particles have a finer particle size.

The slurry is then coated on the catalyst substrate using a washcoat technique known in the art. As used herein, the term "washcoat" has its usual meaning in the art of a thin, adherent coating of a catalytic material applied to a substrate. In one embodiment, the catalyst substrate is dipped one or more times in the slurry or otherwise coated with the slurry. Thereafter, the coated substrate is dried at an elevated temperature (e.g., 100-150° C.) for a period of time (e.g., 0.5-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology or by varying the number of coats. The coating/drying/calcining process can be repeated as needed to build the coating to the desired loading level or thickness. The catalyst composition can be applied as a single layer or in multiple layers. In one embodiment, the catalyst composition is applied in multiple layers with each layer having a different composition.

Method of Treating Exhaust Gas

The disclosed exhaust gas treatment systems (e.g., including, but not limited to, those depicted in FIGS. 5B, 5C, 5D, 5E, and 5F) are effective for the reduction of particulate matter (PM), nitrogen oxides ($NO_x$), unburned hydrocarbons (HC), and carbon monoxide (CO). In particular, with the inclusion of an upstream SCR catalyst, the disclosed systems can provide lower NOx and $N_2O$ emissions than comparable systems without an upstream SCR catalyst.

In some embodiments, the disclosed exhaust gas treatment systems can decrease total NOx in engine exhaust gas to a greater degree than corresponding systems without an upstream SCR catalyst. In particular, the disclosed exhaust gas treatment systems can significantly reduce the Brake Specific $NO_x$ values compared to conventional exhaust gas treatment systems. In this context, the term "Brake Specific $NO_N$" ($BSNO_x$) refers to the amount of NO (in grams) divided by the work (in brake horsepower hour (bhph)) produced by the given engine used. In some embodiments, the exhaust gas treatment systems of the invention can provide a BSNOx value at the tailpipe of less than about 0.2 g/KWh, less than about 0.15 g/KWh, less than about 0.10 g/KWh, less than about 0.09 g/KWh, or less than about 0.08 g/KWh. Such BSNOx values can be described as being less than about 0.15 g/bhph, less than about 0.12 g/bhph, less than about 0.10 g/bhph, less than about 0.09 g/bhph, less than about 0.08 g/bhph, or less than about 0.07 g/bhph. Further, treatment of exhaust gas using the disclosed systems can, in some embodiments, provide treated exhaust gas with less $N_2O$ than that emitted from corresponding systems without an upstream SCR catalyst. For example, the disclosed exhaust gas treatment systems can, in some embodiments, provide a Brake Specific $N_2O$ value of less than about 0.018 g/bhph, less than about 0.017 g/bhph, or less than about 0.016 g/bhph. The term "Brake Specific $N_2O$" ($BSN_2O$) refers to the amount of $N_2O$ (in grams) divided by the work (in brake horsepower hour (bhph)) produced by the given engine used. In certain embodiments, the total $N_2O$ emissions across the disclosed systems can be, for example, with $BSN_2O$ values of less than 0.019 g/bhph.

EXPERIMENTAL

Aspects of the present invention are more fully illustrated by the following examples, which are set forth to illustrate certain aspects of the present invention and are not to be construed as limiting thereof.

Example 1—Standard System

Figure 5A:
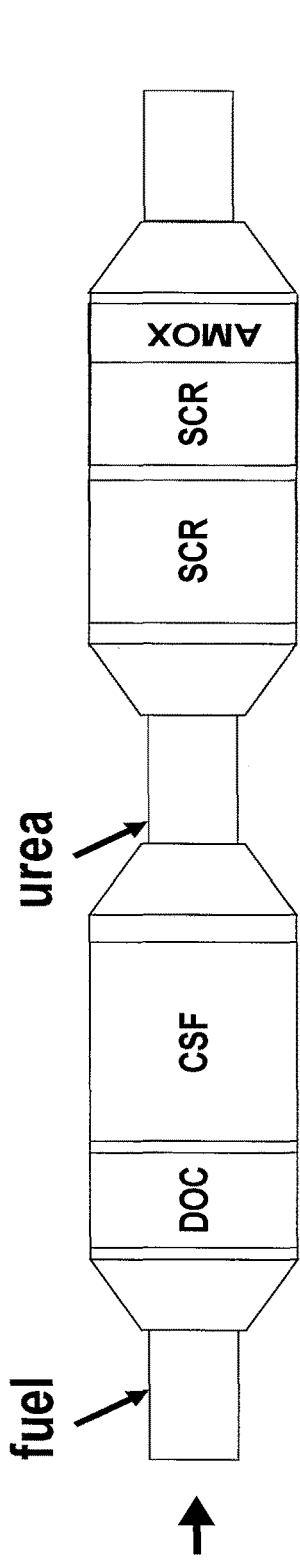
FIGS. 5A, 5B, 5C, 5D, 5E, and 5F are depictions of comparative and inventive exhaust gas treatment systems according to the present disclosure.

A standard exhaust system was prepared with the general structure shown in FIG. 5A, having a close-coupled DOC, followed by a downstream CSF, a downstream SCR ("SCR1") catalyst, and a downstream SCR/AMOx catalyst. The DOC was a flow-thru DOC coated onto a 13"×6" flow-thru substrate with 400 cpsi and 4 mil wall thickness. It was formulated with Pt and Pd on alumina. The DOC was zoned, with an inlet zone that was 33% of the total catalyst length (i.e., 2") and designed for fuel L/O function for active regeneration. The DOC had a 60 g/ft$^3$ Pt and Pd at a 1:1 ratio. The rear zone 67% of the catalyst length (i.e. 4") was for oxidizing NO to $NO_2$ and had 30 g/ft$^3$ Pt and Pd at 5:1 ratio. The overall platinum-group metal loading on this DOC was 40 g/ft$^3$ (2:1 ratio). The CSF was a 13"×7" filter substrate with 300 cpsi and a 9 mil wall thickness. The filter substrate was coated with 4 g/ft$^3$ Pt and Pd at 4:1 ratio supported on alumina. The SCR1 catalyst contained a Fe/Cu-CHA zoned SCR, having a 3" inlet zone of Fe-CHA (2.35% $Fe_2O_3$) and a 3.5" outlet zone of Cu-CHA (2.35% CuO). The dry gain (DG) in each zone was 2.5 g/in$^3$. The SCR/AMOx was a 13"×5.5" flow-thru substrate with 600 cpsi and a 3 mil wall thickness. It had a zoned SCR/AMOX configuration, with a 2" long rear AMOX bottom zone coat of Pt-only (2 g/ft$^3$ in the zone) on alumina. It also had a full length SCR topcoat of Cu-chabazite (2.35% CuO) at 2.5 g/in$^3$ DG loading, which also covered the rear AMOX zone.

Figure 6:
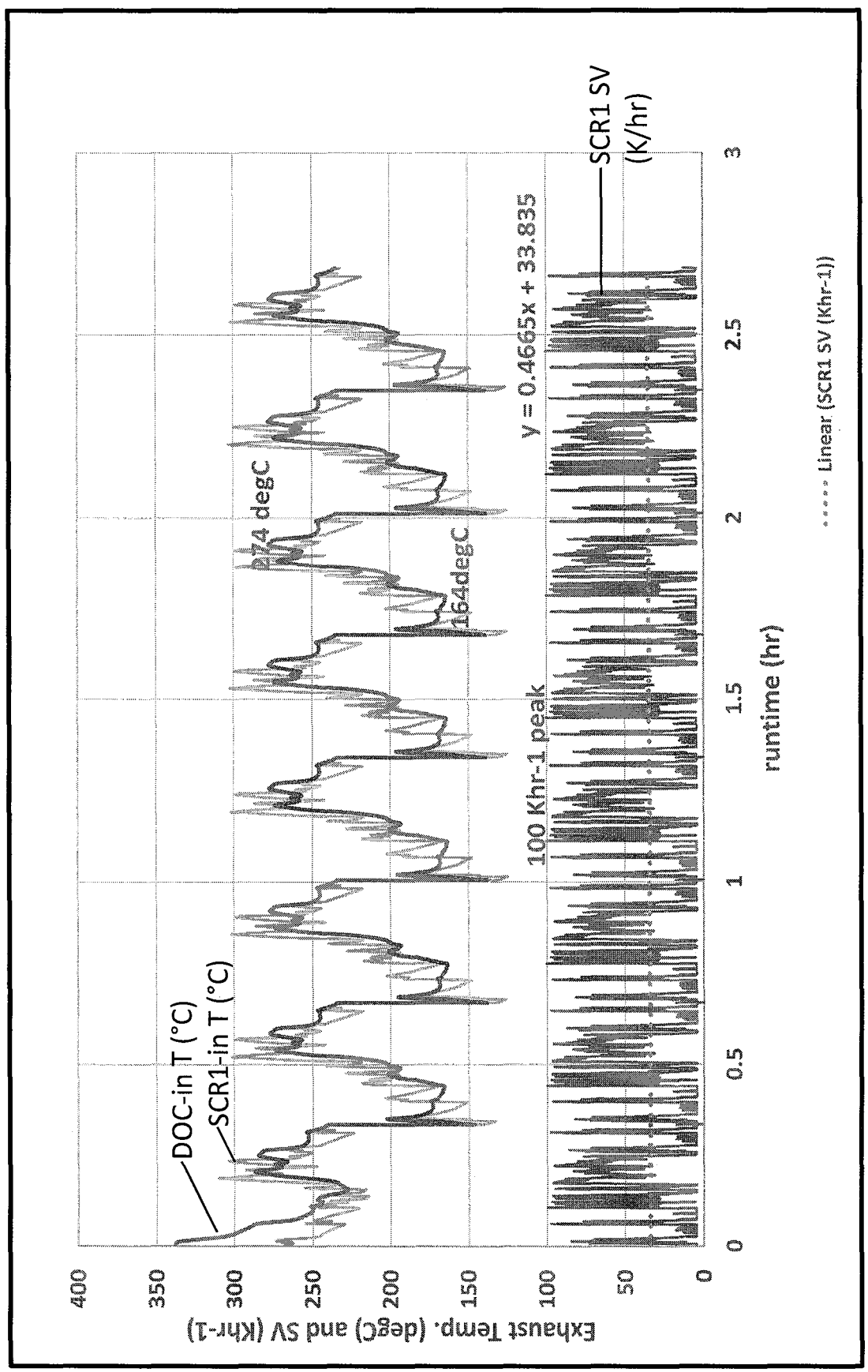
FIG. 6 is a plot of exhaust temperature at DOC-in and SCR-1 for a comparative system without upstream SCR.

Testing was conducted on a 13 liter HDD diesel engine on-road, and system components were aged 50 hours at 650° C. before testing. Fourier Transform Infrared (FTIR) spectroscopic gas analyzers were positioned at CSF-out (FT1), SCR1-out (FT2), and SCR/AMOx out (FT3). Direct benches were at engine-out (D2) and SCR/AMOx out (D1). With this comparative exhaust system, a series of eight heavy-duty diesel truck (HDDT) (Federal Test Procedure, FTP) cycles were run with 20 minute soaks between the cycles. The exhaust temperatures at DOC-in and SCR1-in were analyzed, as shown in FIG. 6, and it was found that the exhaust temperature to SCR1 over the initial stage of the cycle were quite low (~164° C./min) and only reached their peak (~274° C.) in the latter stages of the cycle. Because of the low exhaust temperatures at SCR1-in, the controls did not inject urea in the colder stages of the cycle and, as a result, the effective cycle NSR for this test was only at ~0.83 level, which limited NOx conversion.

Figure 7:
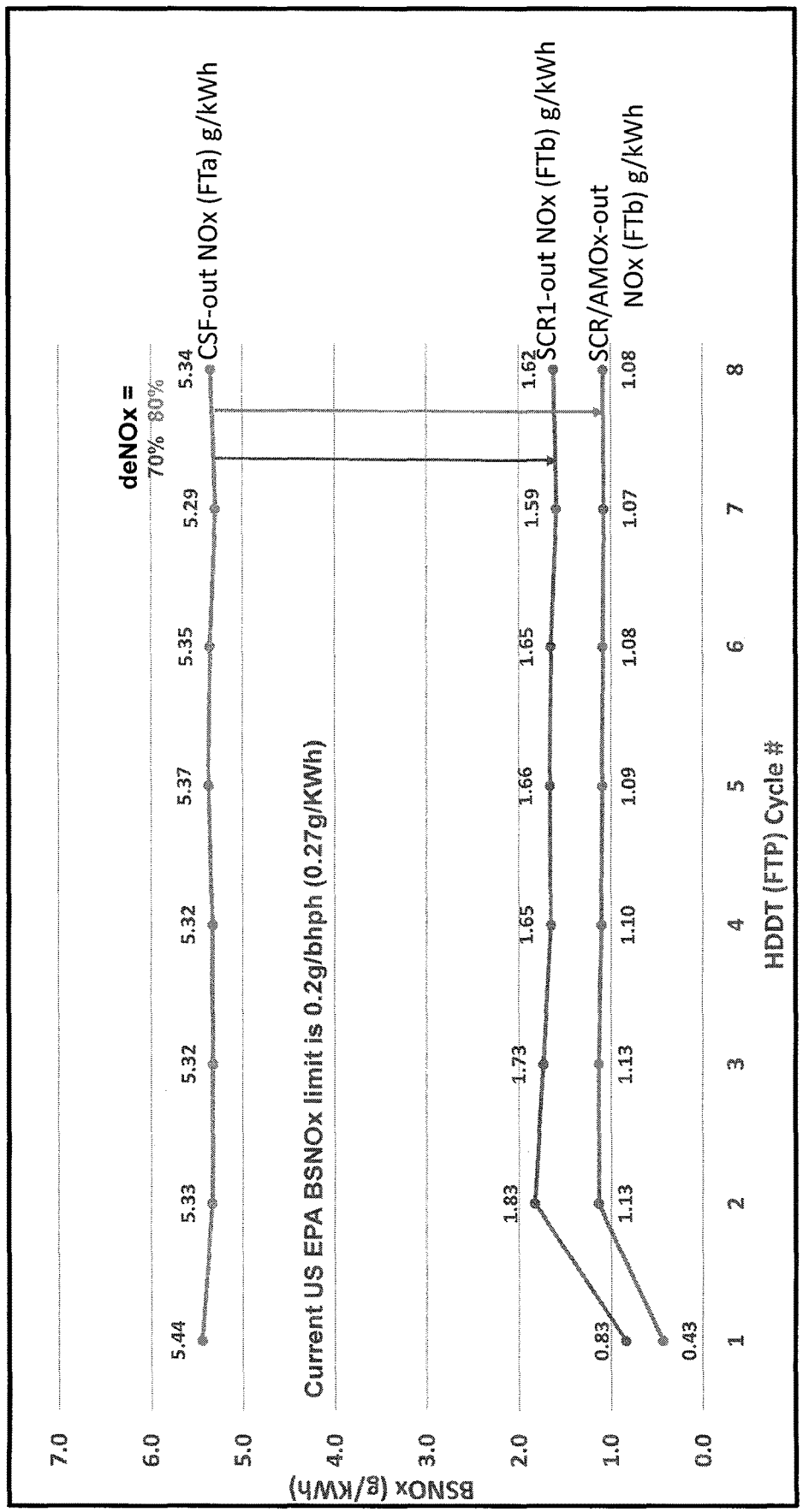
FIG. 7 is a plot of BSNOx at CSF-out for a comparative system without upstream SCR.
Figure 8:
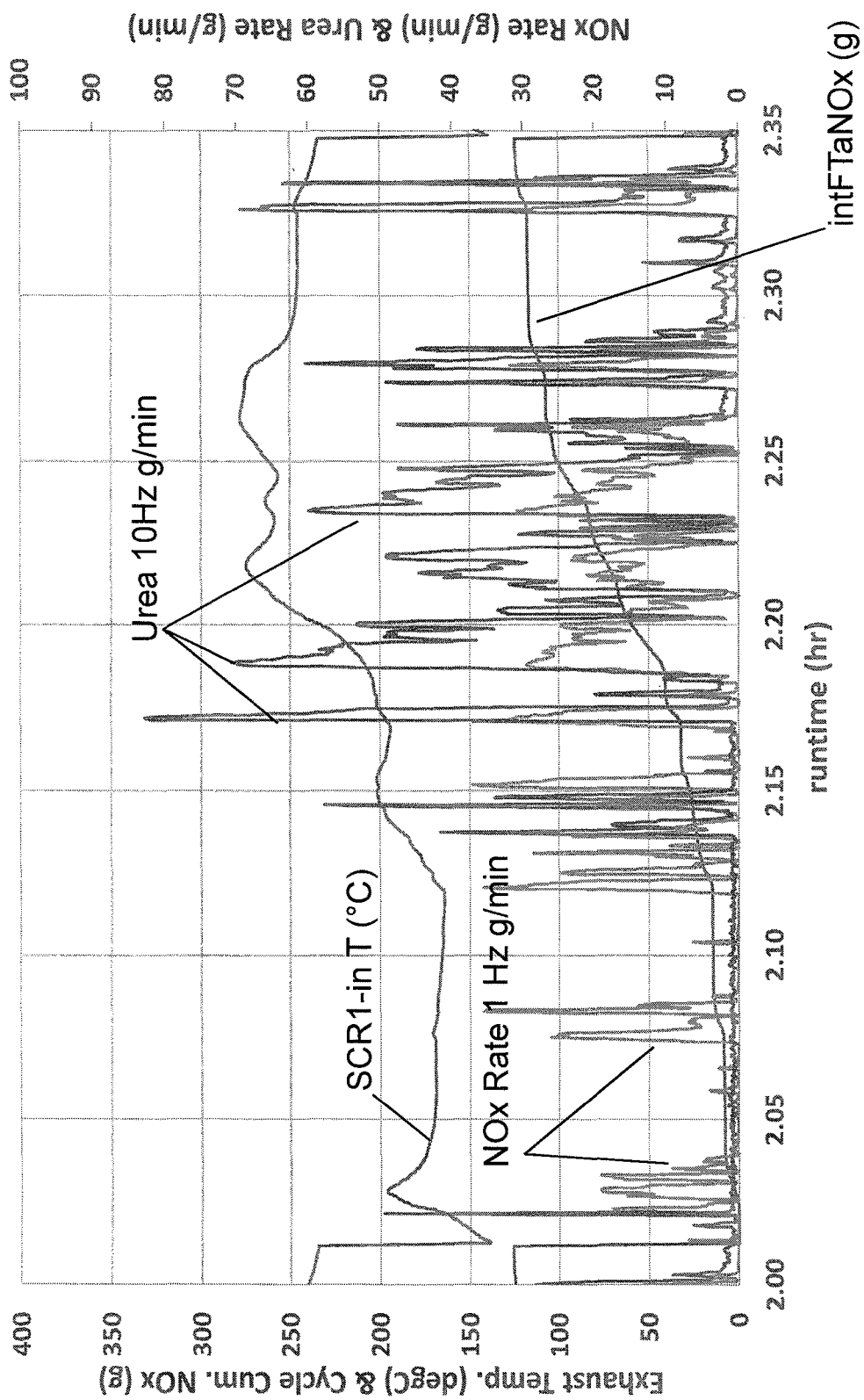
FIG. 8 shows the urea injection rate relative to the NOx rate for a comparative system without upstream SCR catalyst

BSNOx was analyzed at CSF-out and the cycle cumulative BSNOx levels for this test (at CSF-out (baseline), SCR1-out, and SCR/AMOx-out (tailpipe) are shown in FIG. 7. The baseline (CSF-out) BSNOx levels ran in the range of 5.3-5.4 g/KWh. The system achieved ~70% deNOx over SCR1 to reduce BSNOx as low as ~1.6 g/KWh. About 10% additional NOx reduction was achieved over the SCR/AMOX to give ~1.13-1.07 g/KWh BSNOx at tailpipe. This level was above the desired 0.27 g/KWh (0.2 g/bhph) BSNOx limit and, although not intending to be limited by theory, it is believed that this result was due to the limited NSR resulting from the low exhaust temperatures. The urea injection rate relative to cumulative NOx rate was analyzed as well, and the results of this test are provided in FIG. 8. As shown, the urea injection rate was essentially zero during the early, low-temperature phase of the FTP cycle when there were NOx peaks. $BSN_2O$ levels for this system were found to be quite low at CSF-out, SCR1-out, and SCR/AMOx-out. Even the SCR/AMOx-out (tailpipe) $BSN_2O$ was below current and proposed limits. However, it was noted that the NOx conversion levels over the SCR-1 and the SCR/AMOx catalysts was relatively low, which in turn limited the $N_2O$ make over the SCR-containing catalysts. As such, under the test conditions, with such low exhaust temperatures at SCR-1 in, this system did not meet the BSNOx limits.

Example 2—Inventive System A

Figure 5B:
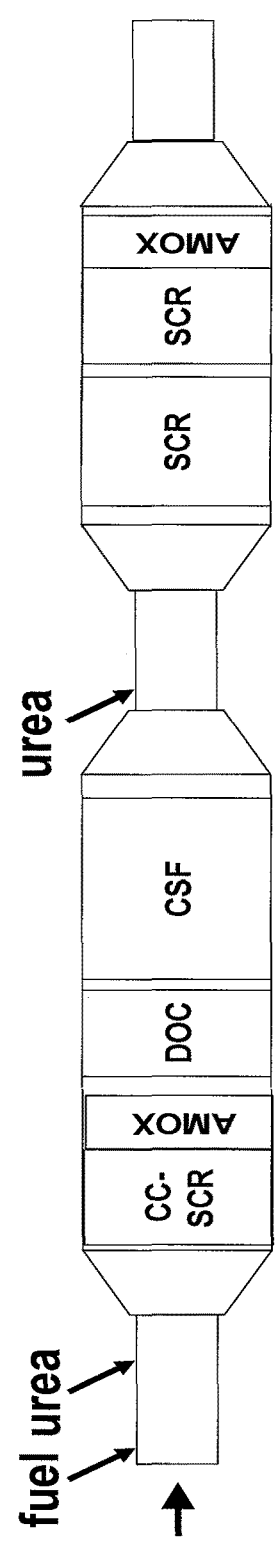

An exhaust system was prepared with the general structure shown in FIG. 5B, with a close-coupled SCR (cc-SCR) upstream of the other components of the system, having a close-coupled SCR, followed by a downstream DOC, followed by a downstream CSF, a downstream SCR ("SCR1") catalyst, and a downstream SCR/AMOx catalyst. The cc-SCR for this analysis was not truly close-coupled, but was located downstream of the engine by about 8.5 feet from turbo-out for access purposes. Nonetheless, the cc-SCR was positioned so as to take advantage of the higher temperatures in a location nearer to engine-out. This system also required dual urea injection (one injection upstream of the cc-SCR and one injection upstream of SCR-1).

The cc-SCR used in this testing was a zoned SCR/AMOx catalyst, coated onto a 10.5"×9"/600/4.5HP substrate. The catalyst had a 3" outlet AMOx zone with a 2 g/ft$^3$ Pt-only bottom coat. The full length top coat comprised Cu-CHA (3.25% CuO) and had a DG of 2.75 g/in$^3$. The DOC was a flow-thru DOC coated onto a 13"×6" flow-thru substrate with 400 cpsi and 4 mil wall thickness. It was formulated with Pt and Pd on alumina. The DOC was zoned, with an inlet zone that was 33% of the total catalyst length (i.e., 2") and designed for fuel L/O function for active regeneration. The DOC had a 60 g/ft$^3$ Pt and Pd at a 1:1 ratio. The rear zone 67% of the catalyst length (i.e. 4") was for oxidizing NO to $NO_2$ and had 30 g/ft$^3$ Pt and Pd at 5:1 ratio. The overall platinum-group metal loading on this DOC was 40 g/ft$^3$ (2:1 ratio). The CSF was a 13"×7" filter substrate with 300 cpsi and a 9 mil wall thickness. The filter substrate was coated with 4 g/ft$^3$ Pt and Pd at 4:1 ratio supported on alumina. The SCR1 catalyst contained a full-length coat of FeCHA. The SCR/AMOx was a 13"×5.5" flow-thru substrate with 600 cpsi and a 3 mil wall thickness. It had a zoned SCR/AMOX configuration, with a 2" long rear AMOX bottom zone coat of Pt-only (2 g/ft$^3$ in the zone) on alumina. It also had a full length SCR topcoat of Cu-chabazite (2.35% CuO) at 2.5 g/in$^3$ DG loading, which also covered the rear AMOX zone.

Figure 9:
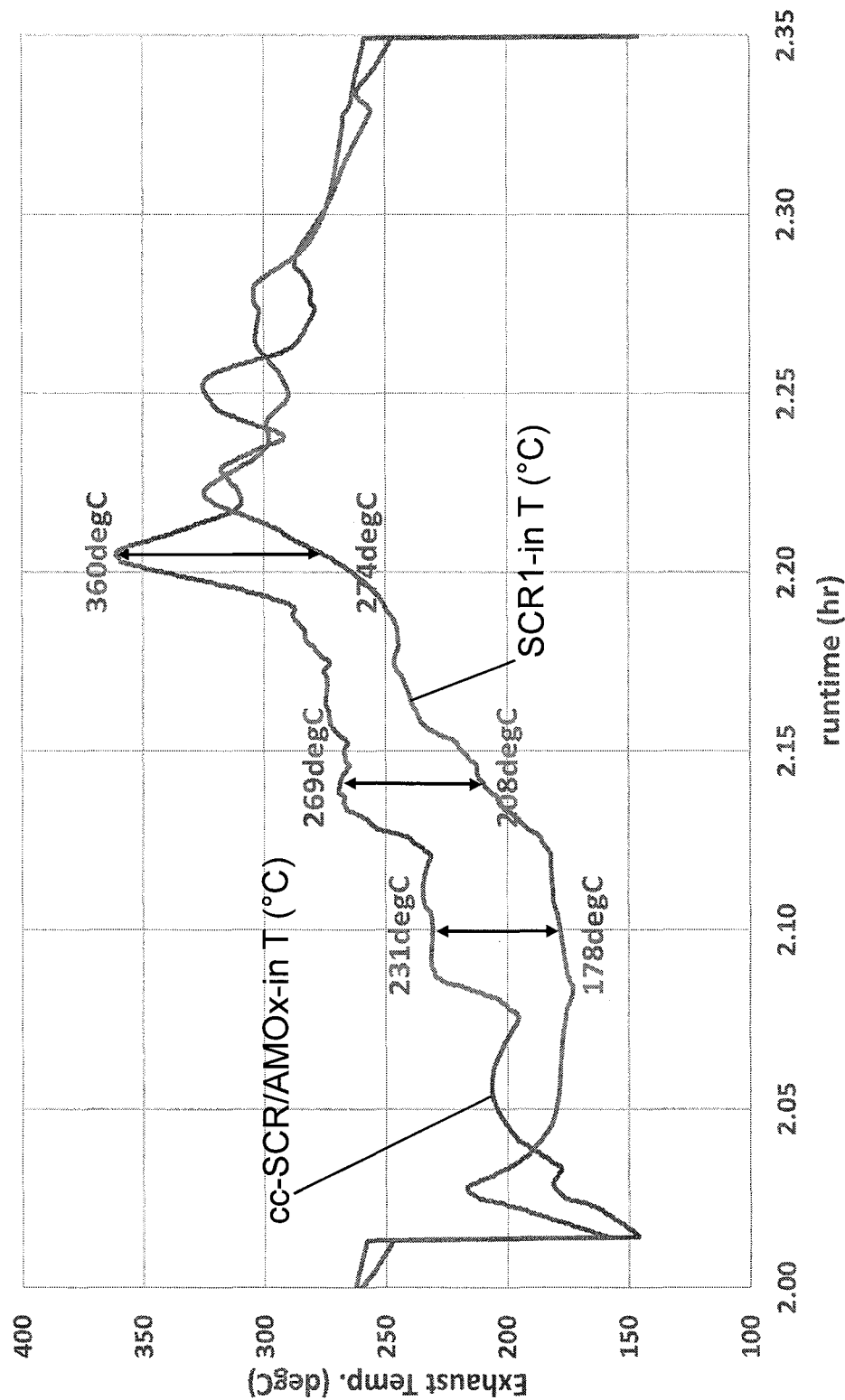
FIG. 9 is a plot of exhaust temperature traces for an inventive system comprising an upstream, close-coupled SCR/AMOx over 8 HDDTs (FTPs) w/soaks.

Testing was conducted on a 13 liter HDD diesel engine on-road, and system components were aged 50 hours at 650° C. before testing. Fourier Transform Infrared (FTIR) spectroscopic gas analyzers were positioned at cc-SCR/AMOx-out, SCR1-out, and SCR/AMOx out. Direct benches were at engine-out and SCR/AMOx out. With this exhaust system, a series of 8 HDDTs (FTP) cycles were once again run with 20 minute soaks between the cycles. An expanded view of exhaust temperature traces over HDDT (FTP) cycle 7 at cc-SCR/AMOx-in and SCR1-in is provided in FIG. 9. As shown, it was observed that over the initial 60% of the cycle, the cc-SCR/AMOx-in temperature was significantly higher than the SCR1-in temperature. Over the initial, cold part of the cycle, the cc-SCR/AMOx saw a 53-61° C. higher exhaust temperature than the downstream SCR1 catalyst. For this test, the urea injection to the cc-SCR/AMOx was at NSR~0.5 via simple NOx following. The cycle cumulative urea injection to the downstream SCR (SCR1) was NSR~1.1 based on the level of NOx sensed upstream of the SCR.

Figure 10:
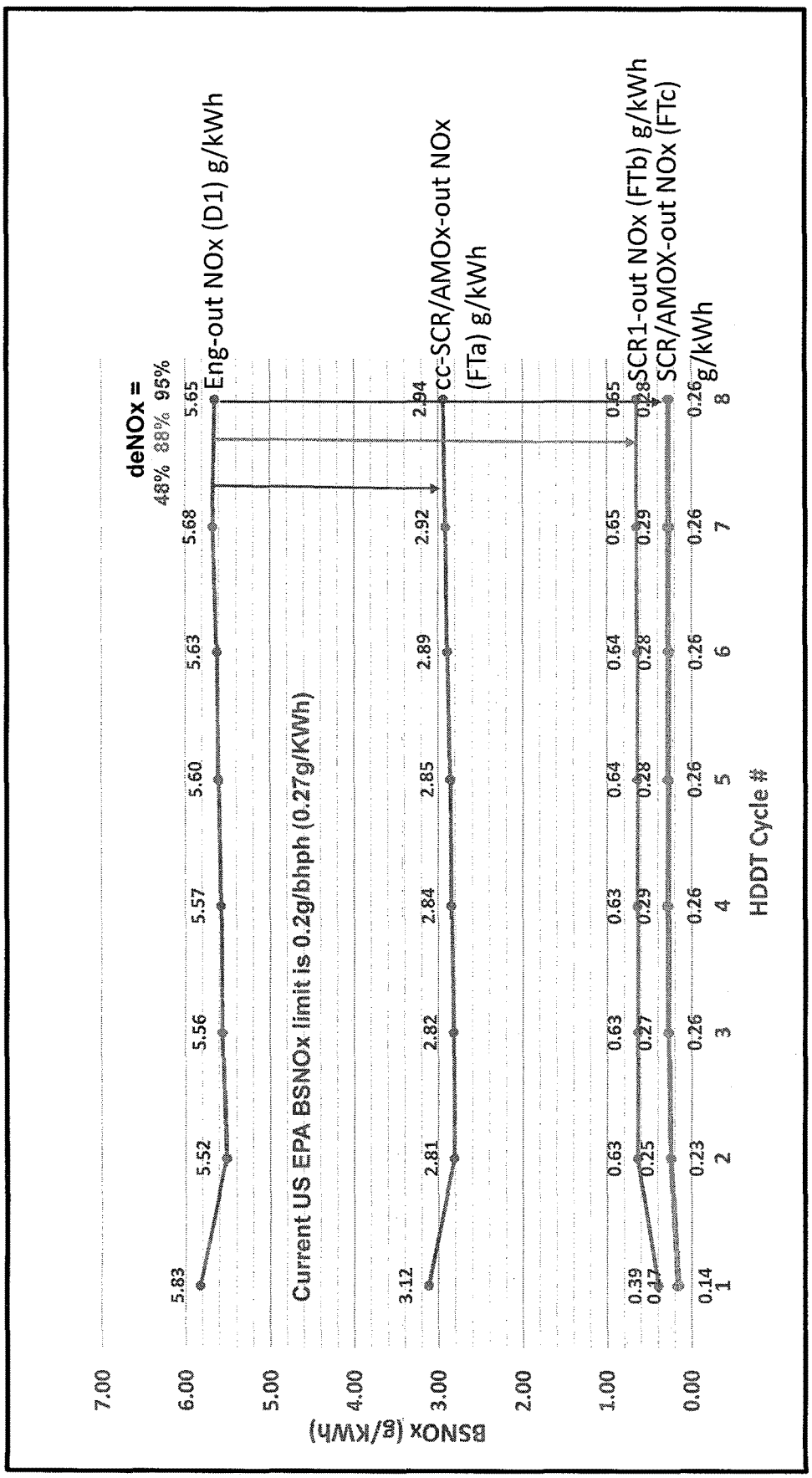
FIG. 10 is a plot of BSNOx at CSF-out for an inventive system comprising an upstream, close-coupled SCR/AMOx (NSR=0.5)

The BSNOx and NOx conversion for this system were analyzed over the 8 HDDTs (FTPs), as shown in FIG. 10. B SNOx was analyzed at engine-out and the baseline, engine-out BSNOx levels ran in the range of 5.6-5.7 g/KWh (4.2-4.3 g/bhph). Urea injection to the cc-SCR/AMOx at NSR=0.5 resulted in ~48% NOx conversion to give ~2.9 gKWh (2.2 g/bhph). Further reduction to 88% of baseline NOx was achieved at SCR1-out to give BSNOx of ~0.65 g/KWh (0.48 g/bhph). Additional NOx reduction (~95%) achieved 0.26 g/KWh (0.19 g/bhph) BSNOx at SCR/AMOX-out (tailpipe), i.e., just under the BSNOx emissions limit. Overall, this system demonstrated significant NOx reduction and it showed the advantage of the higher exhaust temperatures at cc-SCR/AMOX-in.

Figure 11:
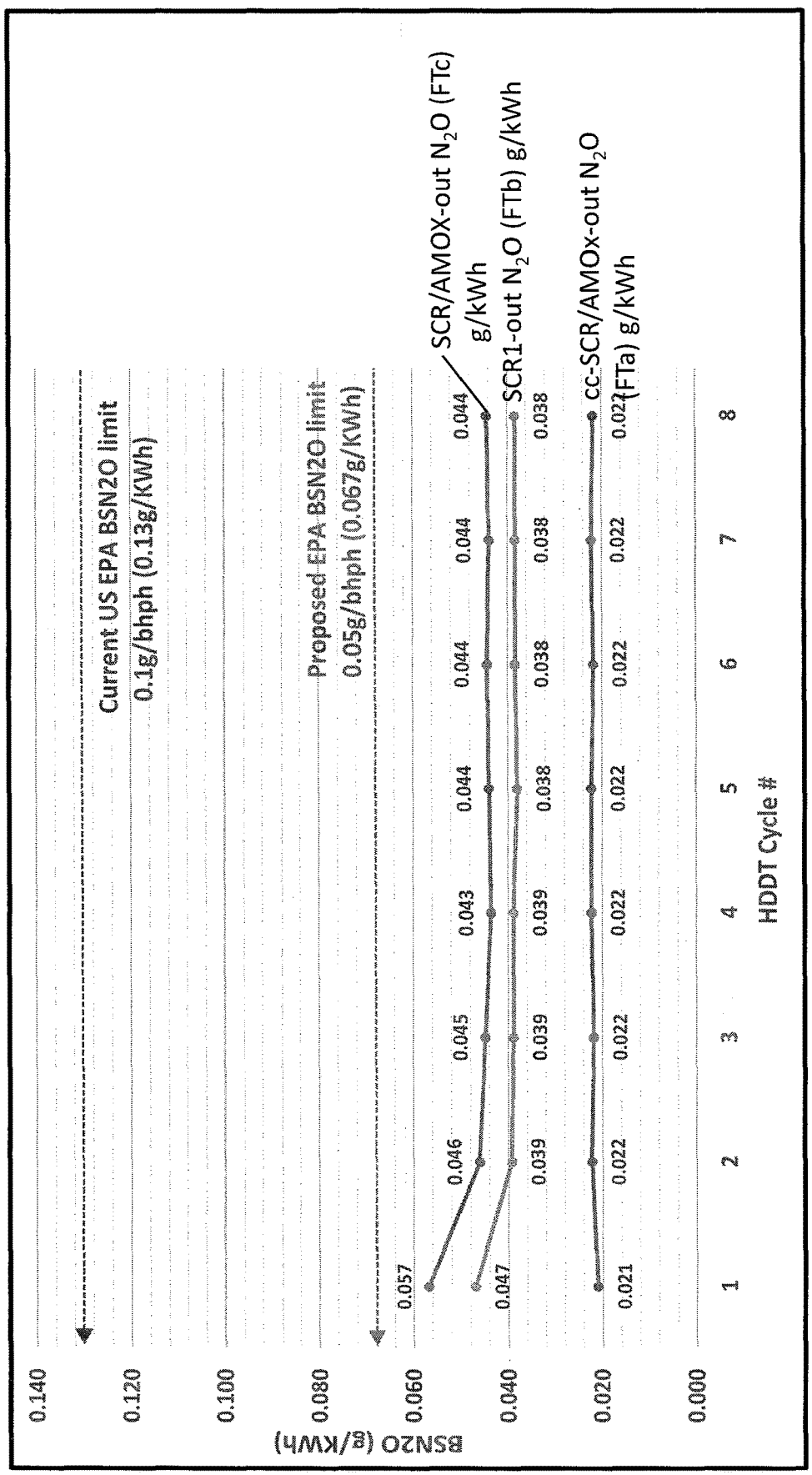
FIG. 11 is a plot of $BSN_2O$ levels for an inventive system comprising an upstream, close-coupled SCR/AMOx (NSR=0.5)

The $BSN_2O$ levels for this test were very low, as shown in FIG. 11. The 48% deNOx over the cc-SCR/AMOX resulted in $BSN_2O$ of only ~0.022 g/KWh (0.016 g/bhph) which was approximately the same as for CSF-out with the base system (FIG. 5). NOx conversion of 88% down-stream of the SCR1 increased the $BSN_2O$ to only ~0.038 g/KWh (0.028 g/bhph) and for 95% deNOx at SCR/AMOX-out (tailpipe) the $BSN_2O$ was ~0.044 g/KWh (0.033 g/bhph). Not only were these $BSN_2O$ limits well below the current HDD on-road limit of 0.1 g/bhph (0.13 g/KWh), but also under the EPAs new proposed $BSN_2O$ limit of 0.05 g/bhph (0.067 g/KWh). As noted above, these very low $BSN_2O$ levels were achieved while just meeting the current EPA BSNOx target over HDDTs (FTPs) run with soaks and thereby low exhaust temperatures.

Figure 12:
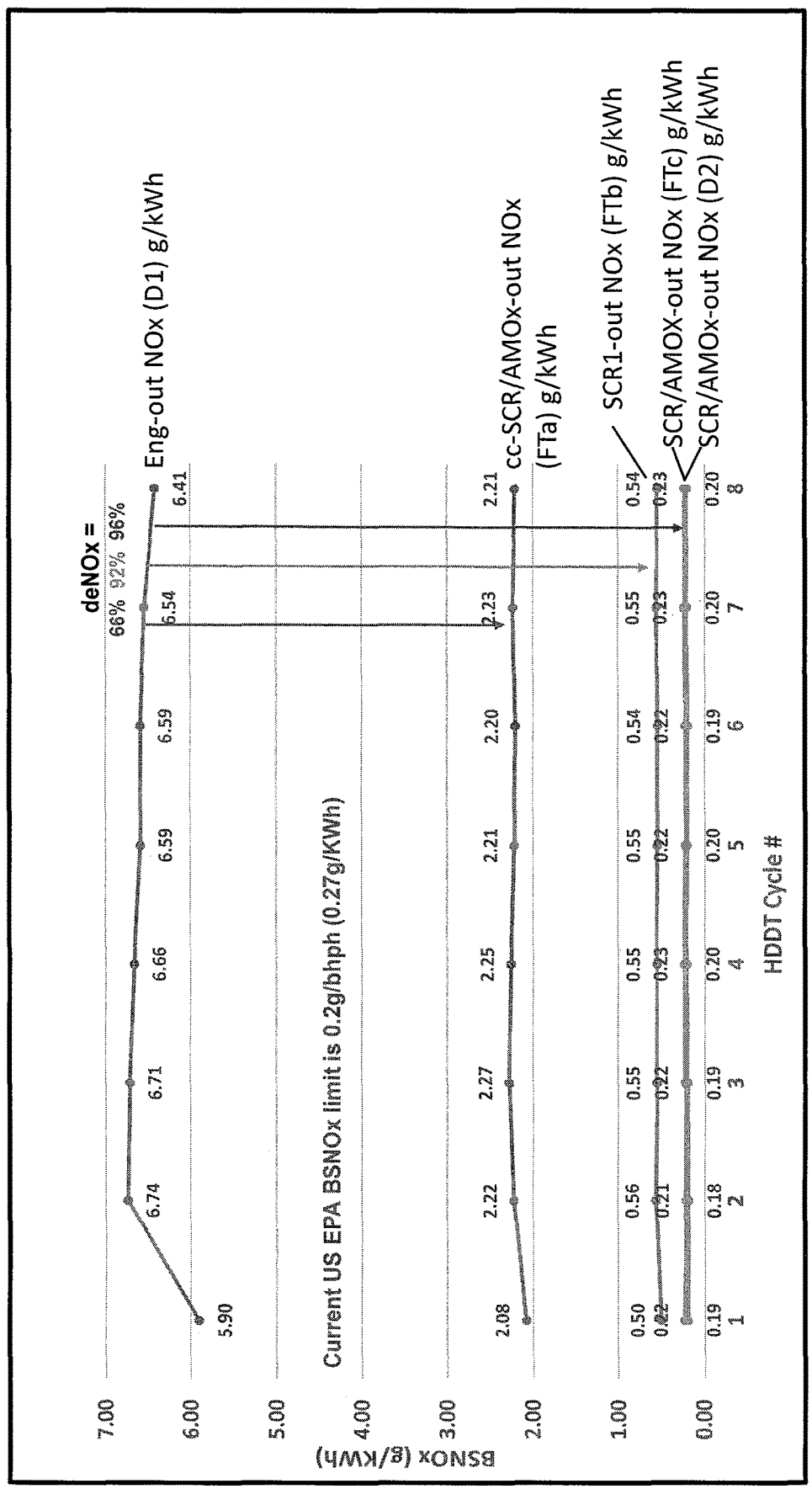
FIG. 12 is a plot of BSNOx at CSF-out for an inventive system comprising an upstream, close-coupled SCR/AMOx (NSR=0.7)

This test was repeated with urea injection to the cc-SCR/AMOX at the NSR=0.7 level. The results are shown in FIG. 12. Again this was run via simple NOx following strategy to the cc-SCR/AMOX and DAF/CES engine ECU control for the down-stream SCR1 catalyst. For this testing, the exhaust temperatures at cc-SCR/AMOX-in and SCR1-in were essentially the same as for the prior test. The BSNOx emissions levels for the test using NSR=0.7 to the cc-SCR/AMOX increased for this test and were in the 6.4-6.7 g/KWh range. This can be attributed to feed-back to the engine controls from the down-stream NOx sensors (based on the understanding that for the calibration, lower NOx drives engine-out NOx up slightly). In spite of the higher engine-out BSNOx, the NSR=0.7 level of urea injection to the cc-SCR/AMOX gave lower BSNOx at cc-SCR/AMOX-out of ~2.2 g/KWh (1.6 g/bhph) for 66% deNOx. The NOx conversion at SCR1-out was 92% for BSNOx levels of ~0.55 g/KWh (0.41 g/bhph) and at SCR/AMOX-out (tailpipe) was 0.20 g/KWh (0.15 g/bhph) for overall deNOx of 96%. These results showed that the higher level of urea injection (NSR=0.7) to the cc-SCR/AMOX led to more margin to the BSNOx target of 0.2 g/bhph (0.27 g/KWh).

Figure 13:
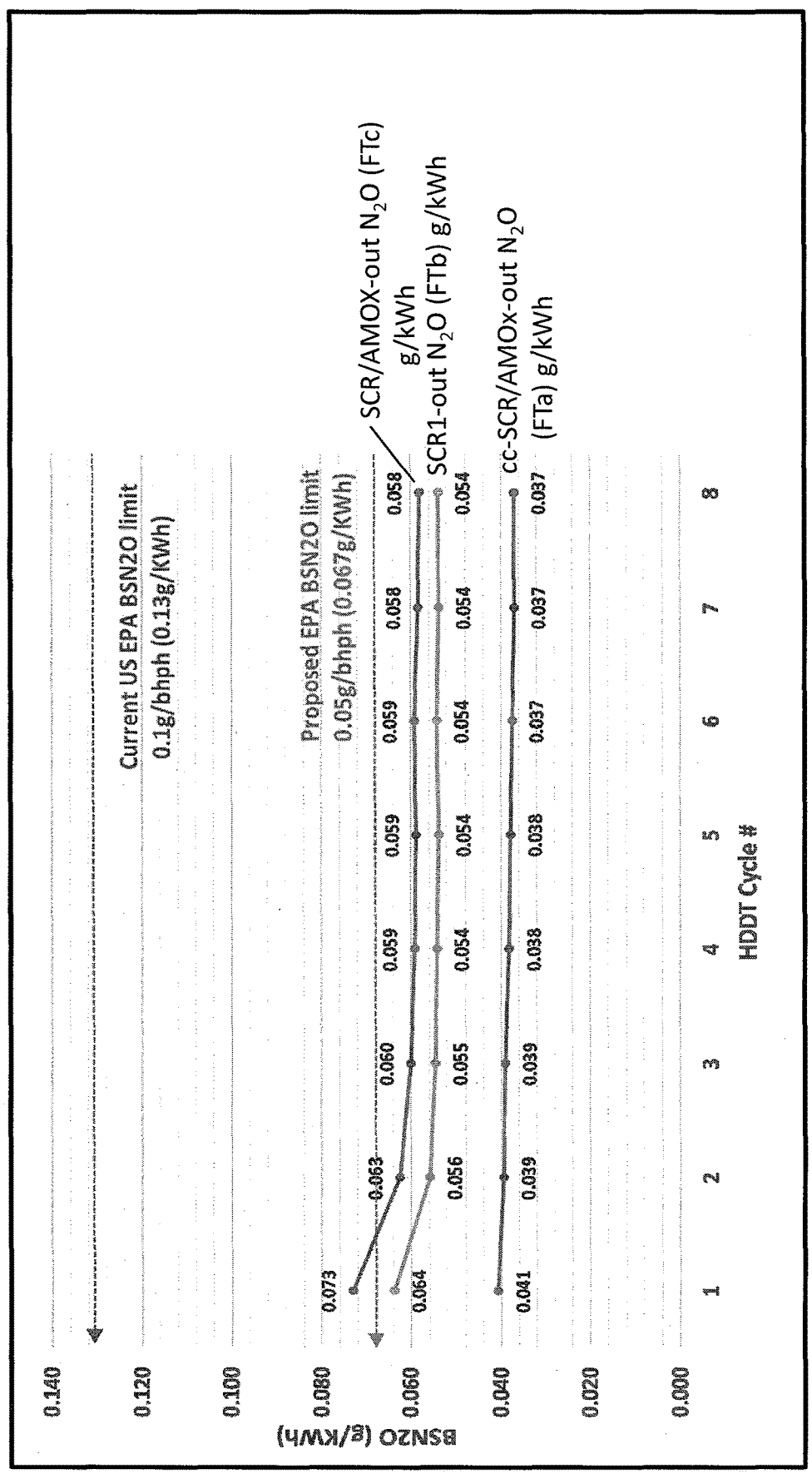
FIG. 13 is a plot of $BSN_2O$ levels for an inventive system comprising an upstream, close-coupled SCR/AMOx (NSR=0.7)

As shown in FIG. 13, the $BSN_2O$ levels at cc-SCR/AMOX-out were slightly higher, ~0.037 g/KWh (0.028 g/bhph) than for the test with NSR at the 0.5 level, which can be attributed to the greater deNOx level, i.e., amount of BSNOx reduced. The $BSN_2O$ levels at SCR1-out and SCR/AMOX-out (tailpipe) were also slightly higher for this test, due to the higher levels of NOx conversion. However, tailpipe $BSN_2O$ was still under the proposed EPA limit of 0.05 g/bhph (0.067 g/KWh) and well below the current $BSN_2O$ limit of 0.1 g/bhph (0.13 g/KWh). This test over HDDTs (FTPs) with soaks and low exhaust temperatures showed that urea injection to the cc-SCR at NSR=0.7 gave both BSNOx and $BSN_2O$ levels at SCR/AMOX-out (tailpipe) with good margin relative to the current NOx and proposed $N_2O$ limits for heavy duty diesel applications on-road in the United States. The $NH_3$ slip levels for this test were quite low and at SCR1-out were ~1 ppm average and ~11 ppm peak, while at SCR/AMOX-out (tailpipe) they were 0.1 ppm average and 0.6 ppm peak. These levels are on or below the limits of measurement and well below the EPA target of 25 ppm peak. Overall, the testing of the system equipped with a cc-SCR/AMOX showed very good performance to meet current BSNOx targets and proposed EPA $BSN_2O$ targets.

Example 3—Comparison of Standard and Inventive Systems

Systems represented by FIGS. 5A (Comparative System A, below) 5B (Inventive System B, below) and 5C (Inventive System C, below) were compared according to this Example. All testing was conducted on a 13 liter HDD diesel engine on-road, and system components were aged 50 hours at 650° C. before testing. Testing for this Example was run over transient cycles (8 FTPs and 6 WHTCs) with 20 minutes soaks between cycles.

Comparative System A

A comparative exhaust system similar to the System of Example 1 was prepared with the general structure shown in FIG. 5A, having a close-coupled DOC, followed by a downstream CSF, a downstream SCR ("SCR1") catalyst, and a downstream SCR/AMOx catalyst. The DOC was a flow-thru DOC coated onto a 13"×6" flow-thru substrate with 400 cpsi and 4 mil wall thickness. It was formulated with Pt and Pd on alumina. The DOC was zoned, with an inlet zone that was 33% of the total catalyst length (i.e., 2") and designed for fuel L/O function for active regeneration. The DOC had a 60 g/ft$^3$ Pt and Pd at a 1:1 ratio. The rear zone 67% of the catalyst length (i.e. 4") was for oxidizing NO to $NO_2$ and had 30 g/ft$^3$ Pt and Pd at 5:1 ratio. The overall platinum-group metal loading on this DOC was 40 g/ft$^3$ (2:1 ratio). The CSF was a 13"×7" filter substrate with 300 cpsi and a 9 mil wall thickness. The filter substrate was coated with 4 g/ft$^3$ Pt and Pd at 4:1 ratio supported on alumina. The SCR1 catalyst contained a Fe/Cu-CHA zoned SCR, having a 3" inlet zone of Fe-CHA (2.35% $Fe_2O_3$) and a 3.5" outlet zone of Cu-CHA (2.35% CuO). The dry gain (DG) in each zone was 2.5 g/in$^3$. The SCR/AMOx was a 13"×5.5" flow-thru substrate with 600 cpsi and a 3 mil wall thickness. It had a zoned SCR/AMOX configuration, with a 2" long rear AMOX bottom zone coat of Pt-only (2 g/ft$^3$ in the zone) on alumina. It also had a full length SCR topcoat of Cu-chabazite (2.35% CuO) at 2.5 g/in$^3$ DG loading, which also covered the rear AMOx zone.

A series of eight heavy-duty diesel truck (HDDT) (Federal Test Procedure, FTP) cycles and 6 World Harmonized Transient Cycles (WHTCs) were run with 20 minute soaks between the cycles. FTIRs were set up at SCR/AMOx-out (FT1), SCR1-out (FT2), and SCR/AMOx-out (FT3) and direct benches were set up at engine-out (D1) and tailpipe-out (D2).

Figure 14:
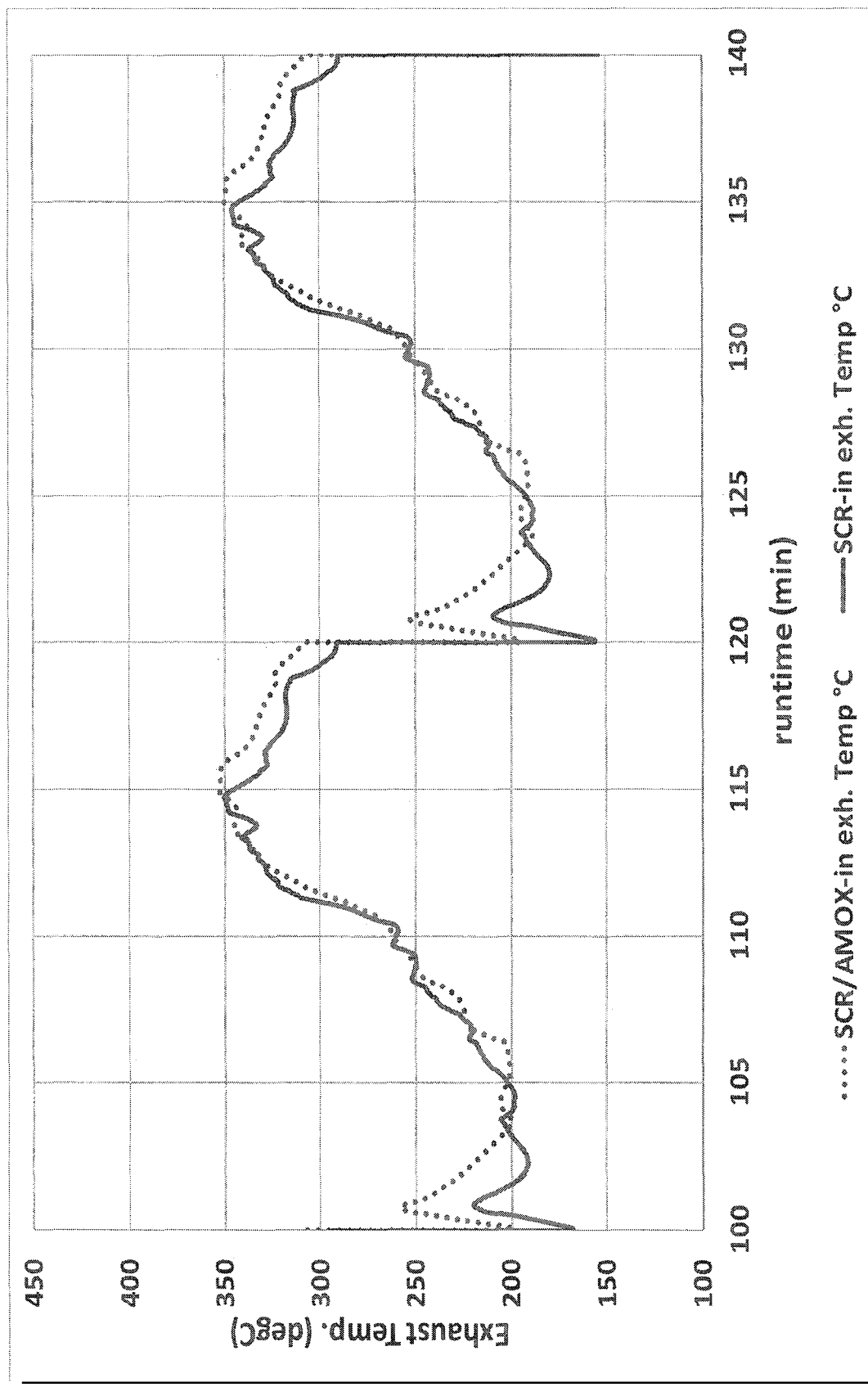
FIG. 14 is a plot of exhaust temperature at SCR-in and at SCR-AMOx-in over time for a comparative DOC/CSF/SCR/SCR-AMOx system over two FTP cycles (w/ soaks)
Figure 15:
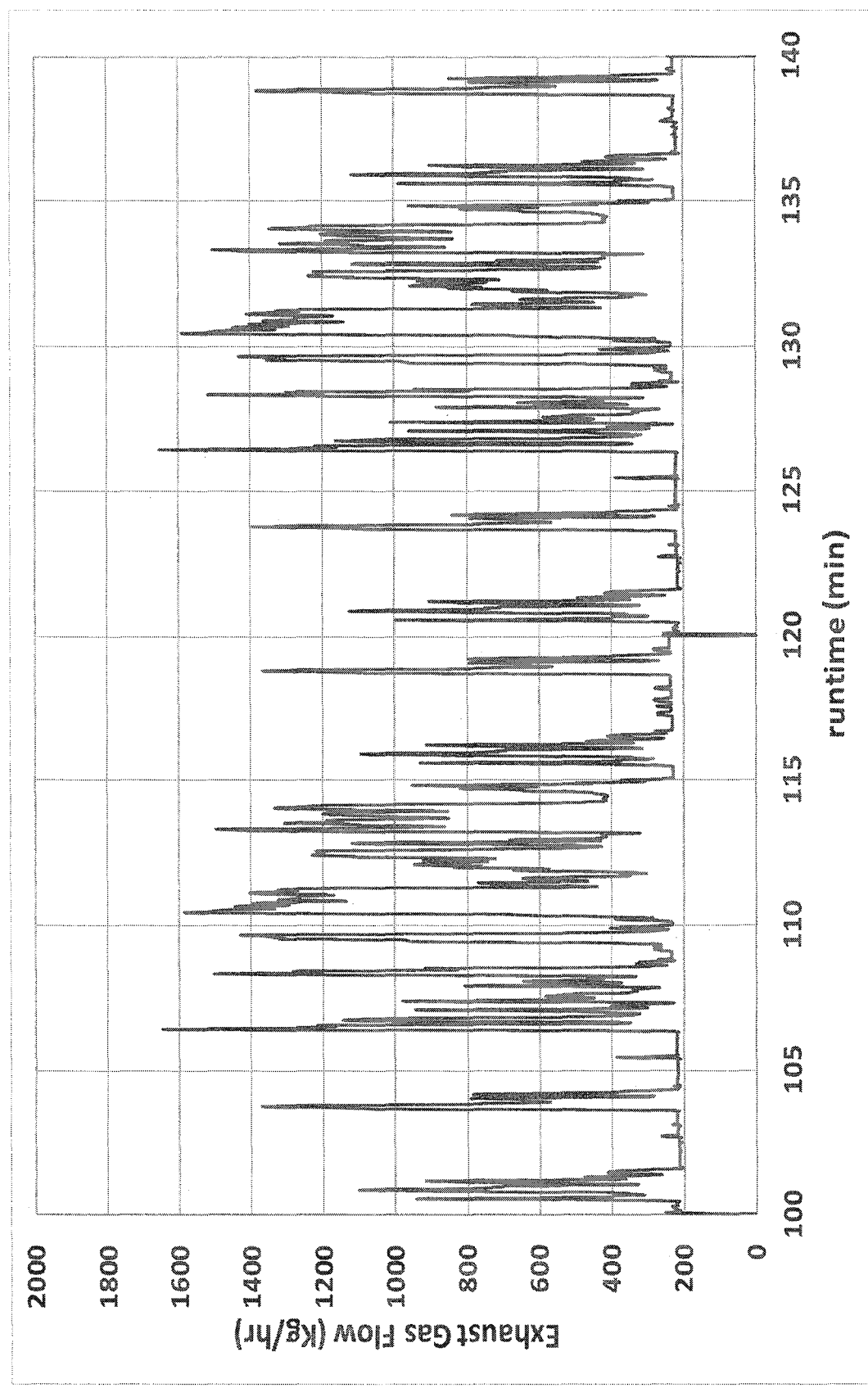
FIG. 15 is a plot of exhaust gas flow over time for a standard (comparative) DOC/CSF/SCR/SCR-AMOx system over two FTP cycles (w/ soaks)
Figure 16:
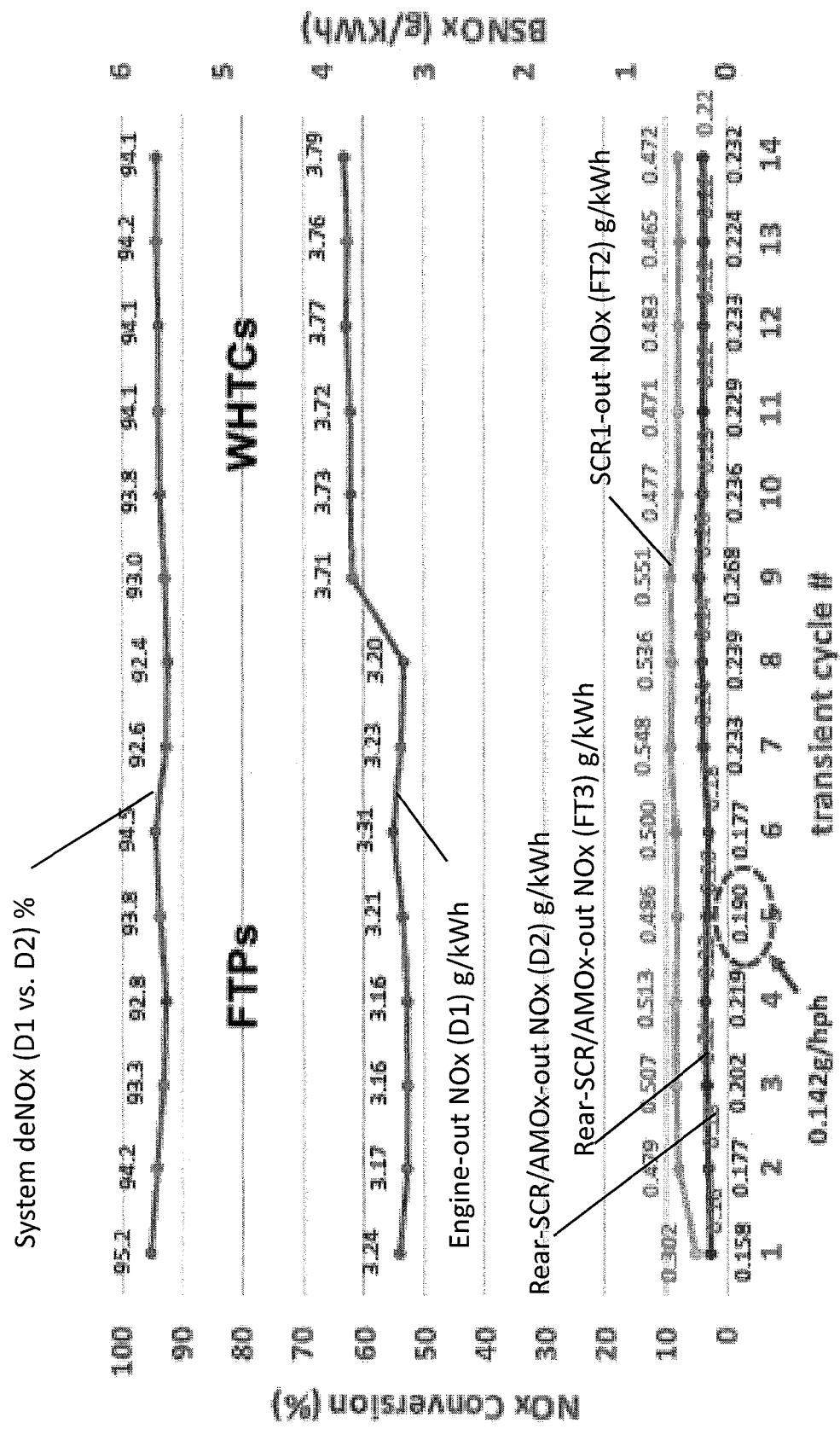
FIG. 16 is a plot of BSNOx and NOx conversion for a standard (comparative) DOC/CSF/SCR/SCR-AMOx system, analyzed over 8 HDDTs (FTPs) and 6 WHTCs.
Figure 17:
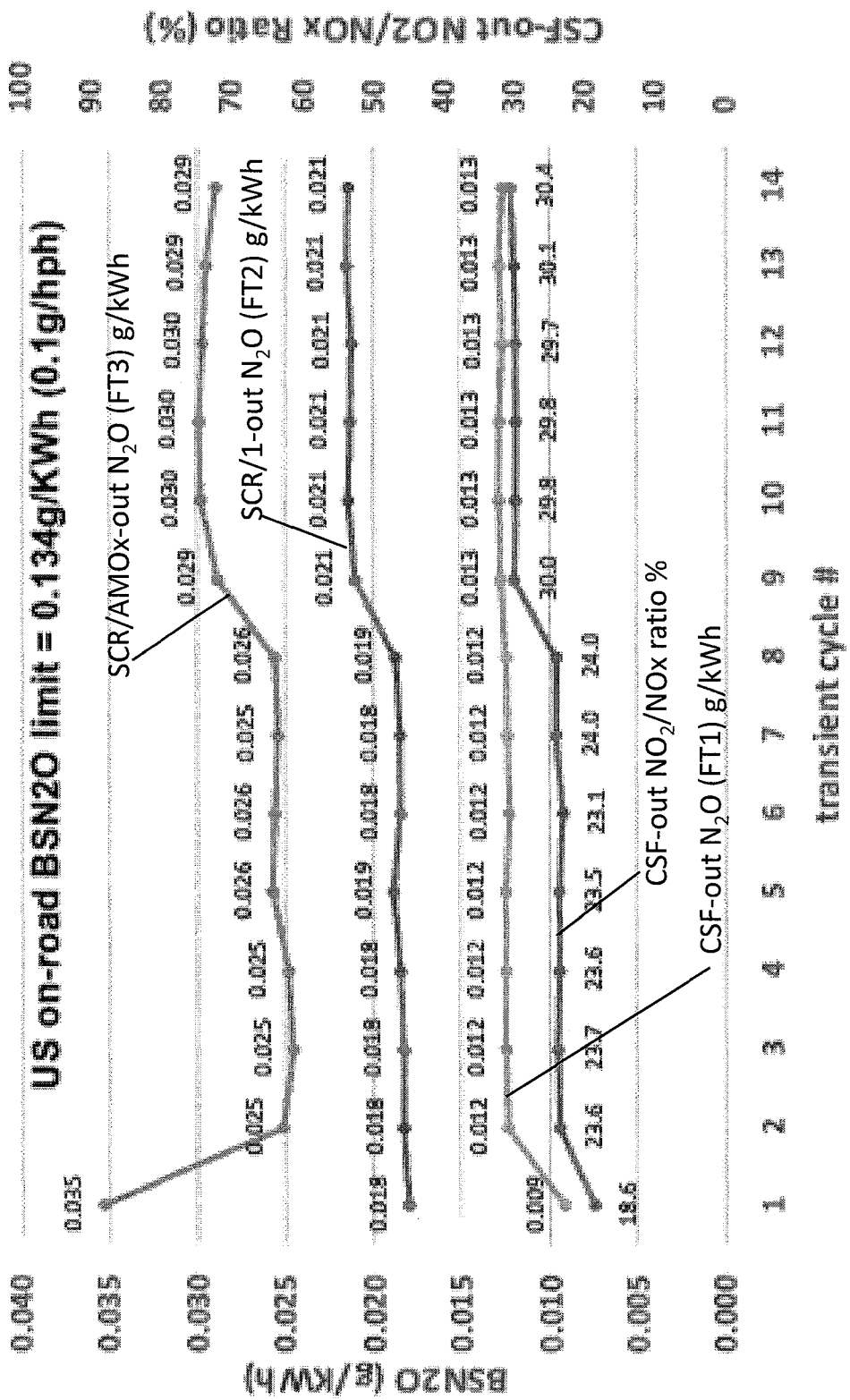
FIG. 17 is a plot of $BSN_2O$ levels for a standard (comparative) DOC/CSF/SCR//SCR-AMOx system, analyzed over 8 HDDTs (FTPs) and 6 WHTCs.

The exhaust temperatures at SCR/AMOx-in and SCR1-in were analyzed, and it was found that the exhaust temperature to both SCR/AMOx and SCR1 over the initial stage of the cycle were quite low (around 190° C.) and only reached their peak (around 350° C.) in the latter stages of the FTP cycles, as shown in FIG. 14. The exhaust gas flow over time for this comparative system is shown in FIG. 15. The BSNOx and NOx conversion for this system were analyzed over the 8 HDDTs (FTPs) and 6 WHTCs as shown in FIG. 16. $BSN_2O$ levels for this system are shown in FIG. 17.

Inventive System B

Figure 18:
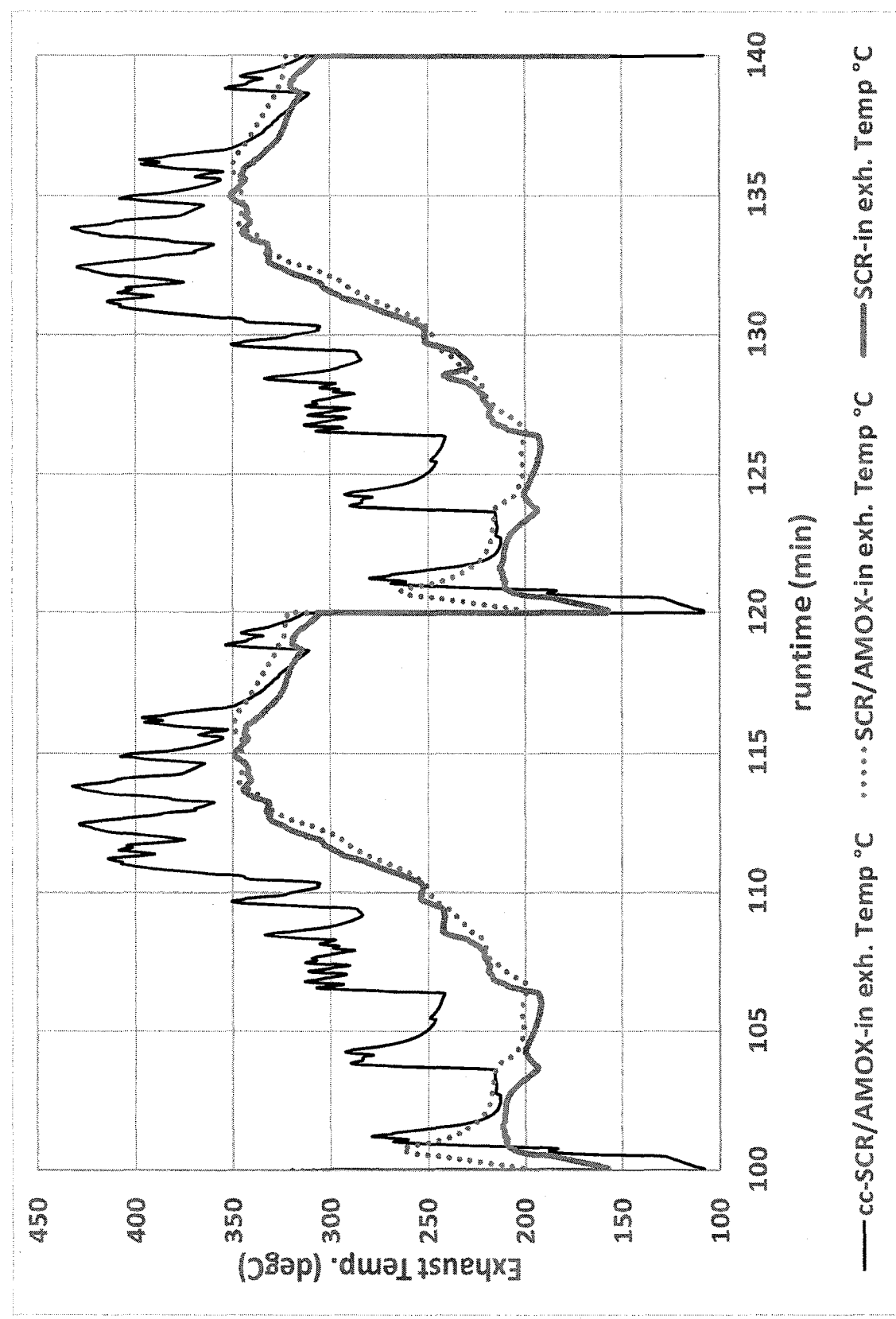
FIG. 18 is a plot of exhaust temperature at various positions over time for an inventive exhaust gas treatment system comprising an upstream cc-SCR/AMOx over two FTP cycles (w/ soaks)
Figure 19:
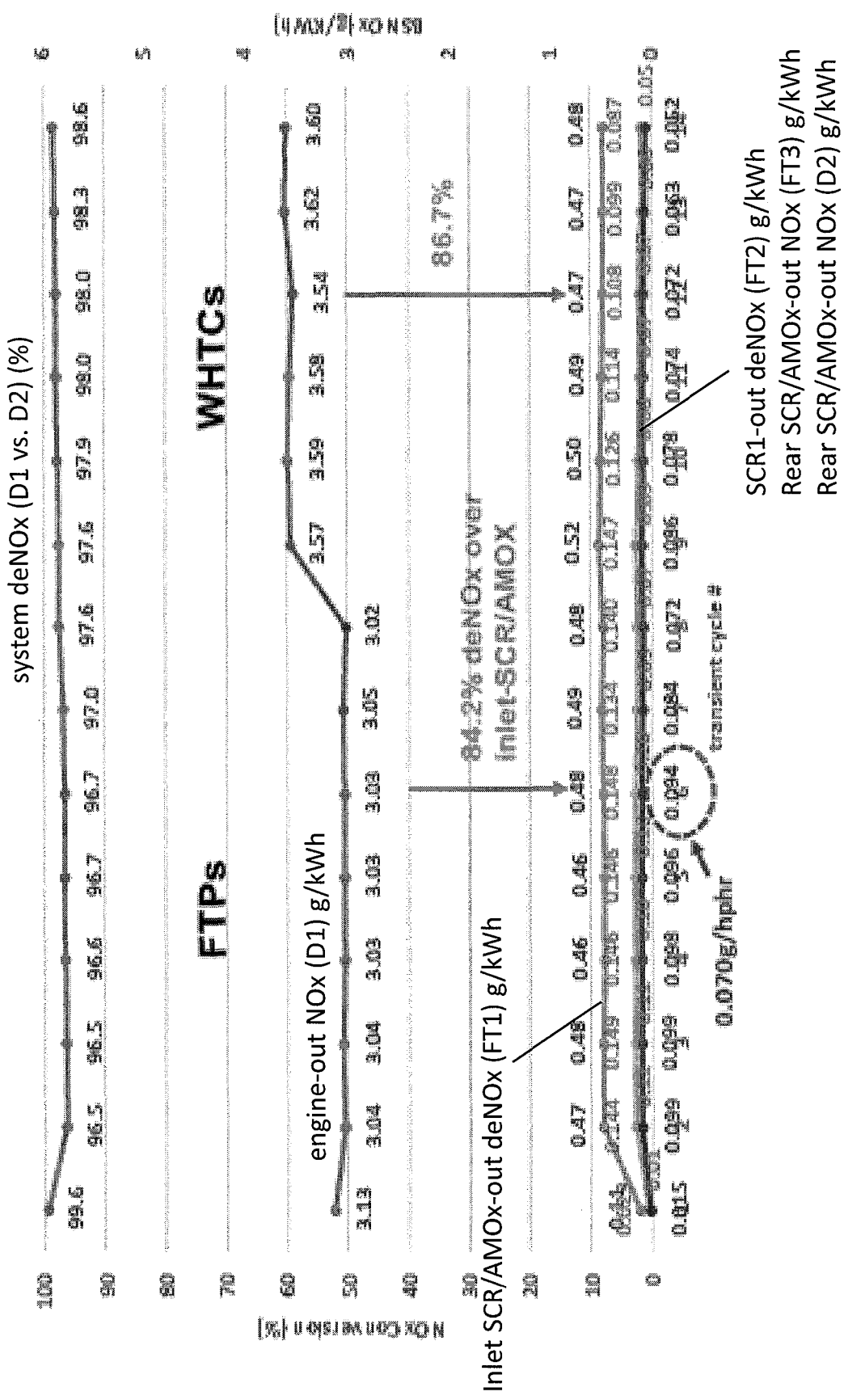
FIG. 19 is a plot of BSNOx and NOx conversion for an inventive SCR-AMOx/DOC/CSF/SCR/SCR-AMOx system, analyzed over 8 HDDTs (FTPs) and 6 WHTCs.
Figure 20:
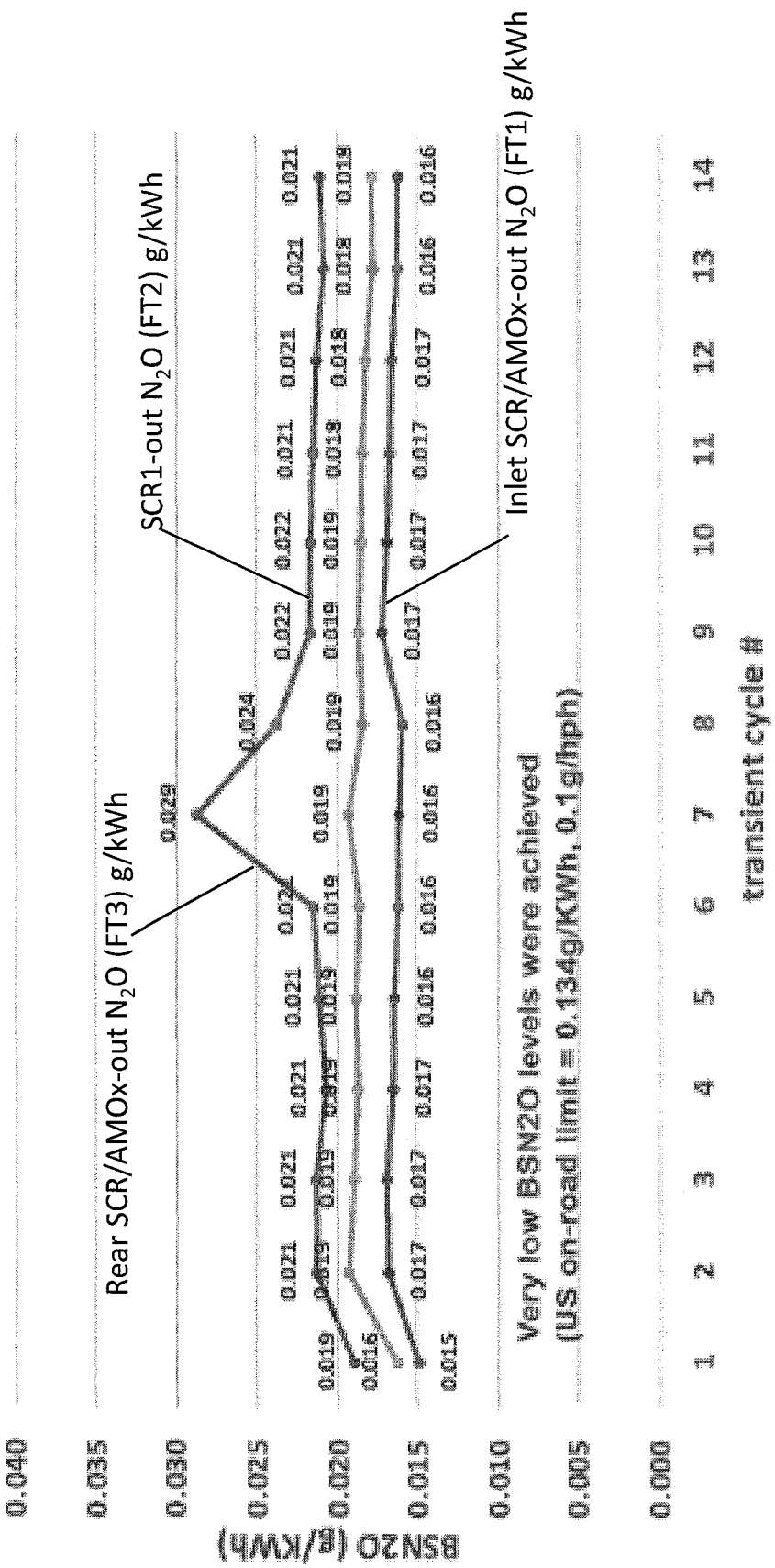
FIG. 20 is a plot of $BSN_2O$ levels for an inventive SCR-AMOx/DOC/SCR/SCR/SCR-AMOx system, analyzed over 8 HDDTs (FTPs) and 6 WHTCs.

An inventive system analogous to Comparative System A was prepared, but with a close-coupled SCR/AMOx (cc-SCR/AMOx) upstream of the other components of the system (with the general structure shown in FIG. 5B). As with the Inventive System of Example 2, this system also required dual urea injection (one injection upstream of the cc-SCR/AMOx and one injection upstream of SCR1). A series of eight HDDT (FTP) cycles and 6 WHTCs were run with 20 minute soaks between the cycles (NSR to inlet-SCR/AMOx was 0.9), and FIG. 18 shows the exhaust temperatures over FTP cycles 6 and 7 at various positions. The exhaust temperatures at the cc-SCR/AMOX-in (inlet-SCR/AMOx) are significantly higher than the downstream SCR-in and SCR/AMOX-in temperatures. Thus, one aspect of this invention is the recognition that a close-coupled SCR or close-coupled SCR/AMOX (in this example) is able to take advantage of these higher exhaust temperatures to achieve better NOx conversion. This system was found to have much lower tailpipe BSNOx due to inclusion of the inlet SCR/AMOx. $BSN_2O$ levels for this system are shown in FIG. 19. Very low $BSN_2O$ levels were achieved over this system, as shown. $BSN_2O$ levels for this system are shown in FIG. 20.

Inventive System C

Figure 5C:
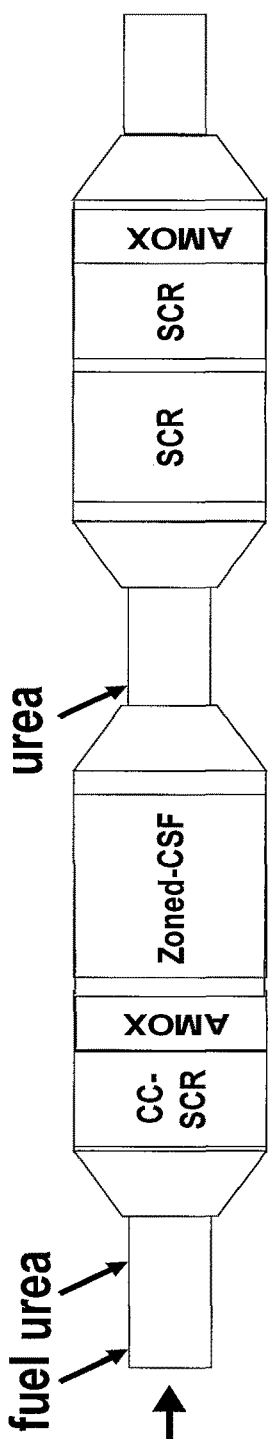
Figure 5D:
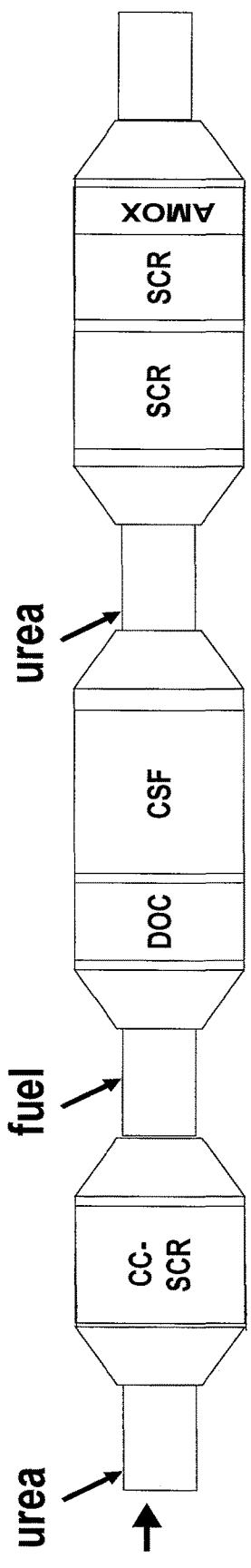
Figure 5E:
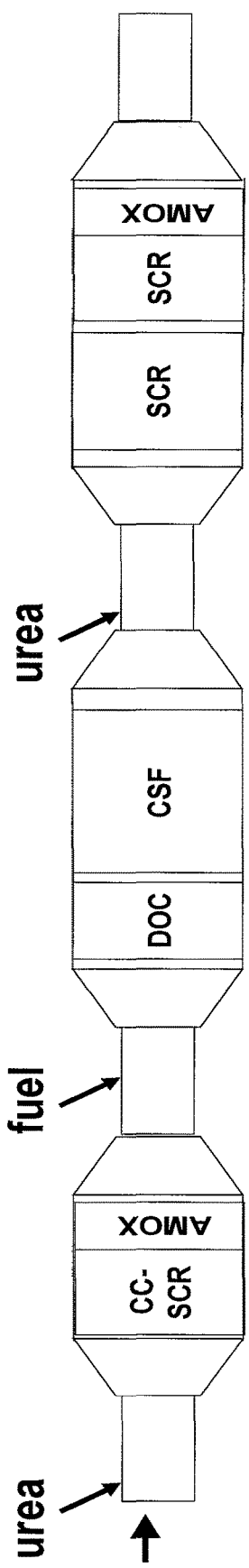
Figure 5F:
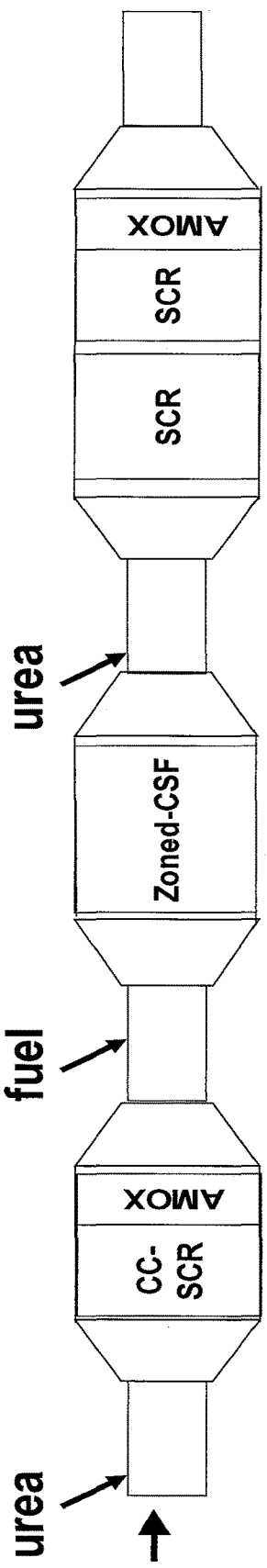

An inventive system analogous to Comparative System A was prepared, but with an underfloor, inlet SCR/AMOx upstream of the other components of the system (with the general structure shown in FIG. 5C, except that the first SCR was under-floor, rather than close-coupled). This system required dual urea injection (one injection upstream of the inlet SCR/AMOx and one injection upstream of SCR1). FTIRs were set up at uf-SCR/AMOx-out (FT1), SCR1-out (FT2), and SCR/AMOx-out (FT3) and direct benches were set up at engine-out (D1) and tailpipe-out (D2). A series of eight HDDT (FTP) cycles and 6 WHTCs were run with 20 minute soaks between the cycles.

Figure 21:
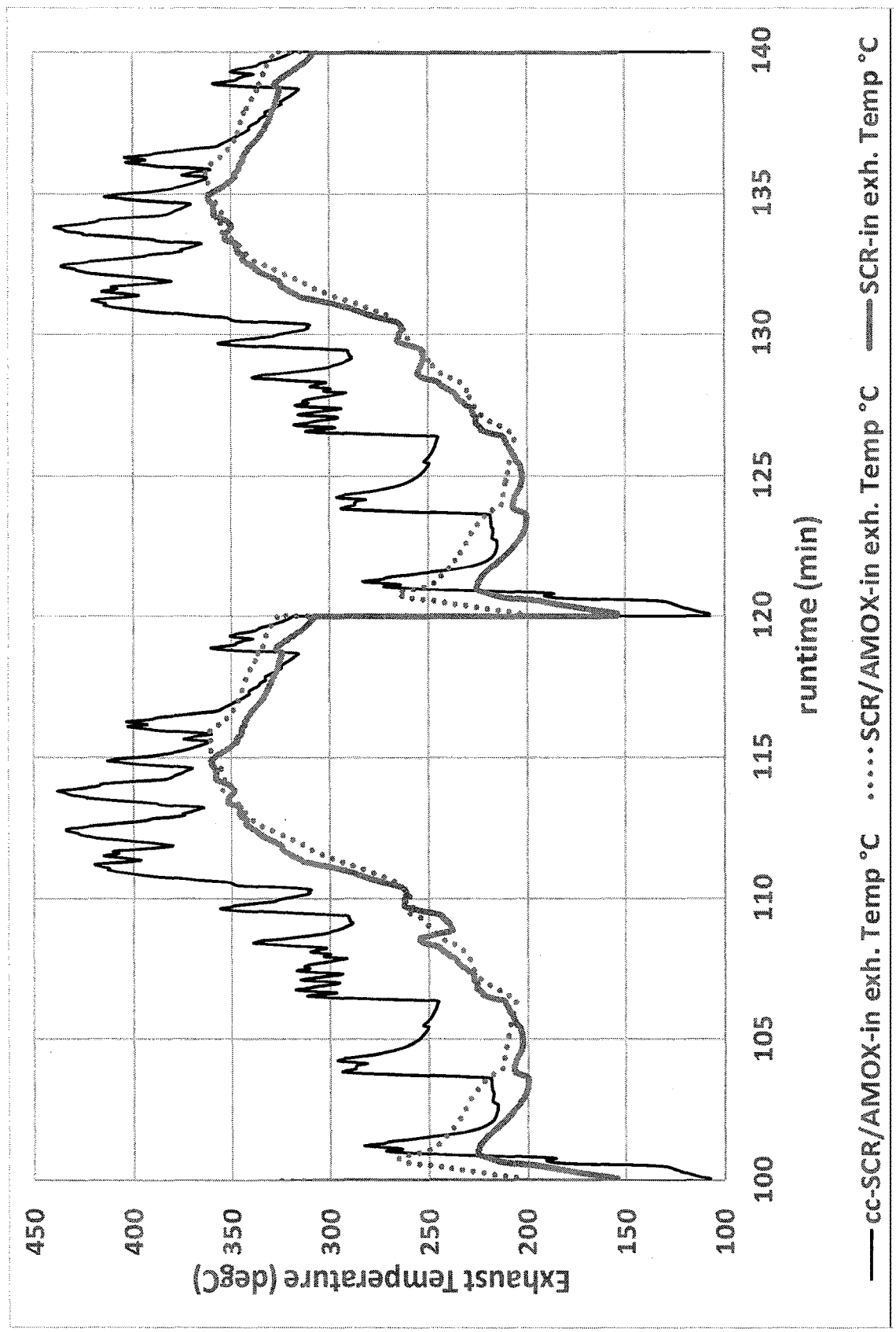
FIG. 21 is a plot of exhaust temperature at various positions over time for an inventive exhaust gas treatment system comprising an upstream SCR/AMOx over two FTP cycles (w/ soaks)
Figure 22:
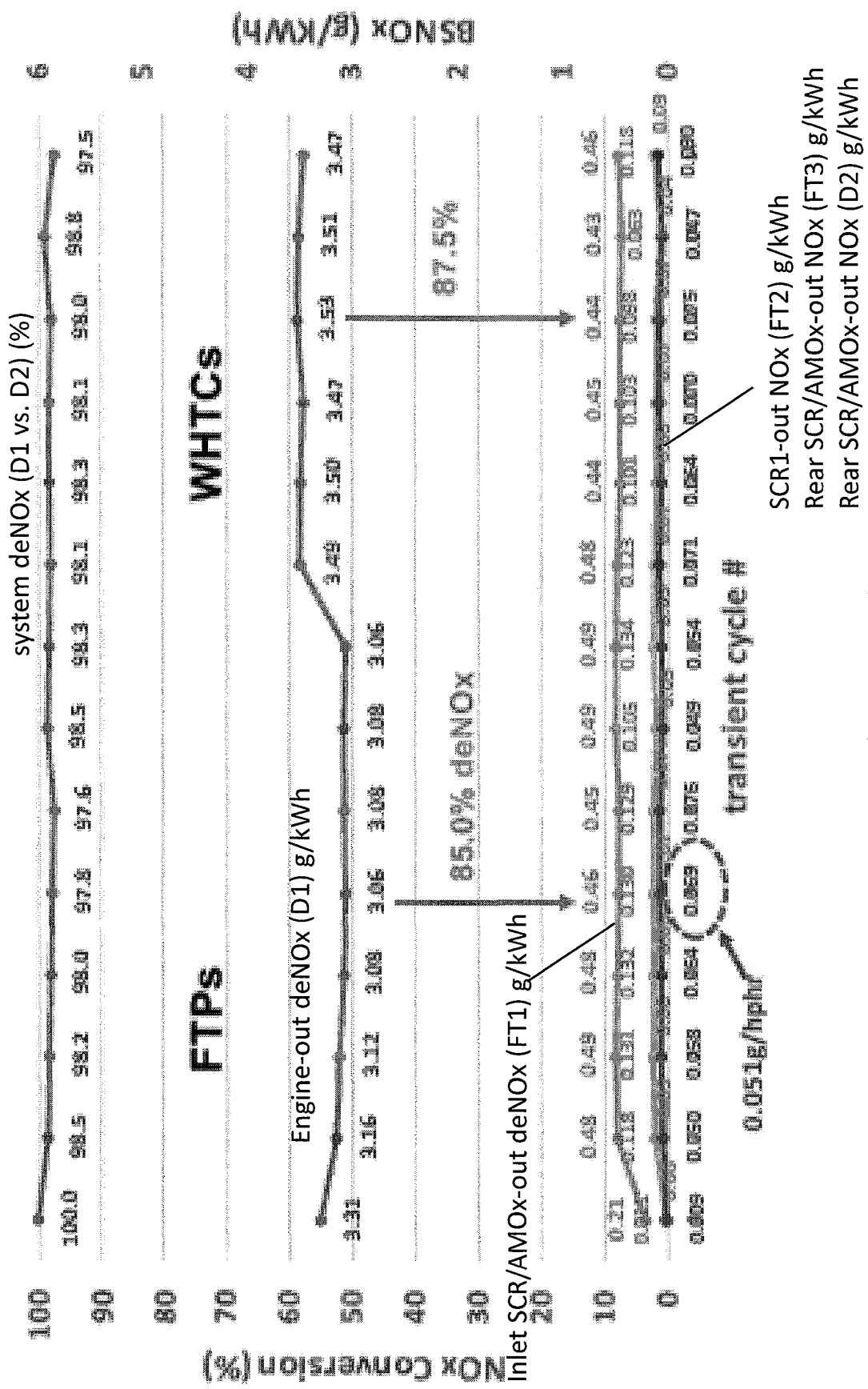
FIG. 22 is a plot of BSNOx and NOx conversion for an inventive underfloor SCR/AMOx-containing system, i.e., a SCR-AMOx/DOC/CSF/SCR/SCR-AMOx system, analyzed over 8 HDDTs (FTPs) and 6 WHTCs.
Figure 23:
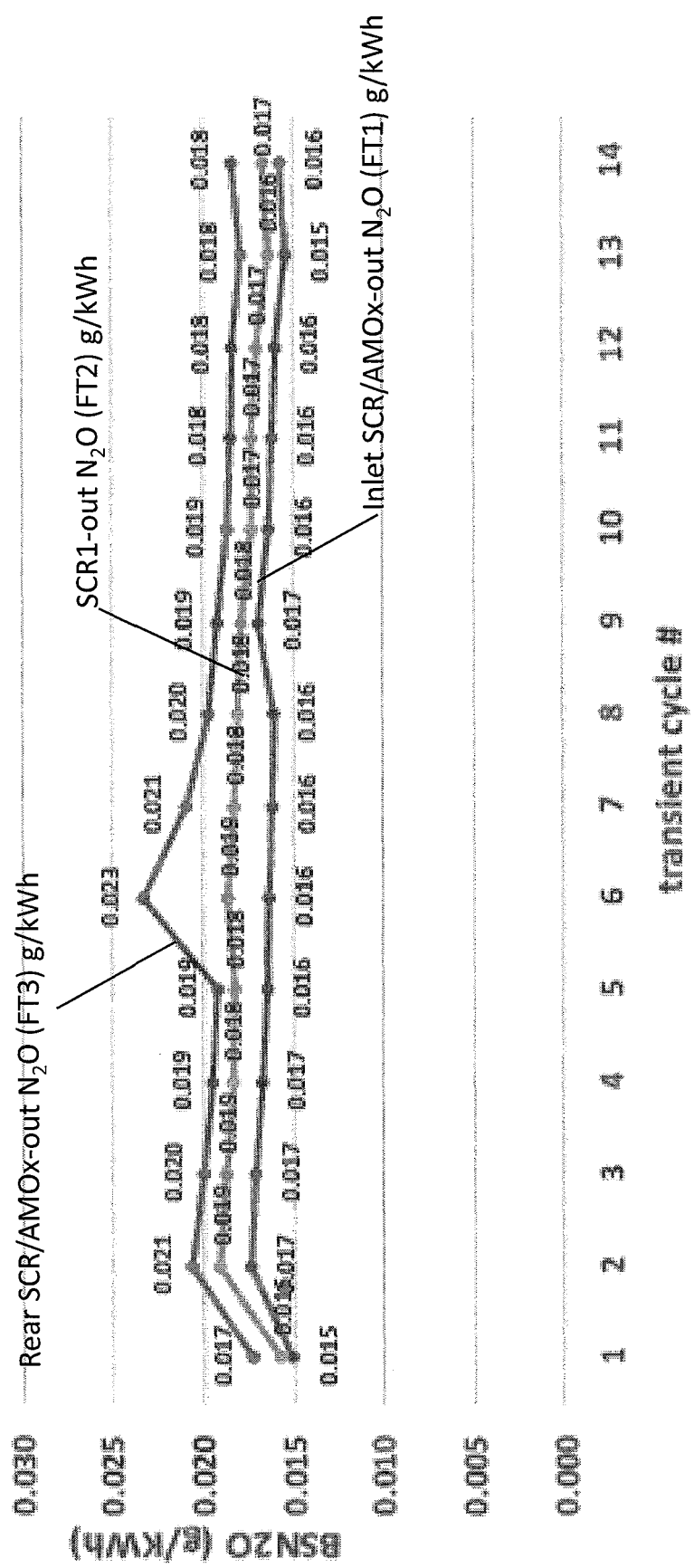
FIG. 23 is a plot of $BSN_2O$ levels for an inventive underfloor SCR/AMOx-containing system, i.e., a SCR-AMOx/DOC/CSF/SCR/SCR-AMOx system, analyzed over 8 HDDTs (FTPs) and 6 WHTCs.

This system was found to have essentially the same exhaust temperatures at the upstream SCR/AMOX-in as those of Inventive System B, but with a slight increase in exhaust temperature to the downstream SCR and SCR/AMOx, as shown in FIG. 21. This is believed to be a result of the smaller (smaller thermal mass) of the 10.5" dia. zoned-CSF compared with the full size 13" dia. DOC+CSF. This system was found to have very low rear SCR/AMOx-out (tailpipe), approaching the California Air Resources Board (ARB) limits (0.02 g/bhph BSNOx), as shown in FIG. 22. $BSN_2O$ levels for this system are shown in FIG. 23. Very low $BSN_2O$ levels were again achieved over this system, which were well below the 0.134 g/KWh (0.1 g/bhph) U.S. on-road limit.

Comparison Between Comparative System A and Inventive Systems B and C

Figure 24:
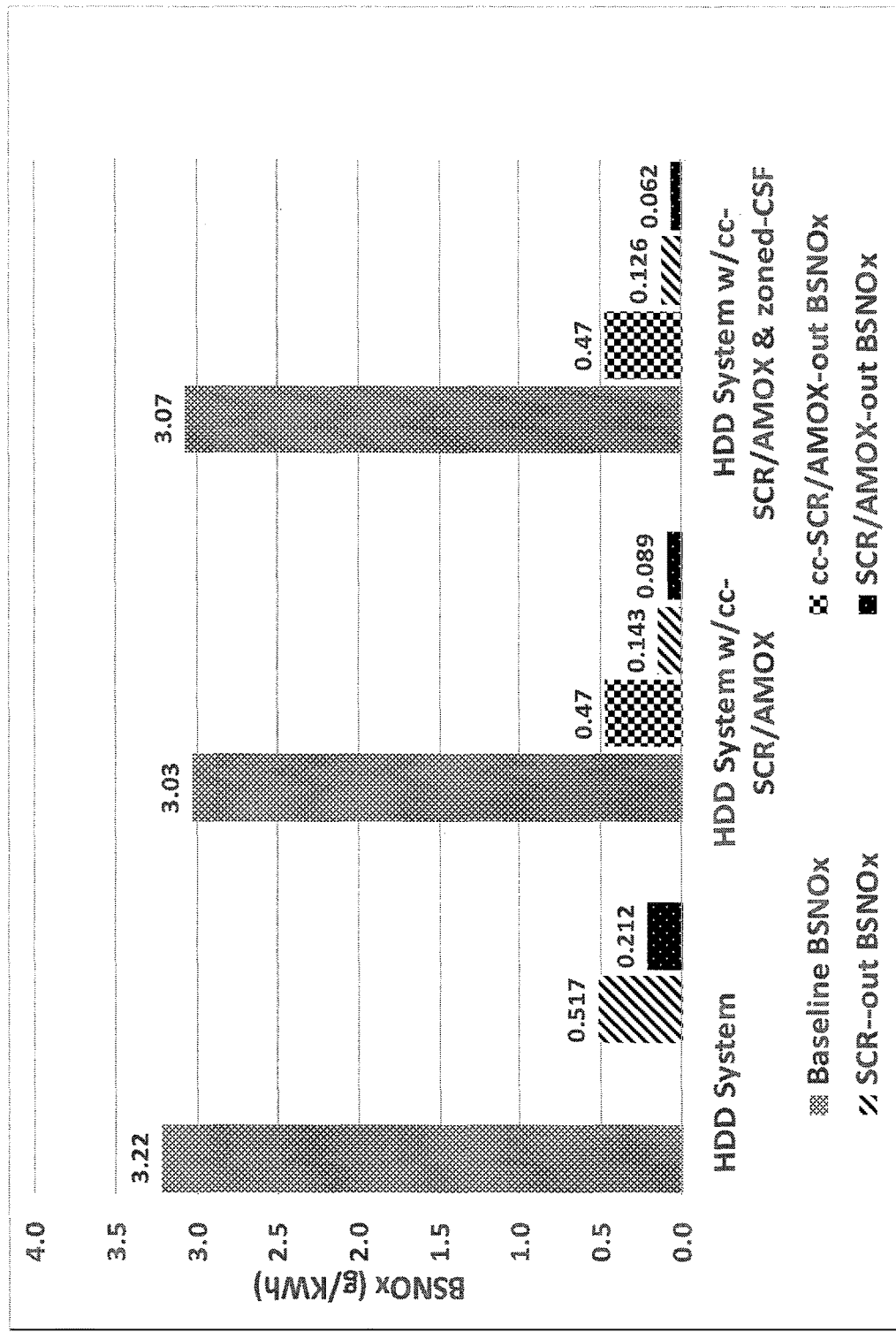
FIG. 24 is a graph of baseline BSNOx across a comparative (HDD) system and two inventive systems (HDD System with a cc-SCR/AMOx and HDD System with a cc-SCR/AMOx and zoned-CSF) in g/KWh.

FIG. 24 provides a comparison between BSNOx values at various positions within Comparative System A (shown as "HDD System"), Inventive System B ("HDD System w/cc-SCR/AMOX"), and Inventive System C ("HDD System w/cc-SCR/AMOX & zoned-CSF"). As shown, for comparable baseline BSNOx values, the BSNOx value at SCR/AMOx-out (i.e., the tailpipe emission) of Inventive System B is significantly lower than that of Comparative System A (0.089 g/KWh v. 0.212 g/KWh). The B SNOx value at SCR/AMOx-out (i.e., the tailpipe emission) of Inventive System C is even lower, with a value of 0.062 g/KWh. This graph demonstrates the effectiveness of the inclusion of an upstream SCR component within the exhaust gas treatment system.

Figure 25:
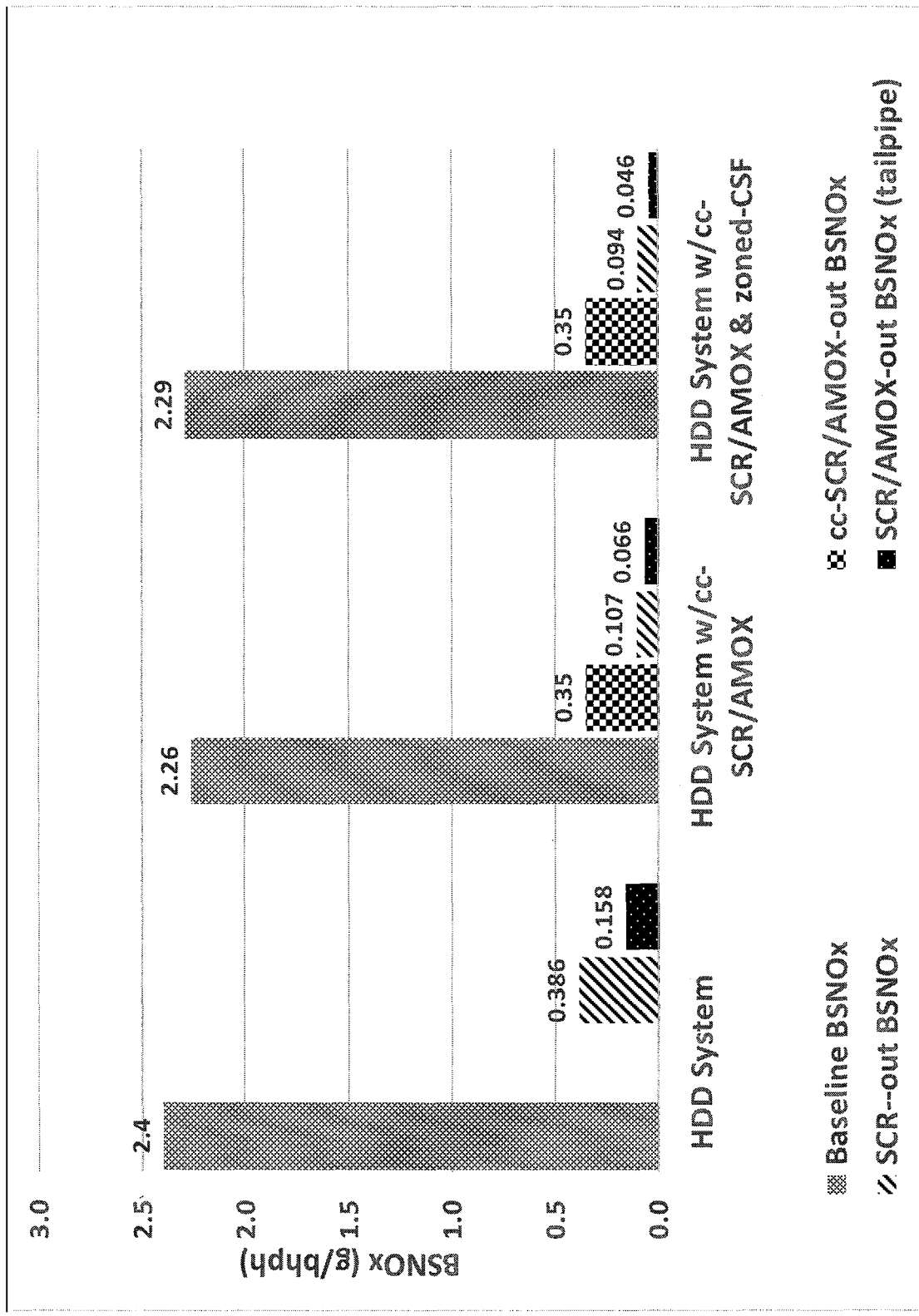
FIG. 25 is a graph of baseline BSNOx across a comparative (HDD) system and two inventive systems (HDD System with a cc-SCR/AMOx and HDD System with a cc-SCR/AMOx and zoned-CSF) in g/bhph.

FIG. 25 provides a similar comparison between BSNOx values at various positions within these systems in units of g/bhph, again demonstrating the effectiveness of the inclusion of a close-coupled (upstream) SCR component within the exhaust gas treatment system. As shown, the inclusion of a cc-SCR/AMOx catalyst resulted in a reduction in B SNOx at SCR/AMOx-out (i.e., the tailpipe emission) from 0.158 g/bhph to 0.066 g/bhph. The inclusion of a zoned CSF in place of the DOC-CSF further reduced the BSNOx at SCR/AMOx-out (i.e., the tailpipe emission) to 0.046 g/bhph.

Figure 26:
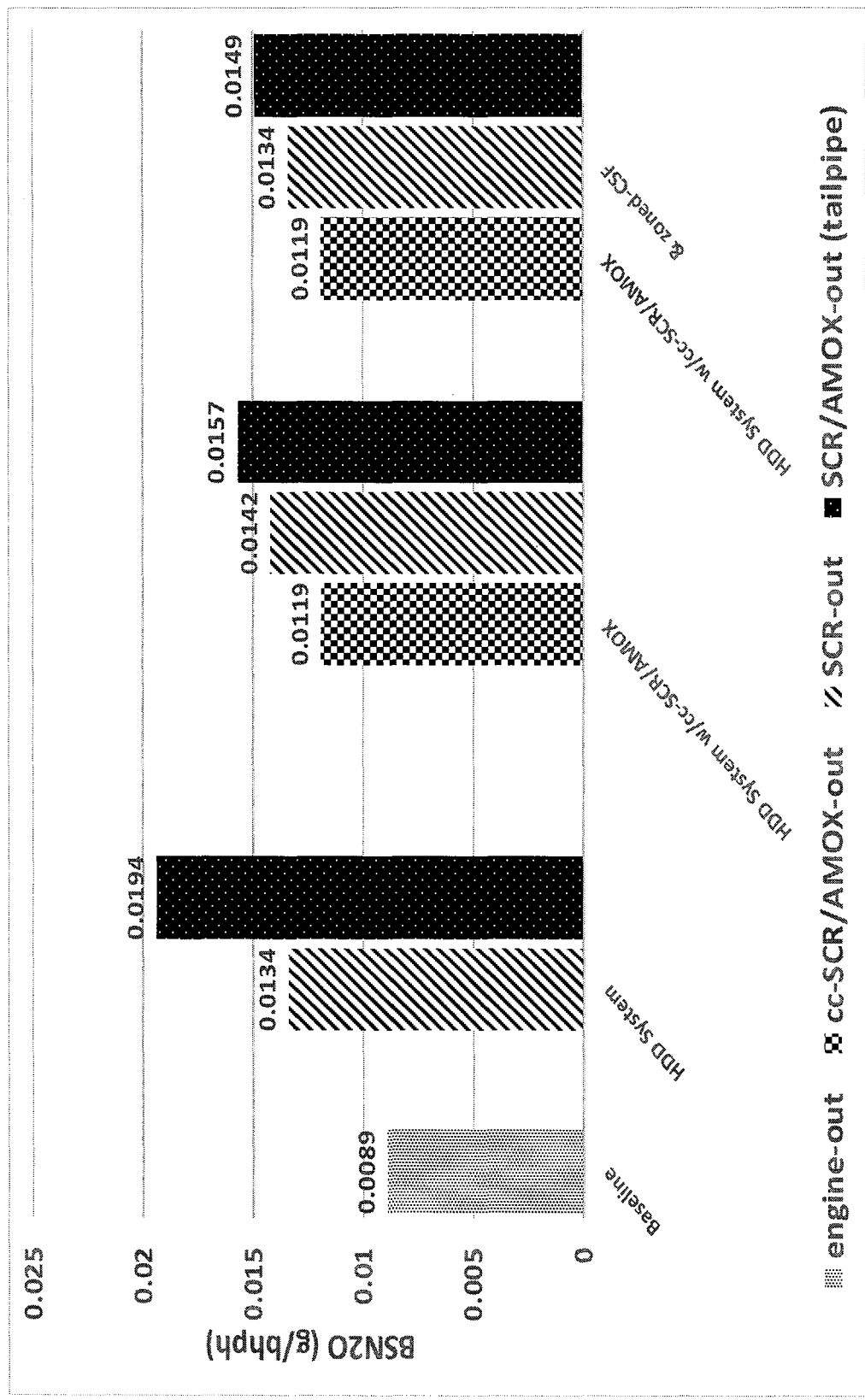
FIG. 26 is a graph of baseline $BSN_2O$ across a comparative (HDD) system and two inventive systems (HDD System w/cc-SCR/AMOx and HDD System with a cc-SCR/AMOx and zoned-CSF)

FIG. 26 provides a comparison between $BSN_2O$ values at various positions within Comparative System A (shown as "HDD System"), Inventive System B ("HDD System w/cc-SCR/AMOX"), and Inventive System C ("HDD System w/cc-SCR/AMOX & zoned-CSF"). As shown, the HDD system resulted in the production of more $N_2O$, with a $BSN_2O$ value at SCR/AMOx-out (i.e., tailpipe emission) of 0.0194 g/bhph. Inclusion of an upstream, cc-SCR/AMOx catalyst (Inventive System B) resulted in a significant decrease in $BSN_2O$, giving a value at SCR/AMOx-out (i.e., tailpipe emission) of 0.0157 g/bhph. Further inclusion of a zoned CSF within the system in place of the DOC and CSF of Inventive System B (Inventive System C) led to a $BSN_2O$ value at SCR/AMOx-out (i.e., tailpipe emission) of 0.0149, representing a further decrease in $BSN_2O$.

Figure 27:
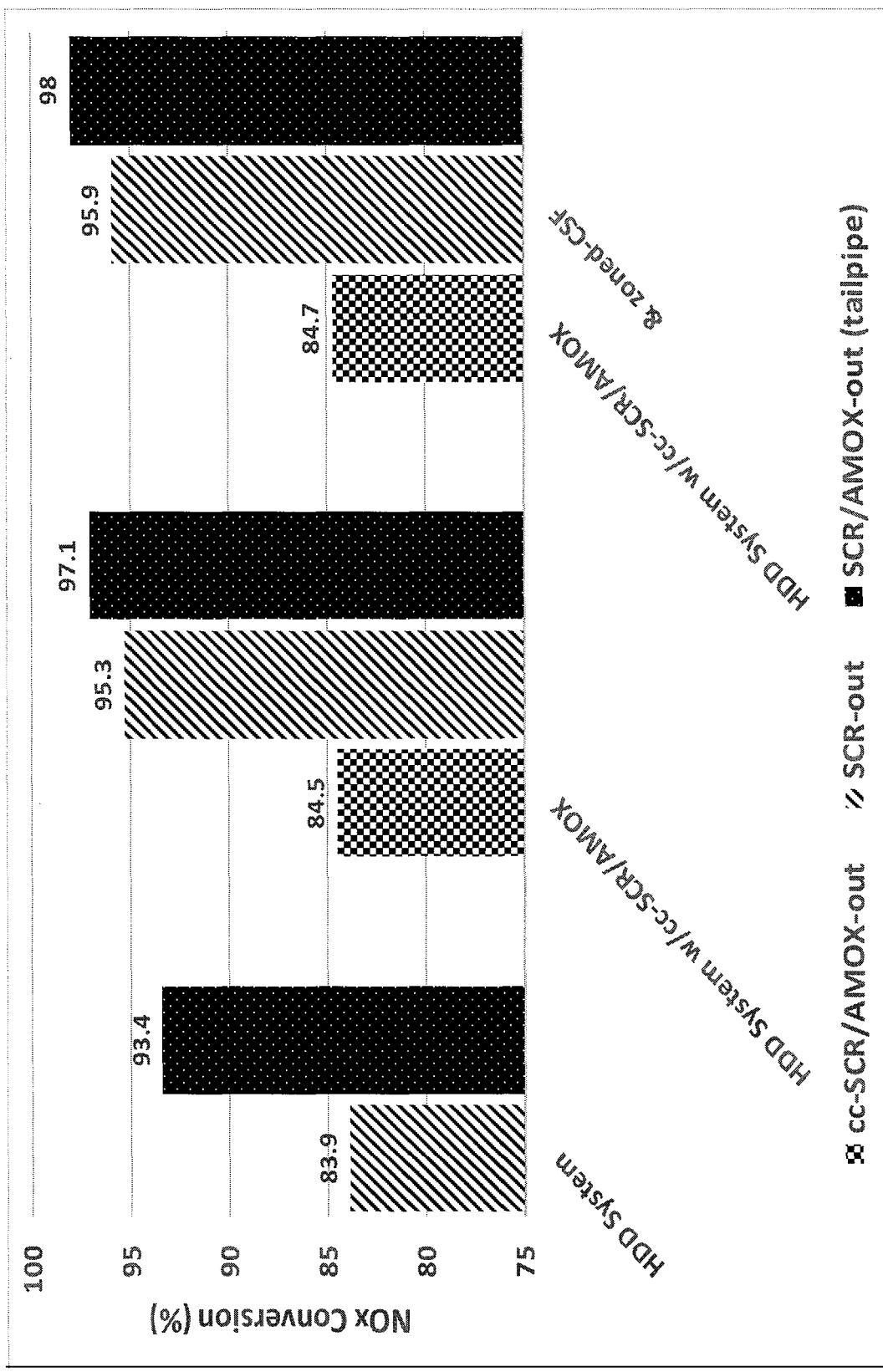
FIG. 27 is a graph of NOx conversion across a comparative (HDD) system and two inventive systems (HDD System with a cc-SCR/AMOx and HDD System with a cc-SCR/AMOx and zoned-CSF)

FIG. 27 provides a comparison between NOx conversion percentages at various positions within Comparative System A (shown as "HDD System"), Inventive System B ("HDD System w/cc-SCR/AMOX"), and Inventive System C ("HDD System w/cc-SCR/AMOX & zoned-CSF"). As shown, the HDD system provided a NOx conversion of 93.4% at SCR/AMOx-out (tailpipe emission). Both Inventive System B and Inventive System C outperformed Comparative System A in NOx reduction, providing a 97.1% NOx conversion and a 98% NOx conversion, respectively, at SCR/AMOx-out (tailpipe emission).

A summary of certain results from Comparative System A and Inventive Systems B and C is provided in the table below.

|  | FTP Base NOx (g/KWh) | FTP System deNOx (%) | FTP Tailpipe NOx (g/KWh) (g/bhph) |
|---|---|---|---|
| Comparative System A | 3.2 | 93.2 | 0.212 (0.158) |
| Inventive System B | 3.0 | 96.9 | 0.089 (0.066) |
| Inventive System C | 3.1 | 98.0 | 0.062 (0.046) |
|  | WHTC Base NOx (g/KWh) | WHTC System deNOx (%) | WHTC Tailpipe NOx (g/KWh) (g/bhph) |
| Comparative System A | 3.8 | 94.1 | 0.231 (0.172) |
| Inventive System B | 3.6 | 98.2 | 0.068 (0.051) |
| Inventive System C | 3.5 | 98.1 | 0.069 (0.052) |

Each system setup met the respective emissions targets at the tailpipe, with FTP target of 0.2 g/bhpd, and the two inventive system setups approached ARB target levels (0.02 g/bhph). Each system setup further met the WHTC target of 0.46 g/KWh, EU, VI). Tailpipe BSN$_2$O levels were very low for the inventive system setups as well, well below the 0.1 g/bhph on-road United States limit.

Example 3

A study was conducted to compare the effect of the specific upstream SCR composition in the exhaust gas treatment system, and in particular, to an exhaust gas treatment system comprising the following configuration: SCR/AMOx-DOC-CSF-SCR-AMOx.

A first, comparative system was provided, under fresh conditions, comprising an SCR/AMOX upstream of a standard Euro VI or US EPA 2010 aftertreatment system of DOC/CSF/SCR/AMOX. It is known that $SO_3$ (rather than $SO_2$) acts as a deactivation species, especially for zeolite-based SCR materials. The fraction of $SO_3$ entering the upstream SCR is significantly less than for the downstream SCR as it does not contain an oxidation catalyst upstream of it; however, the engine will, under normal operating conditions, still emit low concentrations of $SO_3$. Deactivation of an upstream Cu-zeolite based SCR therefore commonly occurs over time, albeit at a slower rate compared to a downstream Cu-zeolite SCR.

The disadvantages of a system with an upstream SCR (closer to the engine) are quite apparent—introducing a second SCR upstream of the DOC requires the application of a second urea doser coupled with a new urea calibration. However, the advantages clearly outweigh the disadvantages. Unlike with an NA-DOC, the SCR's functionalities and application in the field are very well understood from the years of deployment in the field. Furthermore, moving an SCR upstream of the DOC would result in the SCR seeing very low $NO_2$ level (engine out only). $N_2O$ make over the SCR is strongly driven by the $NO_2$ to NOx ratio it sees Eliminating the $NO_2$ from the feed results in a significant $N_2O$ reduction over such a system while also achieving exceptionally low tailpipe NOx emissions.

Figure 28:
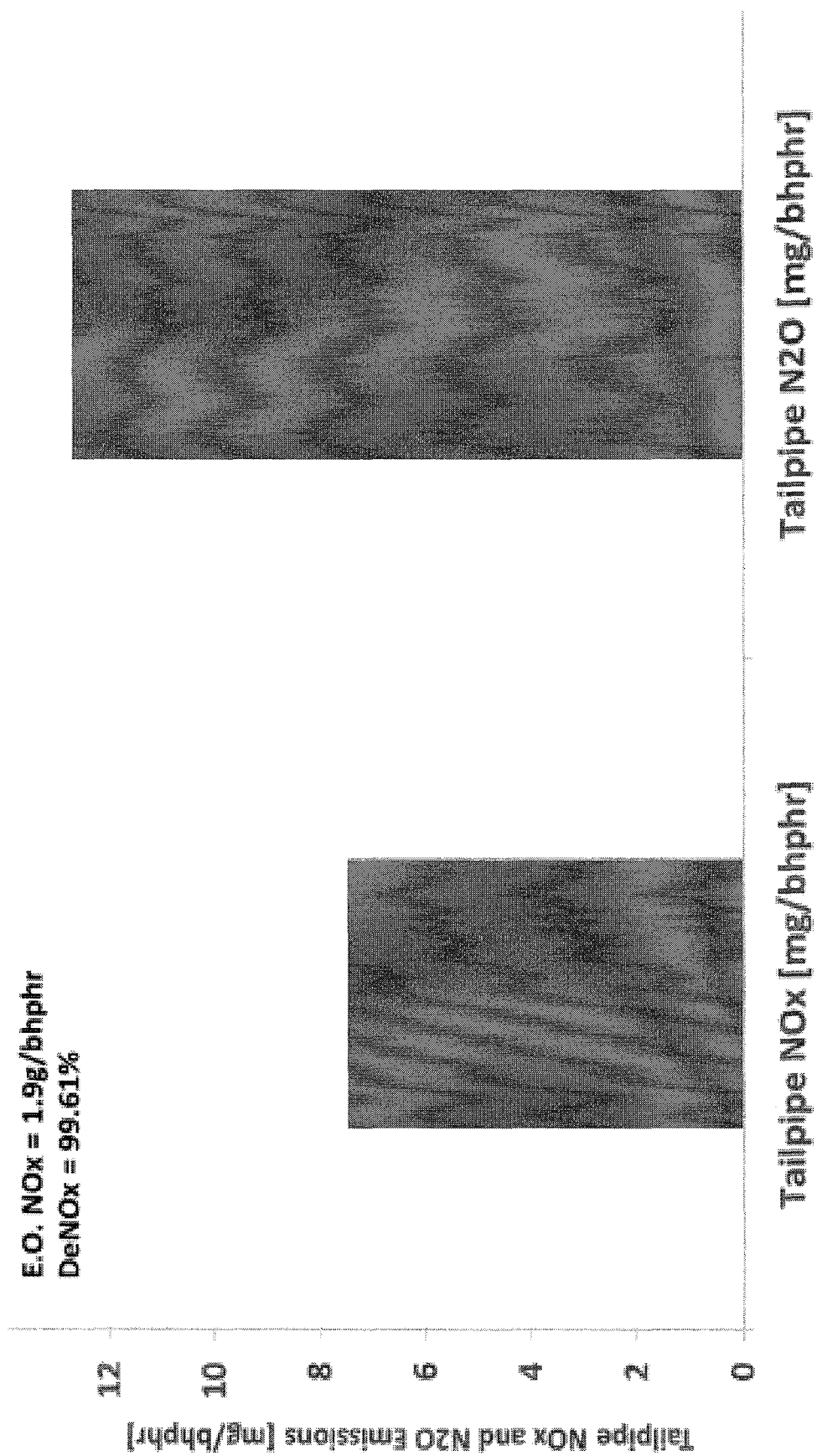
FIG. 28 is a plot of tailpipe NOx and $N_2O$ emissions over a hot FTP (engine-out NSR=1.9 g/bhphr) under fresh conditions.

An inventive system was provided, containing an upstream Cu-zeolite SCR over the hot FTP with an E.O. level of 1.9 g/bhphr. Results were already meeting proposed ultra-low NOx (ULNOx) and $N_2O$ emissions over a hot FTP, albeit at fairly low engine-out NOx level but also using a non-optimized urea doing strategy for the upstream SCR catalyst. See FIG. 28. As shown, the system containing an upstream SCR catalyst was able to achieve a deNOx level of 99.61% with exceptionally low NOx and $N_2O$ emissions concurrently.

Figure 29:
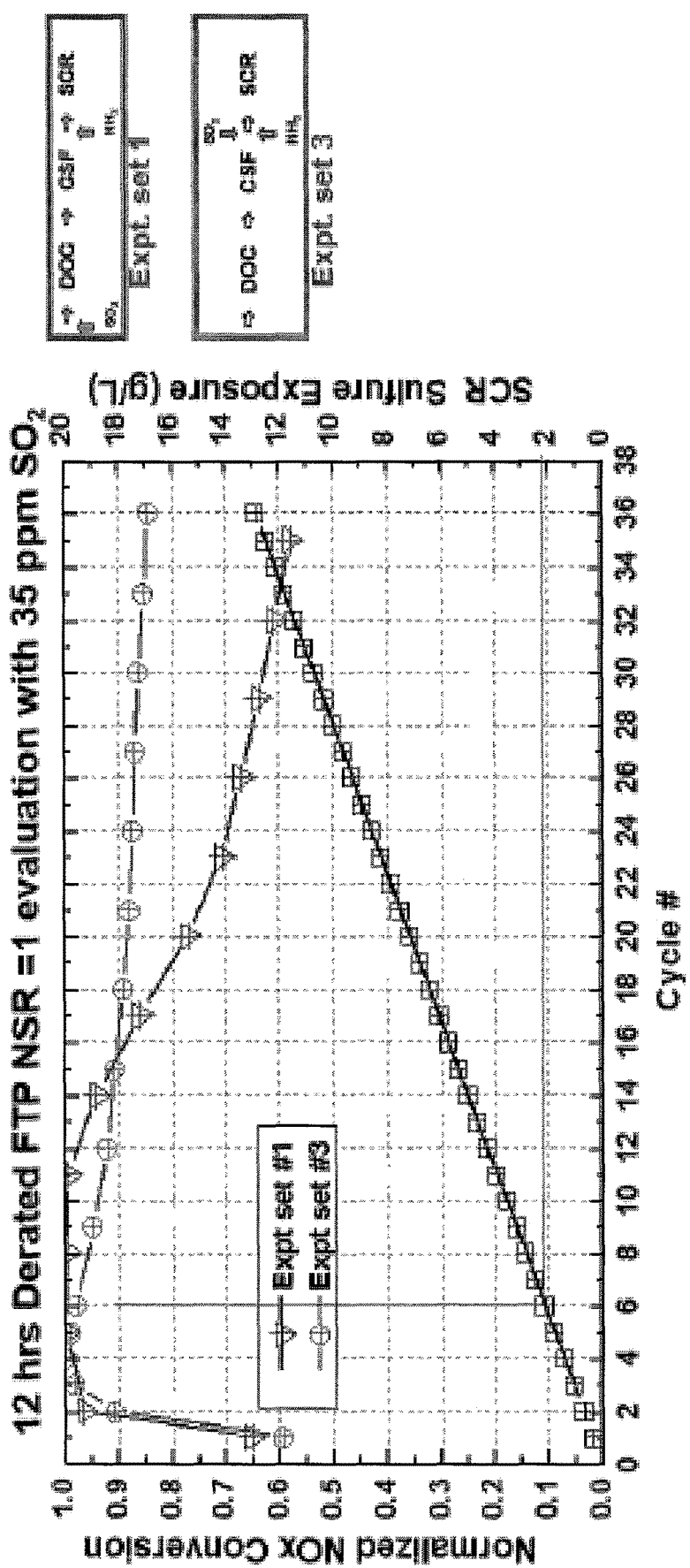
FIG. 29 is a plot showing deactivation of an upstream Cu-based SCR catalyst containing an oxidation catalyst and an upstream Cu-based SCR catalyst excluding an oxidation catalyst.

While it is apparent that under fresh conditions a system containing an SCR/AMOX upstream of a standard Euro VI or US EPA 2010 aftertreatment system of DOC/CSF/SCR/AMOX, can meet ULNOx emission over the hot FTP, such a system does entail some challenges it still needs to overcome. It is known that $SO_3$ rather than $SO_2$ acts as a deactivation species, especially for zeolite based SCR materials. The fraction of $SO_3$ entering the upstream SCR is significantly less than for the downstream SCR as it does not contain an oxidation catalyst upstream of it; however, the engine will under normal operating conditions still emit low concentrations of $SO_3$. Deactivation of an upstream Cu-zeolite based SCR will therefore occur over time, albeit at a slower rate compared to a downstream Cu-zeolite SCR. See FIG. 29, wherein NOx conversion plotted was normalized based on the peak conversion value measured during the run.

Figure 30:
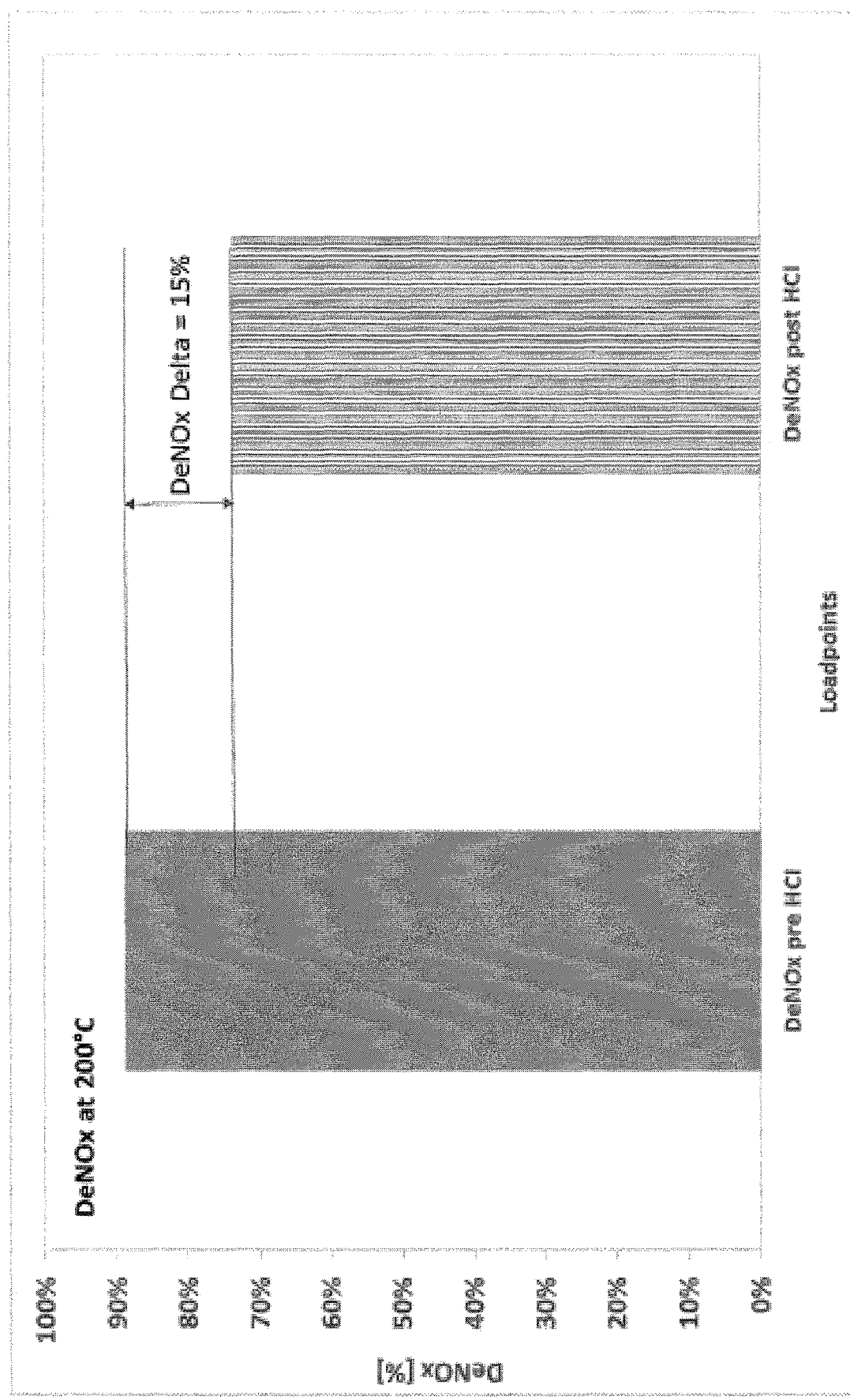
FIG. 30 is a plot of deactivation of a Cu-SCR due to hydrocarbon injection in an upstream position at low temperature.

Desulfation of a Cu-zeolite SCR usually occurs at temperatures around 500° C. In active systems, where Cu-zeolite SCRs find application, the SCR tends to be desulfated during filter regenerations, where temperatures are achieved which are sufficient to concurrently desulfate the Cu-zeolite SCR. An upstream Cu-zeolite SCR would still need to be desulfated after a certain time interval to maintain its NOx conversion performance, due, among other pathways, to deactivation via ammonium bisulfate formation. The only pathway to achieve a sufficient temperature over this component would, however, be via engine measures, as no HC oxidation catalyst would be available upstream to raise exhaust temperatures. A Cu-CHA SCR was studied with regard to the possibility of acting as an HC oxidation catalyst during hydrocarbon injection (HCI) events, and the impact a high concentration of HC would have on the Cu-CHA SCR's DeNOx performance was considered. In engine tests, the DOC was replaced with an SCR/AMOX (based on Cu-CHA) in an aftertreatment system. Several load points with varying exhaust flow and inlet temperatures were targeted to simulate HCI events. It was apparent that, while the SCR catalyst portion did not show any significant HC oxidation capability, the AMOx was able to light-off the HC under certain conditions, due to the presence of PGM in this part. NOx conversion tests of the component prior to and post HCI events displayed a significant deactivation. See FIG. 30.

Figure 31:
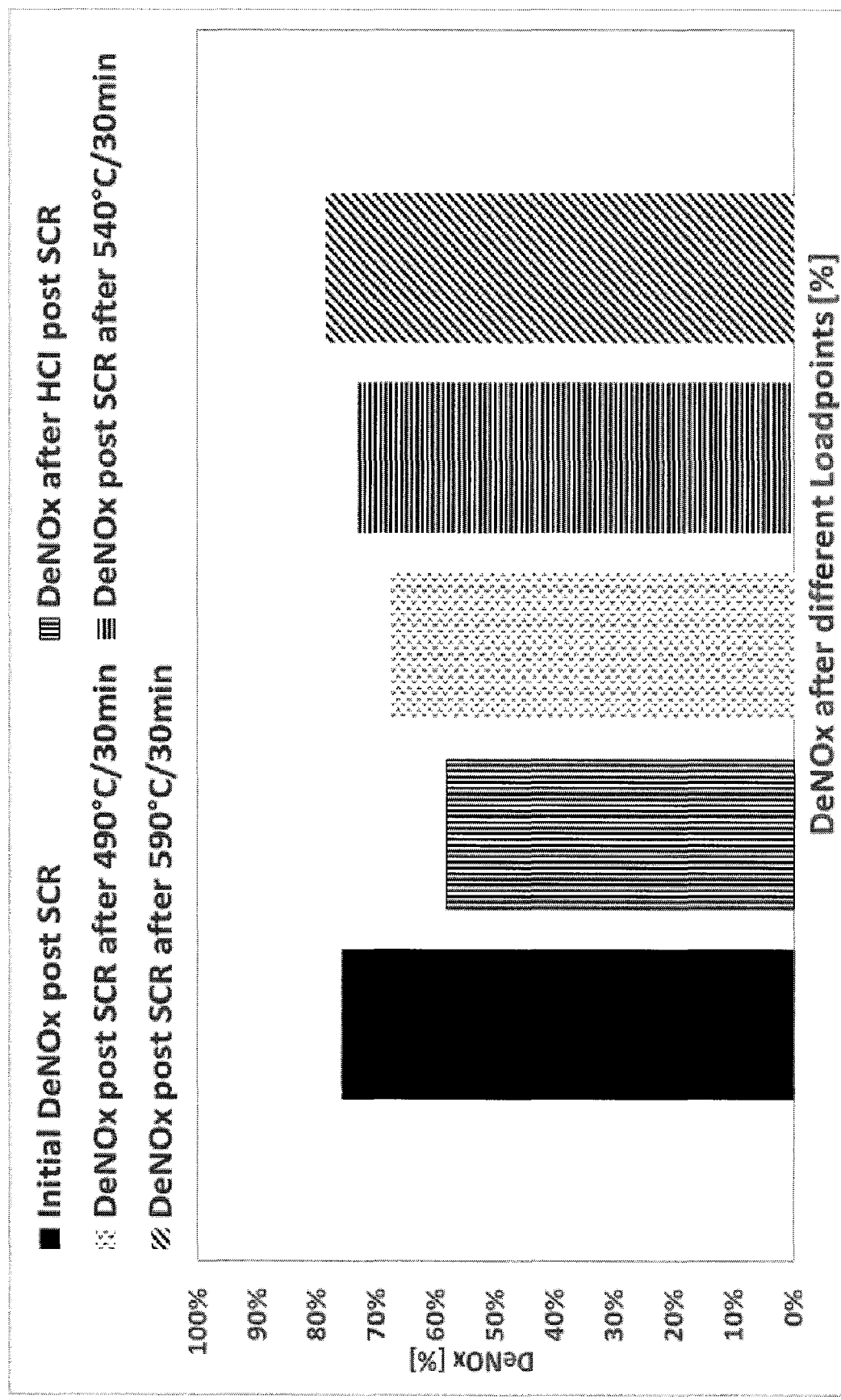
FIG. 31 is a plot of DeNOx performance of an upstream Cu-SCR catalyst prior to and after hydrocarbon injection (HCI) events.

This SCR catalyst was based on a small pore zeolite structure (CHA), and HC still appears to deactivate the NOx conversion activity of this SCR. Although not intending to be limited by theory, it was speculated that coke formation may be the underlying cause for this deactivation and subsequently 'decoking' load points were targeted to investigate under which conditions the performance could be recovered. As no recovery is visible at 450° C., the temperature was ramped up by 50° C. intervals starting at 490° C. and this temperature again maintained for 30 minutes. It became apparent, that the DeNOx Performance of the Cu-CHA SCR needs a temperature between 540 and 590° C. for 30 minutes to fully recover its performance after HCI events. See FIG. 31. Additionally, the performance of the SCR catalyst was measured after each 'decoking event' of 30 minutes starting at 490° C. and ramping it up by 50° C. per 'decoking step'. It appears a temperature between 540 and 590° C. for 30 minutes is needed for a full recovery. Recovery steps were run without urea dosing.

Figure 32:
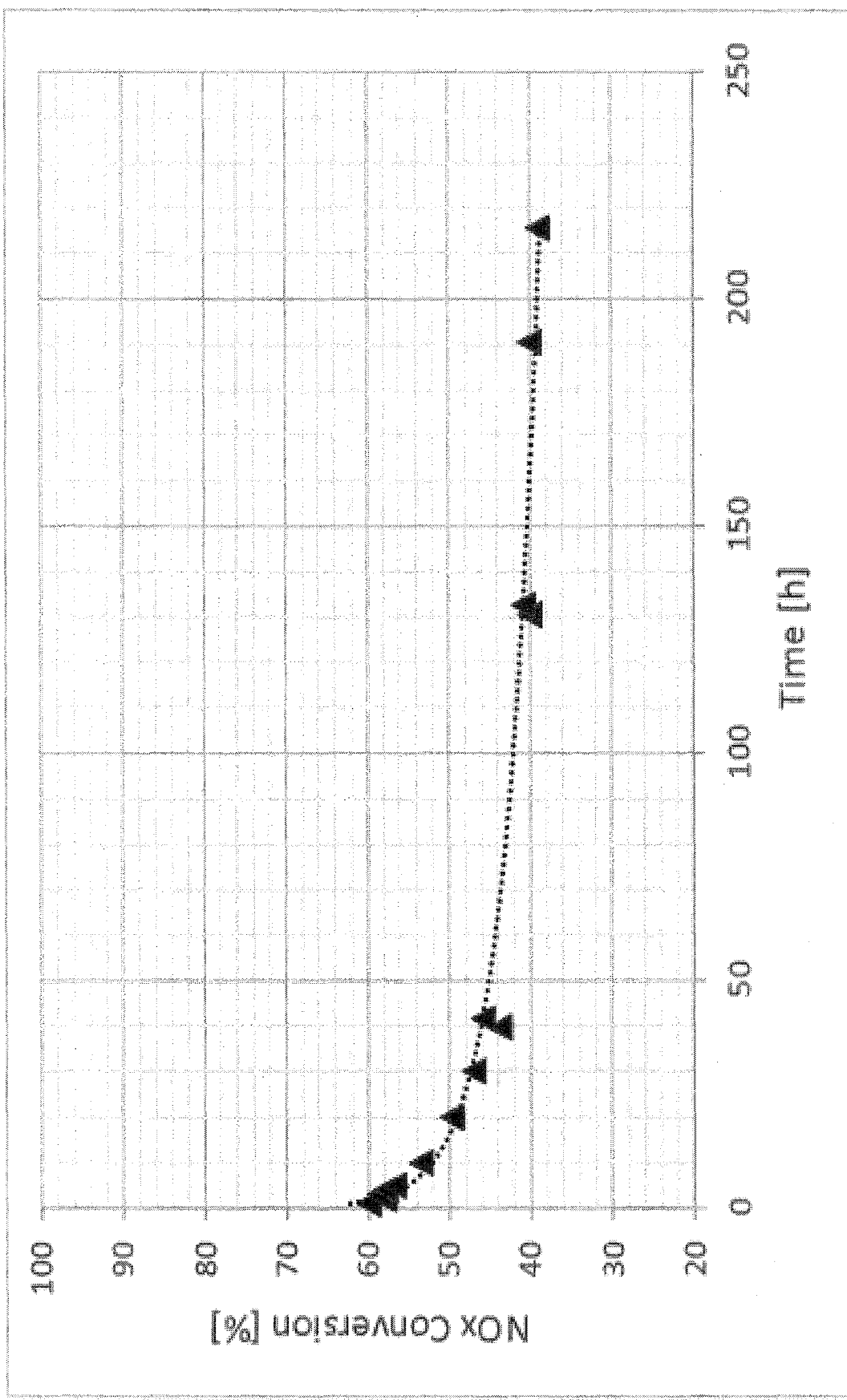
FIG. 32 is a plot of NOx conversion over time, showing a drop-off in DeNOx at 215° C. SCR-in over a Cu-CHA SCR catalyst in an upstream position after several hours of simulated low load driving.

Temperatures in the range needed for an upstream SCR catalyst to recover after HCI events (i.e., between 540 and 590° C. for 30 minutes) can usually not be achieved via engine measures. Concurrently, the upstream Cu-CHA SCR catalyst was also run in low load driving over several hours to observe if low concentration of HC/soot would have a comparable impact/deactivation on the DeNOx performance of the SCR catalyst as was observed after the HCI events Again, a Cu-CHA SCR component was placed in the position of the DOC within an aftertreatment system prior to a 200 hour engine cycling aging, whereby every hour the catalyst system was exposed to 215, 275, 350, and 415° CSCR-in, holding at each step for 15 minutes and then repeating 200 times. After this exposure of over 200 hours, the Cu-CHA SCR catalyst again displayed a significant drop-off in low temperature performance. See FIG. 32. Based on the HCI events, the same deactivation mechanism is being postulated.

Figure 33:
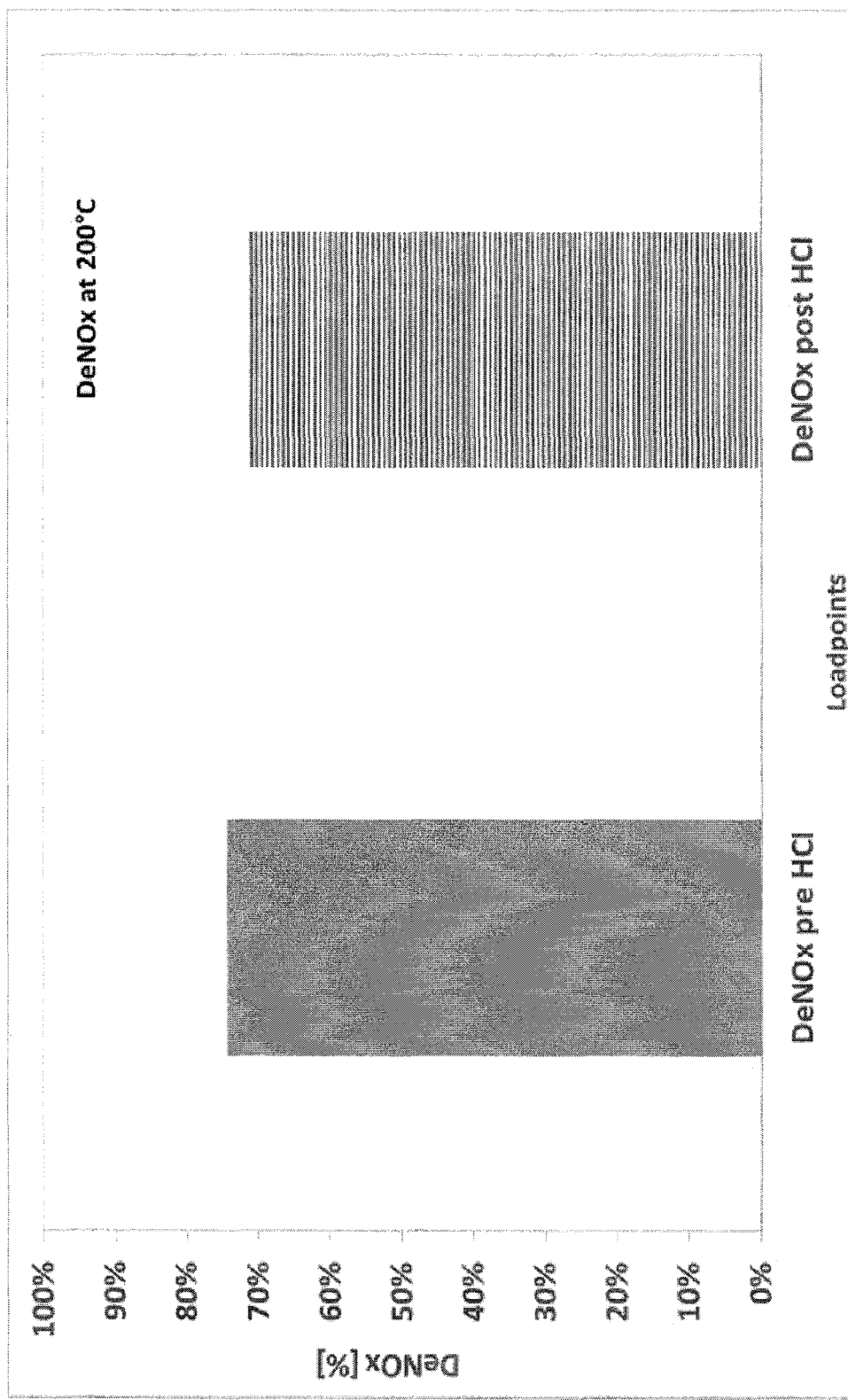
FIG. 33 is a plot of DeNOx performance of an upstream Cu-SCR catalyst at 200° C. prior to and after HCI events, with novel catalyst functionality incorporated into the SCR catalyst, showing no significant deactivation due to HCI events at such low temperatures.
Figure 34:
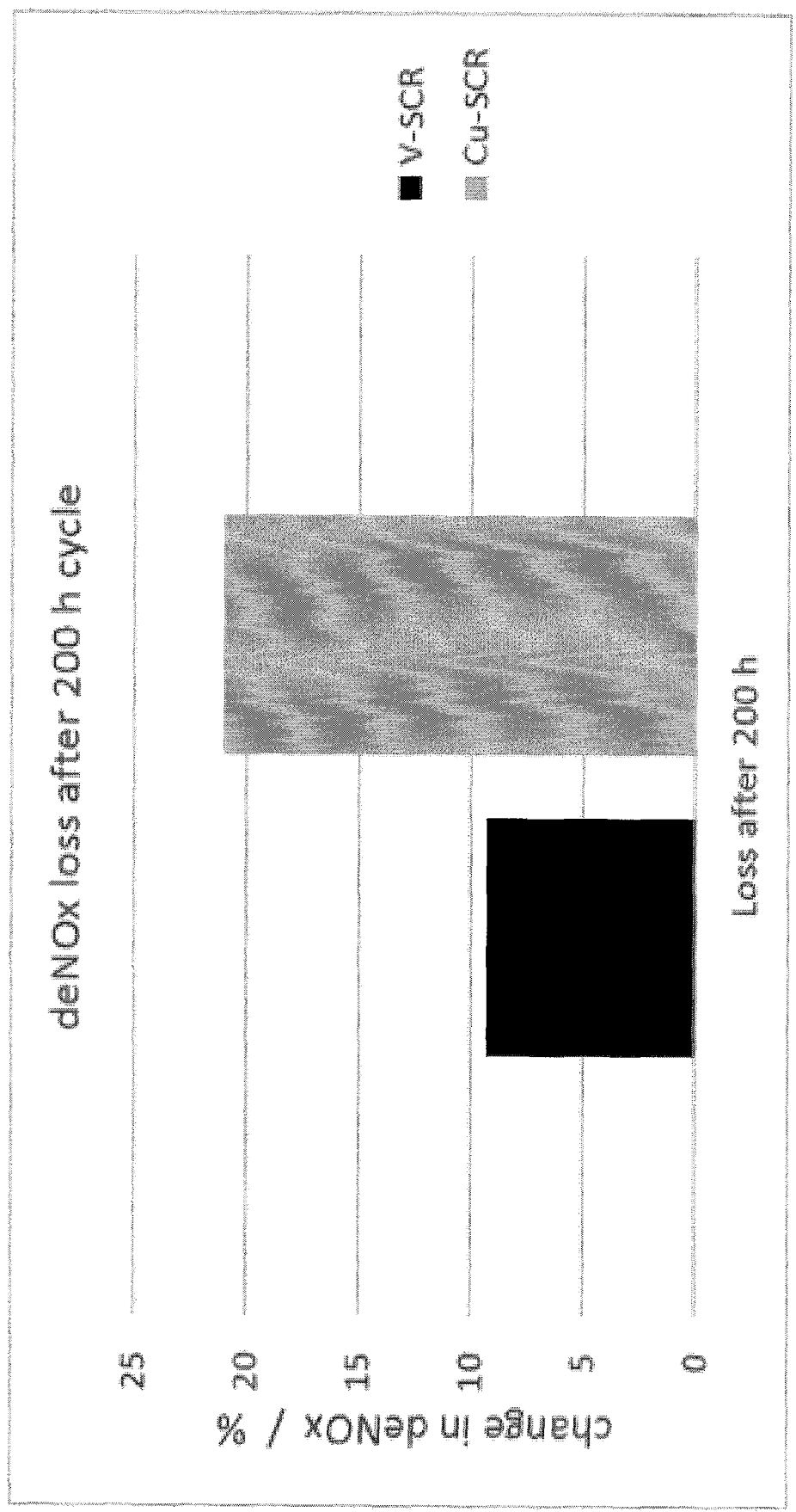
FIG. 34 provides data on NOx conversion at 200° C. over a Cu-CHA SCR/AMOx catalyst in an upstream position after several hours of simulated low load driving and over a vanadium-containing SCR (V-SCR) and Cu-CHA AMOx, showing higher robustness of the V-SCR/Cu-CHA-AMOx system.

Based on these results regarding the impact of HC and/or soot on the upstream Cu-zeolite SCR, a new system was provided with a functionality into the aftertreatment system (including Cu-zeolite and vanadia), which mitigated the deactivation observed. Tests with the novel system were run on an engine bench observing the impact of HCI on the Cu-CHA SCR. Unlike in the previous test, where the DeNOx level at low temperatures suffered significantly over the upstream SCR post HCI events, the DeNOx levels remained almost unchanged at low temperatures when the novel catalyst was applied in the tests, as can be seen in FIG. 33. An important advantage of Vanadia SCR is its sulfation and desulfation behavior in comparison to Cu-zeolite SCRs. Although sulfation can also be observed over V-SCR technologies, the recovery occurs at much lower temperatures in comparison to Cu-zeolite SCR technologies. Furthermore, when running V-SCR in long-term low load driving, an upstream V-SCR suffered significantly less in comparison to its Cu-zeolite SCR equivalent. See FIG. 34.

Figure 35:
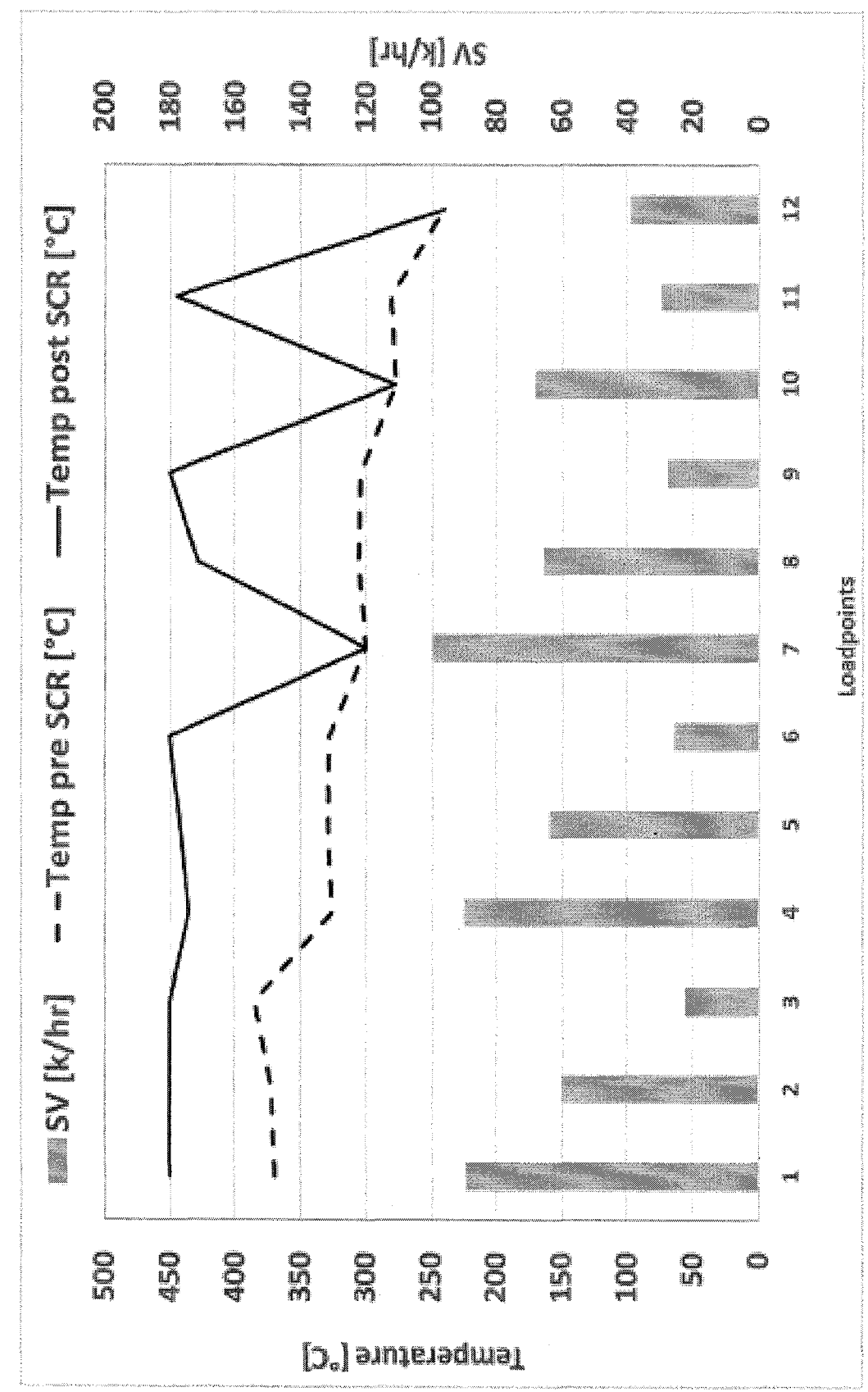
FIG. 35 is a plot of data associated with HCI events over an upstream V-SCR catalyst.

Furthermore, if such a V-SCR based advanced aftertreatment would need a 'soft-active' regeneration to increase the passive soot burn-off in the CSF, the upstream V-SCR can also act as an excellent HC oxidation catalyst. Tests run with a V-SCR+Cu-zeolite AMOX yielded excellent results during HCI events, with the V-SCR being able to oxidize most HC during these events, with the AMOX acting as an HC slip control catalyst. The targeted CSF-in temperatures could be achieved under most test conditions over the V-SCR only (see FIG. 35) with negligible HC slip.

Figure 36:
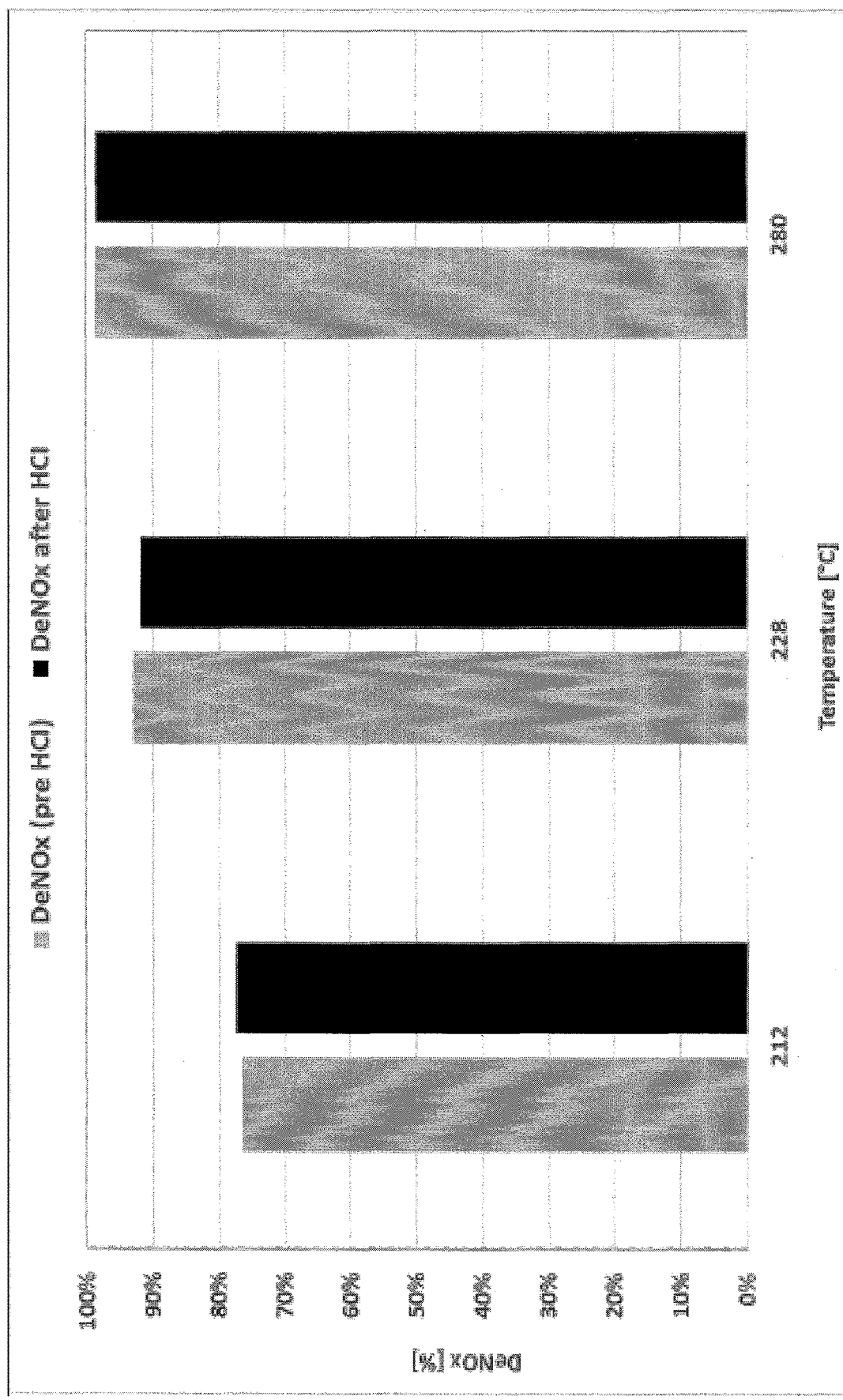
FIG. 36 is a plot of DeNOx activity over a V-SCR catalyst prior to and after an HCI event.

DeNOx testing prior to and post HCI events over the V-SCR furthermore displayed no deactivation. DeNOx activity, unlike what was observed over a Cu-zeolite SCR, does not appear to be impeded by HC events over a V-SCR. See FIG. 36.

The development of a new suite of SCR materials, both based on Cu-zeolite as well as on Vanadia, have pushed the performance boundaries to even lower temperatures. Further, alternative aftertreatment system layouts, as described herein, will be able to push low temperature NOx conversion performance to meet potentially upcoming regulations requiring lower emission levels. The introduction of an upstream SCR/AMOX to an aftertreatment system layout comprising of DOC/CSF/SCR/AMOX has yielded very promising low tailpipe NOx and $N_2O$ levels. Inclusion of an HC oxidation functionality into the after treatment system has been accomplished, as shown in this example, while not affecting the overall performance of the system.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims Although specific terms are employed herein, they are used in a generic and descriptive sense only and not for purposes of limitation.

What is claimed is:

1. A system for treatment of an exhaust gas stream from an engine, the system comprising:
   a first selective catalytic reduction (SCR) catalyst that is in fluid communication with the exhaust gas stream, wherein the first SCR catalyst receives the exhaust gas stream without any intervening catalyst;
   a diesel oxidation catalyst (DOC) in fluid communication with the first SCR catalyst, wherein the diesel oxidation catalyst is positioned downstream of the first SCR catalyst;
   a catalyzed soot filter (CSF) in fluid communication with the diesel oxidation catalyst, wherein the catalyzed soot filter is positioned downstream of the diesel oxidation catalyst;
   a second SCR catalyst in fluid communication with the catalyzed soot filter, wherein the second SCR catalyst is positioned downstream of the catalyzed soot filter; and
   a first AMOx catalyst that is either integrated with the second SCR catalyst or in fluid communication with and downstream of the second SCR catalyst.

2. The system of claim 1, wherein the first SCR catalyst is in a close-coupled position.

3. The system of claim 1, where the first SCR catalyst is in an underfloor position.

4. The system of claim 1, further comprising a second AMOx catalyst integrated with the first SCR catalyst, in the form of an SCR/AMOx catalyst.

5. The system of claim 4, wherein the second AMOx catalyst comprises platinum.

6. The system of claim 4, wherein the SCR/AMOx catalyst is in the form of two or more washcoats on a flow-through substrate, wherein the flow-through substrate has an upstream inlet end and a downstream outlet end, and wherein the second AMOx catalyst comprises platinum and is at the outlet end and extends less than a full length of the SCR/AMOx catalyst.

7. The system of claim 6, wherein the SCR/AMOx catalyst comprises: a bottom washcoat comprising the second AMOx catalyst in direct contact with the flow through substrate, wherein the second AMOx catalyst extends less than the full length of the SCR/AMOx catalyst; and a top washcoat comprising the SCR catalyst extending the full length of the SCR/AMOx catalyst.

8. The system of claim 1, wherein the first SCR catalyst comprises a vanadium component.

9. The system of claim 1, wherein the first SCR catalyst comprises copper-promoted molecular sieves.

10. The system of claim 1, wherein the first SCR catalyst comprises Cu-CHA.

11. The system of claim 1, further comprising a dual injector system, comprising a first injector adapted for the addition of a first reductant to the exhaust gas stream upstream of the first SCR catalyst and a second injector adapted for the addition of a second reductant to the exhaust gas stream upstream of the second SCR catalyst.

12. The system of claim 11, wherein the first and second reductants comprise ammonia or an ammonia precursor.

13. The system of any of claim 1, wherein the CSF comprises one or more washcoats on a wall flow filter, and wherein the one or more washcoats comprise platinum and palladium.

14. The system of claim 13, wherein the platinum and palladium in the one or more washcoats of the CSF are supported on alumina and are present in a ratio of about 4:1 Pt:Pd.

15. The system of claim 1, wherein the DOC comprises one or more washcoats on a flow-through substrate having an upstream inlet end and a downstream outlet end, and wherein the one or more washcoats comprise platinum and palladium on alumina.

16. The system of claim 15, wherein the DOC comprises:
a first washcoat coated from the upstream inlet end comprising platinum and palladium on alumina, extending less than a full length of the flow-through substrate, with a platinum:palladium ratio of about 1:1; and
a second washcoat coated from the downstream outlet end comprising platinum and palladium on alumina, extending less than the full length of the flow-through substrate, with a platinum:palladium ratio of greater than 2:1.

17. The system of claim 1, wherein the DOC is associated with the CSF, in the form of a zoned DOC/CSF having an upstream inlet end and a downstream outlet end, wherein the DOC is at the upstream inlet end and extends less than a full length of the CSF.

18. The system of claim 17, wherein the zoned DOC/CSF is in the form of two or more washcoats on a wall flow filter, comprising:
a first washcoat extending a full length of the wall flow filter comprising platinum and palladium on alumina, with a platinum:palladium ratio of greater than 5:1, and
a second washcoat extending from the upstream inlet end less than the full length of the wall flow filter, comprising platinum and palladium on alumina, with a platinum:palladium ratio of greater than 5:1 and a loading of about 50 g/ft$^3$ or greater.

19. The system of claim 1, wherein the first AMOx catalyst is in fluid communication with and downstream of the second SCR catalyst, and wherein the first AMOx catalyst is integrated with a third SCR catalyst.

20. The system of claim 1, wherein the second SCR catalyst has an upstream inlet end and a downstream outlet end, and comprises an iron-promoted molecular sieve extending from the inlet end to less than a full length of the SCR catalyst and comprises a copper-promoted molecular sieve extending from the outlet end to less than the full length of the SCR catalyst.

21. The system of claim 20, wherein the iron-promoted molecular sieve is Fe-CHA and the copper-promoted molecular sieve is Cu-CHA.

22. The system of claim 1, wherein the engine is a lean burn engine.

23. The system of claim 1, wherein the engine is a diesel engine.

24. A method of treating an exhaust gas stream, comprising contacting the exhaust gas stream with the system of claim 1 such that nitrogen oxides (NOx) in the exhaust gas stream are reduced.

* * * * *